US012738675B2

(12) United States Patent
Sanchez et al.

(10) Patent No.: US 12,738,675 B2
(45) Date of Patent: Sep. 15, 2026

(54) CONNECTOR SUITABLE TO HOLD A BUSBAR IN CONTACT WITH AN ELECTRODE OF A BATTERY, SYSTEM AND METHOD AND BATTERY SET

(71) Applicant: A. Raymond et Cie, Grenoble (FR)

(72) Inventors: Anthony Sanchez, St-Martin the Vinoux (FR); Yoann Garapon, La buisse (FR); Christian Kolb, Binzen (DE); Thomas Christian Tausendfreund, Efringen-Kirchen (DE); Claude François Michel, Allevard (FR); Jan Peter Kupfer, Lörrach (DE); Christian Fräulin, Waldkirch (DE)

(73) Assignee: A. Raymond et Cie, Grenoble (FR)

( * ) Notice: Subject to any disclaimer, the term of this patent is extended or adjusted under 35 U.S.C. 154(b) by 319 days.

(21) Appl. No.: 18/291,026

(22) PCT Filed: Jul. 14, 2022

(86) PCT No.: PCT/EP2022/069768
§ 371 (c)(1),
(2) Date: Jan. 22, 2024

(87) PCT Pub. No.: WO2023/001688
PCT Pub. Date: Jan. 26, 2023

(65) Prior Publication Data

US 2024/0332827 A1 Oct. 3, 2024

(30) Foreign Application Priority Data

Jul. 23, 2021 (EP) .................................... 21187382

(51) Int. Cl.
*H01R 4/50* (2006.01)
*H01M 50/249* (2021.01)
(Continued)

(52) U.S. Cl.
CPC ........ *H01R 4/5008* (2013.01); *H01M 50/249* (2021.01); *H01M 50/503* (2021.01);
(Continued)

(58) Field of Classification Search
None
See application file for complete search history.

(56) References Cited

U.S. PATENT DOCUMENTS

| | | | | |
|---|---|---|---|---|
| 4,759,726 A * | 7/1988 | Naylor | H01R 4/5008 | 439/441 |
| 6,783,385 B2 * | 8/2004 | Rudy | H01R 4/4835 | 439/438 |

(Continued)

FOREIGN PATENT DOCUMENTS

| | | |
|---|---|---|
| CN | 107078428 A | 8/2017 |
| DE | 202013103444 U1 | 11/2014 |

(Continued)

OTHER PUBLICATIONS

International Search Report for PCT/EP2022/069768 dated Sep. 20, 2022, 4 pages.

(Continued)

*Primary Examiner* — Tho D Ta
(74) *Attorney, Agent, or Firm* — WARNER NORCROSS + JUDD LLP

(57) ABSTRACT

A connector configured to hold a busbar in contact with another conductor in a high current power supply system is provided. The connector comprises a clamp.
The clamp has a transition section connecting
a first leg
to a second leg.
The transition section and/or the first leg are elastically deformable.
The clamp has a first state and a second state.
(Continued)

The transition section and/or the first leg is further elastically deformed in the second state than in the first state.
The connector further comprises a spacer moveable between a first position and a second position. The spacer is rotatable and moveable linearly along a retraction direction or can perform a combined rotational and linear movement from the first position into the second position.

9 Claims, 39 Drawing Sheets

(51) Int. Cl.

| | |
|---|---|
| ***H01M 50/503*** | (2021.01) |
| ***H01M 50/517*** | (2021.01) |
| ***H01R 43/26*** | (2006.01) |

(52) U.S. Cl.

CPC .......... *H01M 50/517* (2021.01); *H01R 43/26* (2013.01); *H01M 2220/20* (2013.01); *H01R 2201/26* (2013.01)

(56) References Cited

U.S. PATENT DOCUMENTS

| | | | | |
|---|---|---|---|---|
| 8,129,641 | B2 * | 3/2012 | Majewski .............. | H01R 4/483 439/441 |
| 10,461,444 | B2 * | 10/2019 | Scanzillo ............. | H01R 4/4833 |
| 2010/0055993 | A1 | 3/2010 | Ikeda et al. | |
| 2016/0164235 | A1 | 6/2016 | Aporius et al. | |
| 2017/0201037 | A1 | 7/2017 | Torcheux et al. | |
| 2021/0265750 | A1 | 8/2021 | Rieder et al. | |

FOREIGN PATENT DOCUMENTS

| | | | |
|---|---|---|---|
| DE | 202016100798 | U1 | 5/2017 |
| DE | 102018114764 | A1 | 12/2019 |
| DE | 102020212245 | A1 | 4/2021 |
| EP | 2639891 | A2 | 9/2013 |
| EP | 3699979 | A1 | 8/2020 |
| EP | 3719934 | A1 | 10/2020 |
| EP | 3819981 | A1 | 5/2021 |
| FR | 3062956 | A1 | 8/2018 |
| JP | 2012038558 | A | 2/2012 |
| WO | 2019242917 | A1 | 12/2019 |

OTHER PUBLICATIONS

Machine assisted English translation of DE102020212245A1 obtained from https://worldwide.espacenet.com/patent on Jan. 19, 2024, 24 pages.
Machine assisted English translation of DE202016100798U1 obtained from https://worldwide.espacenet.com/patent on Jan. 19, 2024, 10 pages.
Machine assisted English translation of EP3819981A1 obtained from https://worldwide.espacenet.com/patent on Jan. 19, 2024, 14 pages.
Machine assisted English translation of FR3062956A1 obtained from https://worldwide.espacenet.com/patent on Jan. 19, 2024, 8 pages.
Machine assisted English translation of JP2012038558A obtained from https://worldwide.espacenet.com/patent on Jan. 19, 2024, 16 pages.

* cited by examiner

CONNECTOR SUITABLE TO HOLD A BUSBAR IN CONTACT WITH AN ELECTRODE OF A BATTERY, SYSTEM AND METHOD AND BATTERY SET

CROSS-REFERENCE TO RELATED APPLICATIONS

This application is the U.S. National Stage of International Application No. PCT/EP2022/069768 filed on 14 Jul. 2022, which claims priority to and all advantages of European Patent Application No. 21187382.3 filed on 23 Jul. 2021, the contents of which are hereby incorporated by Reference

FIELD OF THE DISCLOSURE

The invention pertains to a connector suitable to hold a busbar in contact with another conductor in a high current power supply system, in particular with an electrode of a battery or another busbar. The invention also pertains to a system with a connector and a busbar and another conductor, in particular an electrode of a battery or a further busbar. The invention also pertains to a method for assembly of such a system. The invention also pertains to a battery set.

BACKGROUND

Electrical batteries have become more and more important for various technical fields. In particular, this applies to relatively powerful battery sets for the energy supply to electrical motors. An important and technically demanding field is the energy supply to electrical vehicle motors, in particular street vehicles.

Here and in many other applications, battery sets comprising a plurality of battery units are commonly used. The battery units can be connected in parallel and/or in series in order to add up currents and/or voltages to meet the demands of the consumer, in particular the motor. In the field of electrical vehicle motors, relatively high electrical currents are typical. This applies not only for connecting a battery unit but also for interconnecting electrical conductors such as busbars at other places of the electrical power supply such as from the battery to the inverter or from the inverter to the motor. In particular, it applies to electrical connections within a so-called battery pack including all the modules and additional functions of the battery as a complete system within a battery housing.

From WO 2019/242917 A1 a connector (referred to as "Modulverbinder" in WO 2019/242917 A1) suitable to hold an end of a flexible conductor (referred to as "flexible Stromschiene") in contact with an electrode (referred to as "Pol") of a battery is known. The known connector comprises a clamp (referred to as "Halteklammer"), the clamp having a transition section connecting a first leg arranged at one end of the transition section to a second leg arranged at the opposite end of the transition section. The first leg has a tip and the second leg has a tip. The transition section has a width in a width direction that extends at an angle to a line that connects the one end with the opposite end of the transition section. WO 2019/242917 A1 teaches to use the flexible conductor to compensate tolerance between electrodes of batteries that are to be connected. The production of flexible conductors is, however, expensive.

From JP 2012-38558 A a connector suitable to hold an end of a conductor in the form of an angled sheet metal (reference sign 60 in FIG. 5 of JP 2012-38558 A) in contact with a pin-shaped electrode (reference sign 12A or 12B in FIG. 5 of JP 2012-38558 A) of a battery is known. The known connector comprises a clamp (reference sign 80, 80A, 80B in FIG. 5 of JP 2012-38558 A), the clamp having a transition section (reference sign 81 in FIG. 5 of JP 2012-38558 A) connecting a first leg (reference sign 82 in FIG. 5 of JP 2012-38558 A) arranged at one end of the transition section to a second leg (reference sign 82 in FIG. 5 of JP 2012-38558 A) arranged at the opposite end of the transition section. The first leg has a tip and the second leg has a tip. The transition section has a width in a width direction that extends at an angle to a line that connects the one end with the opposite end of the transition section. FIG. 7 and FIG. 11 of JP 2012-38558 A show, how the connector is applied to the electrode of the battery. In a first step the angled sheet metal conductor is placed onto the pin-shaped electrode (see FIG. 11). In a second step the clamp is pushed over the pin-shaped electrode and the upwardly bent part of the angled sheet metal conductor.

Given this background, the problem to be solved by the invention is to suggest a conductor, a system and a method that facilitate bringing and holding a conductor in contact with a further conductor, such as an electrode of a battery or a busbar.

BRIEF SUMMARY

A connector and related the system and method are disclosed herein. Certain specific embodiments are described herein.

The invention is based on the basic concept to make at least some parts of the clamp elastically deformable and to provide a spacer that can hold the clamp in a state (the second state) where the respective parts are more elastically deformed than in a further state (the first state) of the clamp. The spacer can for example be used to hold the clamp in an opened position that facilitates the insertion of parts, like the end of a busbar or the end of an electrode in between the legs of the clamp. According to the basic concept of the method according to the invention, the insertion movement of a part of the busbar is used to move the spacer from the one position (the first position), where it is in contact with a part of the first leg, to a second position. This facilitates the assembly as no additional movement is necessary to move the spacer from the first position to the second position. Regarding the connector, the basic concept of invention teaches to have the spacer move in certain directions as it moves from the first position to the second position, these certain directions facilitating the insertion of a part of the busbar into the clamp as will be described in more detail below.

The connector according to the invention comprises a clamp, whereby the clamp has a first leg and a second leg. The clamp also has a transition section. The first leg is arranged at one end of the transition section. The second leg is arranged at the opposite end of the transition section. The transition section hence connects the first leg to the second leg. In its most minimal form, the transition section is the line where the first leg and the second leg meet, such as in a V-shape. In this minimal embodiment of the transition section, the one end of the transition section and the opposite end of the transition section become one. In one embodiment, however, one end of the transition section is arranged at a distance from the opposite end of the transition section giving the transition section a length. It could, for example, be the basis of a U-shape.

The first leg is arranged at one end of the transition section. In one embodiment, the transition section is provided by a part of the clamp, which part has a length and a width and will be referred to as bridge.

In one embodiment, the first leg is arranged at one end of the transition section and the second leg is arranged at the opposite end of the transition section by way of a part of the first leg being attached to a part of the second leg. In such an embodiment, the transition section of the clamp would be that section of the clamp that contains the part of the first leg that is connected to the part of the second leg, the part of the second leg that is connected to the part of the first leg and—if necessary and provided—the elements for connecting the first leg to the second leg.

In one embodiment, the first leg and the second leg are parts of an integral or one-piece element. In one embodiment, the first leg and the second leg are provided by bending a blank. In such an embodiment, the transition section could be the bend that is introduced into the blank in order to create the first leg and the second leg. In an alternative, a part of the first leg could be connected to a part of the second leg by way of welding or gluing. In an alternative embodiment, a part of the first leg can be attached to a part of the second leg by way of using connecting elements, for example screws or rivets.

In one embodiment, apart from having at least one part that is elastically deformable, the first leg can also be rotated relative to the second leg without an elastic deformation of the first leg, the transition section or the second leg. In one embodiment an articulation is provided that defines a rotation axis around which the first leg and/or the second leg can be rotated. The axis of the articulation can be a separate piece and the first leg can have a hole or recess for receiving a part of the axis and the second leg can have a hole or a recess for receiving a part of the axis, the first leg being rotatable relative to the axis and/or the second leg being rotatable relative to the axis. In an alternative, the first leg can have rod-shaped protrusions that extend away from the first leg along a rotation axis, whereby the second leg has holes or a recesses for receiving the rod-shaped protrusion, allowing the first leg to rotate relative to the second leg.

In one embodiment of the embodiment where the first leg can be rotated relative to the second leg without an elastic deformation of the first leg, the transition section or the second leg the clamp has releasable locking means that lock the first leg in a relative position to the second leg. If the locking means are engaged, the first leg is locked to the second leg and the first leg cannot be rotated relative to the second leg without an elastic deformation of the first leg, the transition section or the second leg. If the locking means are disengaged, the first leg is not locked to the second leg and the first leg can be rotated relative to the second leg without an elastic deformation of the first leg, the transition section or the second leg. The locking means can for example be protrusions provided on either the first leg or the second leg that engage into recesses or holes in the respective other element to lock the first leg to the second leg.

In one embodiment, in which the transition section is provided by a bridge, the first leg and the bridge are part of a one-piece element. In one embodiment, the first leg and the bridge are provided by bending a blank.

In one embodiment, in which the transition section is provided by a bridge, the first leg, the second leg and the bridge are part of a one-piece element. In one embodiment, the first leg, the second leg and the bridge are provided by bending a blank.

In one embodiment, in which the transition section is provided by a bridge, the second leg and the bridge are part of a one-piece element. In one embodiment, the second leg and the bridge are provided by bending a blank.

In one embodiment, the clamp has further legs arranged at the one end of the transition section which is at the same end of the transition section where the first leg is arranged. In an alternative, the clamp only has one leg arranged at the one end of the transition section.

In one embodiment, the clamp has further legs arranged at the opposite end of the transition section which is at the same end of the transition section where the second leg is arranged. In an alternative, the clamp only has one leg arranged at the opposite end of the transition section.

In one embodiment, the clamp is an one-piece element that is obtained by cutting and bending a blank, which may be a metal blank. In an alternative, the clamp is provided by connecting individual pieces together. In one embodiment, the transition section and the first leg are provided as a one-piece element, for example an element obtained by cutting and bending a blank, whereby this one-piece element is attached to a further element, for example a wall, for example a wall of a battery unit, whereby the further element, for example a part of the further element, for example a part of the wall, for example the part of the wall of a battery unit, provides the second leg.

In one embodiment, the transition section and/or the first leg is elastically deformable. In one embodiment, the transition section and the first leg are elastically deformable. In one embodiment, only the transition section, but not the first leg is elastically deformable. In one embodiment, only the first leg and not the transition section is elastically deformable. In one embodiment, the second leg is elastically deformable. In one embodiment, the transition section, the first leg and the second leg are elastically deformable. In one embodiment, the transition section and the second leg, but not the first leg are elastically deformable. In one embodiment, the first leg and the second leg but not the transition section are elastically deformable. The term "elastically deformable" is understood to mean that the application of a force not higher than 1000 Newton is necessary to move the clamp from the from the first state into the second state, wherein upper limits may be one of 800 N, 600 N, 400 N, 300 N or 250 N.

The clamp of the connector according to the invention has a first state, in which a reference part of the first leg is distanced from a reference part of the second leg by a first amount. The clamp of the connector according to the invention also has a second state, in which the reference part of the first leg is distanced from the reference part of the second leg by a second amount that is different from the first amount. In one embodiment, the second amount is larger than the first amount.

In one embodiment the first leg has at least one part that is arranged closer to the second leg in the first state and the second state compared to other parts of the first leg. In one embodiment, the reference part is that one part. In one embodiment, the first leg has a point or a line on its surface that is arranged closest to the second leg in the first state and the second state compared to other parts of the first leg. In one embodiment the reference part is the part of the first leg that provides this point or this line. The reference part can be a tip of the first leg. The reference part can be a protrusion arranged on the first leg that protrudes over other parts of the first leg, the reference part may protrude over other parts of the first leg that are arranged in a plane.

In one embodiment the second leg has at least one part that is arranged closer to the first leg in the first state and the second state compared to other parts of the second leg. In one embodiment, the reference part is that one part. In one embodiment, the second leg has a point or a line on its surface that is arranged closest to the first leg in the first state and the second state compared to other parts of the second leg. In one embodiment the reference part is the part of the second leg that provides this point or this line. The reference part can be a tip of the second leg. The reference part can be a protrusion arranged on the second leg that protrudes over other parts of the second leg, the reference part may protrude over other parts of the second leg that are arranged in a plane.

According to the invention, the transition section and/or the first leg is further elastically deformed (more elastically deformed, stronger elastically deformed) in the second state than in the first state. Embodiments are feasible, wherein the transition section and the first leg are not elastically deformed when the clamp is in the first state. The clamp in the first state in this embodiment could hence be considered to be unloaded. Alternative embodiments are also feasible, however, wherein the transition section and/or the first leg are elastically deformed already in the first state, but in the transition section and/or the first leg are further elastically deformed in the second state. In such an embodiment, the clamp could be considered to already be preloaded in the first state. The transition section has a width in a width direction. The width direction extends at an angle, in some embodiments the width direction may extend at an angle of 90°, to a line that connects the one end with the opposite end of the transition section. In one embodiment, if several lines can be drawn that connect the one end with the opposite end, especially in those embodiments, where the first leg and/or the second leg also extend to the width direction and hence one end or the opposite end of the transition section also have a dimension into the width direction, the shortest line that connects the one end with the opposite end of the transition section is may be used to define the width direction; the width direction being that direction that extends at an angle, in some embodiments the width direction may extend at an angle of 90° to that shortest line that connects a part of the one end of the transition section with a part of the opposite end of the transition section.

In one embodiment, there is at least one plane perpendicular to the width direction that contains a part of the reference part of the first leg and a part of the reference part of the second leg. In addition or as an alternative, there is at least one plane that is perpendicular to the width direction that contains a part of the reference part of the first leg but does not contain a part of the reference part of the second leg. In addition or as an alternative, there is at least one plane that is perpendicular to the width direction that contains a part of the reference part of the second leg but does not contain a part of the reference part of the first leg.

The connector according to the invention further comprises a spacer. The spacer is movable between a first position and a second position. The spacer is in contact with a part of the first leg when the clamp is in the second state and the spacer is in the first position. In one embodiment it is the spacer that holds the first leg in the position that the first leg has in the second state of the clamp. The transition section and/or the first leg are further elastically deformed in the second state than in the first state. This (additional) elastic deformation can be used to create a restoring force that is directed to bringing the clamp from the second state into the first state. The spacer in this embodiment can be used to prevent this restoration of the first state as long as the spacer is in contact with a part of the first leg when the clamp is in the second state and the spacer is in the first position. In one embodiment the spacer is in contact with the reference part of the first leg, the space may contact the tip of the first leg when the clamp is in the second state and the spacer is in the first position.

According to the invention, the spacer is designed to be rotated from the first position into the second position or is designed to be moved linearly from the first position into the second position along a retraction direction, the retraction direction pointing at least partially in the width direction and/or at least partially pointing towards the bridge or the spacer is designed to perform a combined rotational and linear movement from the first position into the second position.

Having the spacer rotate from the first position into the second position or having the spacer perform a combined rotational and linear movement from the first position into the second position offers the possibility to move the space with less effort compared to moving the spacer in a linear direction. Having the spacer rotate from the first position into the second position or having the spacer perform a combined rotational and linear movement from the first position into the second position hence already offers the possibility to assemble a system of the connector according to the invention and a busbar with less effort. Additionally, having the spacer rotate from the first position into the second position or having the spacer perform a combined rotational and linear movement from the first position into the second position offers the possibility of a more controlled movement compared to moving the spacer in a linear direction, for example with a lower risk of the spacer becoming stuck in the cause of the movement.

Having the spacer move linearly from the first position into the second position along the retraction direction offers the possibility of an easier insertion of a part of a busbar in between the first leg and the second leg of the clamp. In many possible applications of the invention, a part of the busbar will be introduced into the clamp either from the top and moved toward the transition section or from the side and/or in a combined movement from the top and the side. In these applications, the insertion movement of the part of the busbar into the clamp can be used to move the spacer from the first position into the second position.

In one embodiment, the spacer is arranged on an axle and can rotate about the axle. In those embodiments, where the axle is fixedly arranged within the connector, this embodiment would allow the spacer to rotate from the first position into the second position. For embodiments, where the axle is allowed to slide linearly relative to other parts of the connector, for example in designs where the end of the axle is arranged in slits, such an embodiment allows the spacer to perform a combined rotational and linear movement from the first position into the second position.

In one embodiment, the spacer has two rod-shaped projections that are arranged along a rotational axis and that are held in a rotational manner in further parts of the connector, allowing the rod-shaped projections of the spacer to rotate about the rotational axis relative to those further parts of the connector. In such an embodiment, the spacer would be designed to rotate from the first position into the second position. If the ends of the rod-shaped protrusions of the spacer are held in the further parts of the connector in a slidable manner, such an embodiment would allow the spacer to perform a combined rotational and linear movement from the first position into the second position.

In one embodiment, the spacer has block-shaped protrusions whereby ends of the block-shaped protrusions are arranged in rails provided in further parts of the connector. In such an embodiment, the spacer would be designed to move linearly from the first position into the second position. By way of purposefully choosing the direction of the rails, it can be ensured that the retraction direction points at least partially in the width direction and/or at least partially points towards the transition section.

In one embodiment, the spacer has a block-shaped part, for example has a part that has a polygonal cross-section, for example a triangular or rectangular cross section, which block-shaped part is arranged in a linear guidance provided in further parts of the connector. In such an embodiment, the spacer would be designed to move linearly from the first position into the second position along the guidance. By way of purposefully choosing the direction of the linear guidance, it can be ensured that the retraction direction points at least partially in the width direction and/or at least partially points towards the transition section.

The term "the retraction direction pointing at least partially in the width direction" is to be understood to mean that the retraction direction can be divided into at least two vectors that are perpendicular to each other, whereby one of the vectors is pointing in the width direction.

The term "the retraction direction pointing at least partially towards the transition section" is to be understood to mean that the retraction direction can be divided into at least two vectors that are perpendicular to each other, whereby one of the vectors is pointing towards the transition section.

In one embodiment, the second leg is elastically deformable. In one embodiment, the second leg is further elastically deformed (more elastically deformed) in the second state than in the first state.

In one embodiment, the connector comprises a further spacer, the further spacer being movable between a first position and a second position, the further spacer being in contact with a part of the second leg when the clamp is in the second state and the further spacer is in the first position and the second leg is further elastically deformed in the second state than in the first state. In one embodiment, the further spacer is designed to be rotated from the first position into the second position or is designed to move linearly from the first position into the second position along a retraction direction, the retraction direction pointing at least partially in the width direction and/or at least partially pointing towards the transition section or is designed to perform a combined rotational and linear movement from the first position into the second position.

In one embodiment, the spacer and the further spacer are designed to be symmetrical in their geometric shape and form and/or about their movement from the first position into the second position about a plane that contains the width direction. In one embodiment, the spacer is arranged on one side of such a plane and the further spacer is arranged on the opposite side of such a plane.

In one embodiment, the connector has a casing with an opening for inserting a part of the busbar into the casing. In one embodiment, a clearance is arranged in the casing between the opening and a busbar abutment surface on the spacer when the clamp is in the second state and the spacer is in the first position. The presence of the clearance allows the busbar to be inserted into the casing through the opening and to be moved within the casing to come into contact with the busbar abutment surface.

In one embodiment the first leg of the clamp has a tip and the second leg of the clamp has a tip. The reference part of the first leg may be provided by the tip. The reference part of the second leg may be provided by the tip. The term "tip" refers to a free end of the first leg and the second leg, respectively. The term "tip" does not define the exact geometric shape of that free end of the first leg and the second leg, respectively. The tip of the first leg and the second leg, respectively, can in one embodiment have the geometric shape of a point. In such an embodiment, one embodiment could be provided, wherein the material of the first leg and the material of the second leg, respectively, converge towards the point-shaped tip. In a particular embodiment, the tip has a longitudinal extent. In one embodiment, the tip of the first leg and the tip of the second leg have the same geometric shape. In an alternative embodiment, the tip of the first leg has a different geometric shape to the geometric shape of the tip of the second leg.

The invention is also directed to a system. The system has a connector according to the invention and a busbar. This system can be implemented in various high current power supply applications, in particular in a battery power supply. For example, it can be used to make the connection between busbars supplying power from an inverter to a motor or from a battery to the inverter. In a particular embodiment, the system can be applied for connecting a busbar at or in a battery pack comprising at least one battery unit. In a first alternative, the system further has an electrode of a battery. The busbar in the system in one state of assembly of the system is in contact with the electrode. In a second alternative the system further has a further busbar. The busbar in the system in one state of assembly of the system is in contact with the further busbar. Highlighting these two alternatives of the system according to the inventions has the purpose to show the possible applications of the invention. The invention can be used to connect a busbar to the electrode of a battery. The invention can also be used to connect a busbar to a further busbar. To simplify the description, the invention as regards the system and the method for assembly of the system will be made predominantly with reference to an electrode of a battery and without always mentioning the further busbar at the same time. Any disclosure as regards an electrode within the system or within the method is to be understood as a disclosure as regards a further busbar and to be understood to be also applicable to the alternative of the invention where not an electrode but a further busbar is present. For the disclosure concerning the further busbar, the term "electrode" or "electrode of a battery" in the description of the system and the method is to be replaced by "further busbar".

In one embodiment, a part of the busbar is arranged between the first leg, the busbar may be arranged between the reference part of the first leg and the second leg, more specifically between the reference part of the second leg of the clamp. In one embodiment, the first leg, in some embodiments the reference part of the first leg is in contact with a surface of the busbar. In one embodiment, the second leg, in certain embodiments the reference part of the second leg also is in contact with a surface of a busbar. In one embodiment, the first leg, in certain embodiments the reference part of first leg is in contact with a first surface of the busbar and the second leg, in some embodiments the reference part of the second leg is in contact with a second surface of the busbar, whereby the first surface and the second surface are arranged on opposite sides of the busbar and are pointing away from each other. In one embodiment, the first surface and the second surface are parallel to each other.

In one embodiment, a part of the busbar and also a part of the electrode or a part of the further busbar is arranged between the first leg and the second leg. In one embodiment, the first leg, in specific embodiments the reference part of the first leg is in contact with a surface of the busbar and the second leg, in some embodiments the reference part of the second leg is in contact with a surface of the electrode or with a surface of the further busbar. In one embodiment, the first leg, in particular the reference part of first leg is in contact with a surface of the busbar and the second leg, in certain embodiments the reference part of the second leg is in contact with a surface of the electrode or the further busbar, whereby the surface of the busbar and the surface of the electrode or the further busbar respectively are pointing away from each other. In one embodiment, the surface of the busbar and the surface of the electrode or the further busbar respectively are parallel to each other.

In one embodiment, a part of the busbar is arranged between the first leg and the second leg and a part of the electrode is arranged on the other side of the first leg compared to the busbar or is arranged on the other side of the second leg compared to the busbar.

In one embodiment, a part of the busbar is arranged between the first leg and the second leg and the electrode is arranged on the other side of the first leg compared to the busbar, whereby the second leg is in contact with a surface of the busbar, but no part of the first leg is in contact with the busbar and the busbar is in contact with a surface of the electrode. In one embodiment, the first leg in such an embodiment contains an opening and a portion of the electrode protrudes through the opening, a part of the portion of the electrode protruding through the opening being in contact with the busbar.

In one embodiment, a part of the busbar is arranged between the first leg and the second leg and the electrode is arranged on the other side of the second leg compared to the busbar, whereby the first leg is in contact with a surface of the busbar, but no part of the second leg is in contact with the busbar and the busbar is in contact with a surface of the electrode. In one embodiment, the second leg in such an embodiment contains an opening and a portion of the electrode protrudes through the opening, a part of the portion of the electrode protruding through the opening being in contact with the busbar.

In one embodiment, the system has a busbar and an electrode of the battery and a clamp, wherein the clamp is a different object to the electrode of the battery. In an alternative embodiment, the system has a busbar and an electrode of the battery, whereby the clamp of the connector is provided by parts of the electrode of the battery.

In one embodiment at least a part of the clamp and/or at least a part of the spacer is made from a material that has a lower electrical conductivity than the material that at least a part of the busbar and/or the electrode and/or the further busbar is made of. In addition or as an alternative, the bending stiffness of at least a part of the clamp is made lower than the bending stiffness of a part of the busbar and/or a part of the electrode and/or a part of the further busbar.

In one embodiment, the system contains a further connector, in some embodiments a further connector according to the invention, and a further electrode, whereby one part of the busbar is in contact with the electrode and held in contact with the electrode by the connector and whereby a further part of the busbar is in contact with the further electrode and held in contact with the further electrode by the further connector.

In one embodiment, the system contains a further connector, in certain embodiments a further connector according to the invention, and a further electrode, whereby one end of the busbar is in contact with the electrode and held in contact with the electrode by the connector and whereby a second end of the busbar is in contact with the further electrode and held in contact with the further electrode by the further connector.

A contact system according to the invention can be advantageously used to connect a battery unit which includes the case of connecting a battery set of a plurality of battery units. So-called busbars are used as electrical conductors for example for interconnecting battery units with each other or battery sets with a consumer. A busbar is often bar-shaped or strip-shaped but the term "busbar" shall be understood without an implicit geometric meaning herein, more as a general term for connectors in the field of electrical power distribution as described above.

Such busbars need to be interconnected in certain situations as well, for example in order to extend their longitudinal coverage by combining a plurality of interconnected busbars. This could serve for connecting a battery unit to a consumer, as an example. When connecting a busbar to a battery unit, the busbar has to be brought into an electrical contact with an electrode of the battery unit, instead. A combination, namely the interconnection of at least two busbars and of at least one of them with an electrode, is also comprised.

According to the invention, a clamp having at least two clamp legs is used as a part of the contact system. At least one of the clamp legs shall be elastically moveable by means of an elastic deformation of the leg itself and/or another clamp part to which it is connected such as a bridge spacing the leg from another leg or to a bridge or a transition to another leg of the clamp. The elastic moveability results in a variability of an interspace between the clamp legs so that the clamp legs are actually elastically biased with regard to any movement changing the interspace. For example, such a movement could vary the angle of a more or less V-shaped clamp or vary the interspace between the legs of a more or less U-shaped clamp by a variation of at least one of the angles and/or the shape of a transition section, namely of the base or bridge of the U-shape between the legs.

Such a clamp can be made up of several parts but may be implemented integrally in terms of the clamp legs and a clamp part therebetween, if any. Moreover, it is also possible to implement a clamp having a plurality of parts whereof for example at least one part is adapted to (and optimised in view of) an electrical contact and current transport to and through the clamp or parts thereof, namely an electrical function of the clamp. At least one further part could be adapted to (and optimised in view of) a mechanical function of the clamp, namely providing the elastic restoring force or a substantial part thereof. This is generally known in the art for example by using a spring steel structure as the mechanical part or "spring clamp" and for example a copper structure as the electrical part or "conductive clamp".

Of course, the above discussed mechanical function and electrical function can also be combined within one and the same integral clamp. Still further, within the present application, a "clamp" does not necessarily have the electrical function in terms of participating in the electrical conduction itself in a substantial or any extend. It is also conceivable to have a clamp in the present sense serving just for the mechanical function, for example to hold a busbar and an electrode together so as to establish and/or maintain an electrical contact between the busbar and the electrode.

Therein, the current or at least a major part thereof could directly go from the busbar to the electrode or vice versa and only a minor part or no current at all flow through the clamp or parts thereof. In particular, such a clamp need not be electrically conductive at all.

On the other hand, a "spring clamp" having a mechanical function as described does not necessarily provide for the complete contact force required for the electrical contact (the clamp participating therein or not) but can be combined with further means for providing an additional contribution to the contact force.

Herein, the term "clamp" shall relate to any clamp having the described properties of clamp legs with a variable interspace and a movability of at least one clamp leg (caused by elasticity) for the variation of this interspace, whether the clamp has a substantial electrical function or not.

Still further, the elastic restoring force may, but does not necessarily, intend to decrease the interspace between the clamp legs, that is for example to decrease the angle between the legs of a V-shaped clamp. Thereby the parts to be connected and brought into electrical contact are held together, for example portions of at least two busbars or at least one busbar and an electrode.

For establishing the electrical contact by means of the contact system, the busbar and the further busbar or the busbar and the electrode shall be clamped by the clamp, in other words they shall be held in close mechanical contact with each other by means of the elastic restoring force of the clamp. The surface portions of the respective parts in contact with each other are referred to as contact surfaces, herein. Thus, the at least one clamp leg has a clamp leg contact surface, the busbar has a busbar contact surface and so on. At least a part of these contacts between the contact surfaces are relevant for the electrical current flow but, as explained above, not necessarily all of them.

In order to maintain a reliable and low resistance contact, the mechanical and thus (at least in part) also electrically relevant fixing provided by the clamp shall withstand typical disturbances in the practical application and lifetime of the contact system. The inventors have found that geometrical tolerances, variations and movements are a very important factor in this respect, in particular, but not only, in the field of electrical power supply to motors and in vehicles.

Such disturbances can be caused by misalignments, errors or tolerances in mounting for example battery sets or busbar systems or other vehicle-related or consumer-related structures. They can occur during use by wear, vibrations and shocks, temperature variations and so on. In particular, the electrical parts themselves, such as battery parts, including electrodes, busbars, clamps, can be heated by electrical resistance losses ("Joule heat") during use and experience quite substantial temperature variations.

In this respect, the invention aims at a contact system tolerant in view of mechanical and geometric tolerances and variations. Hereto, the inventors have found that at least one convex protrusion on at least one of the above-mentioned contact surfaces (of a busbar, an electrode, a clamp leg) is very helpful. Therein, the convexity shall apply to two sectional planes which are vertical to each other. In other words, a convex rib extending along a direction and limited only in a direction perpendicular thereto, is convex only in one sectional plane (perpendicular to the longitudinal direction thereof), but for example a spherical protrusion is two-dimensionally convex.

If, for example, the contact surface having a protrusion and the further contact surface in contact therewith are tilted with regard to each other by a limited amount, the convex protrusion can so to say "roll" on the respective other contact surface. In other words, the mechanical contact between both contact surfaces has an "articulation character" due to the convexity of the protrusion.

In certain embodiments, the at least one convex protrusion is rounded, for example spherical, elliptical, egg-shaped, in the sectional planes already referred to. The rounded shape further improves the above-mentioned rolling or articulation properties.

If, as another example, the two contact surfaces are shifted relative to one another (in a direction substantially in a plane perpendicular to the two sectional planes of the convexity), the protrusion can slide along the other contact surface in a smoother and more continuous and controlled manner compared for example to parallel plane surfaces, namely due to its rounded shape. In particular, the location of the actual current carrying contact, where the protrusion lays against the other contact surface, will normally not jump or substantially change the shape, as it could happen with parallel plane surfaces sliding or being tilted relative to each other.

Even not rounded convex shapes can have sufficient sliding properties in this respect depending on the material chosen for the protrusion and its counterpart.

Thus, depending on the individual situation, at least two shifting directions or directions of linear tolerance or linear vibration amplitudes can be covered to a certain extent that depends on the size and structure of the respective parts of the contact system. This does not necessarily apply also to directions in the plane perpendicular to the two sectional planes of the convexity, but due to the elasticity of the clamp and a resilient reaction thereof, also other directions can be part of a geometric tolerance of the contact system.

Likewise with regard to tilting axes: the convex protrusion as a "rolling structure" can tolerate rotations of limited amount around axes substantially in the underlying plane (being perpendicular to the two sectional planes of the convexity) and the elasticity of the clamp can help therein.

Also tilting movement around a third axis can be possible due to the defined and limited location of the actual contact.

The protrusion need not be spherical but can be spherical. Nevertheless, it can be characterised at least in a rough manner by using a radius of curvature in a local sense. This relates for example to the case that the radius of curvature depends on whether the location considered is more central in the protrusion or more outward. For example, the protrusion can be less rounded in its center and somewhat more rounded outwards thereof. Included is also the case that the radius of curvature depends on the direction of the sectional plane chosen. In particular, the present explanations on the rounded shape of the protrusion mainly applies to those regions which are relevant for the contact in the normal operation of the contact system, i.e. those parts of the protrusion which are relevant for the above explained rolling or shifting movements.

The radius of curvature of the protrusion in the above sense may be at most 40 mm, wherein the following upper limits is the following in certain embodiments: 35 mm and 30 mm. Lower limits for the radius of curvature of the protrusion may be 5 mm, 10 mm, and 15 mm, in this order.

On the other hand, the respective other contact surface, namely the contact surface contacting the protrusion, may be substantially flat in a portion relevant for the contact, namely it has a flat portion for contacting the protrusion. "Flat" is not to be understood in a mathematical sense but just shall mean that the portion is not too rounded or edge-shaped. In particular, an average radius of curvature in the above sense can be used again. Further, as above, the explanations and geometrical features relate to those portions that are relevant for the contact, in particular the rolling or shifting movements explained, compare also below.

Thus, the radius of curvature of the flat portion in the above sense may be at least 100 mm, wherein the following lower limits may also be selected: 200 m, 300 m, 400 mm and even 500 mm.

Generally, the convex protrusion can "roll" over another surface portion that is for example also rounded and convex. However, the above-mentioned tolerance with regard to linear misalignments, movements or vibrations can be improved by the combination of a rounded convex protrusion on the one side and a substantially flat portion of the contact surface on the other side. This is the result of the flat portion not changing very much with a shifting along its surface and that it provides a basis for a sliding movement of the protrusion without implying large geometrical variations in other directions thereby.

In some embodiments a size of the protrusion on the one hand and the flat portion on the other hand (if existent at all) can be characterised by an average diameter in a projection into the plane perpendicular to the two sectional planes of the convexity. This average diameter does not imply a circular shape but would also characterise for example a square in terms of the average of diagonal and of the longer and the shorter side. The average diameter can be at least 10 mm or even at least 15 mm or 20 mm. In certain embodiments, it can be at most 50 mm or even at most 40 mm or 35 mm.

In a special embodiment of the invention, the respective other contact surface contacting the protrusion may not be flat as described above but concave. Beside the obvious fact that a "flat" portion under the definition above, i.e. with a sufficient radius of curvature, can be concave and nevertheless provide for the properties explained, also a concave shape having smaller radii of curvature is contemplated. In particular, such a concave shape can have an even smaller radius of curvature than the protrusion in one sectional plane and a larger one than the protrusion in a further sectional plane vertical to the first one. In other words, it is somewhat lengthy and the protrusion will contact two locations usually at the border of the concave structure. Therefore, the contact is split in two contact locations allowing for a lower contact resistivity. The contact force (or "load") is distributed between the two contact locations. Due to the lengthy oblong shape of the concave structure or "groove", the protrusion can be shifted along the longitudinal extension of the groove.

According to a further aspect of the invention, the parts to be clamped and connected by the clamp can have a simple structure, in particular a substantially square shape (meaning three-dimensionally rectangular and not withstanding rounded edges as shown in the embodiments). Of course, this applies in particular to the portion clamped by the clamp, for example for the electrode of the battery unit. Such an electrode is often specifically shaped in order to penetrate a battery casing and to reach a structure to be contacted within the battery unit. Nevertheless, an end portion relevant for the contact system can be square.

The same applies to the at least one busbar.

Naturally, a square shape in this sense does not withstand a protrusion in the above meaning and, of course, offers various options for flat portions to be contacted by a protrusion. Thus, a combination of such a square-shaped electrode and/or busbar with another part, in particular another busbar, wherein a protrusion on one of the combined parts is provided However, the clap legs or at least one of them can also be used to provide the protrusion as one of the embodiments shows. Nevertheless, in certain embodiments the current or at least a major portion thereof directly goes from a busbar or an electrode into another busbar, and then, a protrusion should be provided at the respective contact.

In one embodiment, one of the clamp legs has a hole to allow the protrusion on a busbar or electrode to reach therethrough. A protrusion on an element on one side of the clamp leg can thus contact a flat portion on the other side thereof.

As regards the elastic movability, it has been defined that at least one clamp leg shall be elastically moveable to implement the clamp function. If, for example, one leg of a U-shaped clamp would be moveable by means of an elastic deformability of the leg, a connection to the bridge of the U-shape or of the bridge itself, still the other leg could be rigid and the interspace between both legs be variable nevertheless. For example, this could be an option if the one rigid leg was fixed to a part of the battery casing or even was an integral part thereof.

In some embodiments, both or all legs are elastically moveable or deformable. Such clamps are more flexible, in particular if they are independent of the battery casing.

In some embodiments, the flat portion discussed above is, in the mounted state, substantially parallel to a direction of the longest extension of the or at least one busbar. This is advantageous with regard to a thermal expansion or contraction of the busbar resulting in variations along this longitudinal direction and thus in the already described shifting movements along the flat portion. If these are quantitatively relevant or even dominant variations to be considered, they can be tolerated in a quite substantial amount, this being easier than for example providing for such movements by elastic movements of clamp legs.

Generally, the clamp has at least two legs. In particular embodiments, it can have at least and exactly three legs, namely two on one side and at least one (in certain embodiments exactly one) on the other side of the interspace. Such a so to say tripod-like structure can very stably hold an electrode and/or a busbar or several busbars. Due to the splitting into two legs on at least one side, these legs can react independently of each other as regards their elastical motion.

The method for assembly of a system with a connector suitable to hold a busbar in contact with another conductor, such as with an electrode of a battery or with a further busbar, contains

- providing the connector, the connector comprising a clamp,
  - the clamp having a transition section connecting
  - a first leg arranged at one end of the transition section,
  - to a second leg arranged at the opposite end of the transition section,
  - the transition section and/or the first leg being elastically deformable,
  - the clamp having a first state, in which a reference part of the first leg is distanced from a reference part of the second leg by a first amount,
  - the clamp having a second state, in which the reference part of the first leg is distanced from the reference part of the second leg by a second amount that is different from the first amount,
  - the transition section and/or the first leg being further elastically deformed in the second state than in the first state, the connector further comprising a spacer, the spacer being moveable between a first position and a second position, the spacer being in the first position and being in contact with a part of the first leg when the clamp, the clamp being in the second state, providing a busbar, bringing a part of the busbar into contact with a busbar abutment surface on the spacer and moving the spacer from the first position towards the second position using the busbar or bringing a part of a busbar into a position between the first leg and the second leg and moving the spacer from the first position towards the second position.

In one embodiment, the spacer is rotated from the first position towards the second position or the spacer is moved linearly from the first position into the second position along a retraction direction or the spacer is moved in a combined rotational and linear movement from the first position into the second position.

In one embodiment the other conductor, in particular an electrode of a battery or a further busbar is provided as part of the method. In one embodiment in a step prior to bringing a part of the busbar into contact with a busbar abutment surface on the spacer a part of the other conductor is inserted into the connector.

In one embodiment in a step prior to bringing a part of the busbar into contact with a busbar abutment surface on the spacer a part of other conductor is inserted into the connector and the connector is connected to the other conductor or an element attached thereto, for example a casing of a battery.

In one embodiment the connector has a casing with an opening that at least partially can be closed with a lid, whereby the method includes the step of moving the lid from a position where it does not close the opening or closes the opening to a lesser extend into a position where it at least partially closes the opening.

In one embodiment, where the method according to the invention is used to assemble a system, whereby the system contains a further connector, in certain embodiments a further connector according to the invention, and a further electrode (or generally another conductor), whereby one end of the busbar is in contact with the electrode and held in contact with the electrode by the connector and whereby a second end of the busbar is in contact with the further electrode and held in contact with the further electrode by the further connector, a part of the busbar is brought into contact with a busbar abutment surface on the spacer of the connector at the same time as bringing a further part of the busbar into contact with a busbar abutment surface on the spacer of the further connector.

In one embodiment, where the method according to the invention is used to assemble a system, whereby the system contains a further connector, alternatively a further connector according to the invention, and a further electrode (or generally another conductor), whereby one end of the busbar is in contact with the electrode and held in contact with the electrode by the connector and whereby a second end of the busbar is in contact with the further electrode and held in contact with the further electrode by the further connector, a part of the busbar is brought into a position between the first leg and the second leg of the connector at the same time as bringing a further part of the busbar into a position between the first leg and the second leg of the further connector.

In one embodiment, the busbar is a longitudinal object that extends along a longitudinal axis. In one embodiment, the cross-sectional area of the busbar has the same size in the majority of sections of the busbar perpendicular to the longitudinal axis, in specific embodiments in the overwhelming majority (more than 75%) of the cross-sections of the busbar perpendicular to the longitudinal axis and in particular embodiments in all cross-sections of the busbar perpendicular to the longitudinal axis.

In one embodiment, the shape of the cross-sectional area of the busbar is the same in the majority of sections of the busbar perpendicular to the longitudinal axis, in specific embodiments in the overwhelming majority (more than 75%) of the cross-sections of the busbar perpendicular to the longitudinal axis and in particular embodiments in all cross-sections of the busbar perpendicular to the longitudinal axis.

In one embodiment, the cross-sectional area of the busbar is rectangular or round or elliptical in the majority of sections of the busbar perpendicular to the longitudinal axis, in specific embodiments in the overwhelming majority (more than 75%) of the cross-sections of the busbar perpendicular to the longitudinal axis and in particular embodiments in all cross-sections of the busbar perpendicular to the longitudinal axis.

In one embodiment, the cross-sectional area of the busbar is rectangular and has a width and a height in the majority of sections of the busbar perpendicular to the longitudinal axis, in certain embodiments in the overwhelming majority (more than 75%) of the cross-sections of the busbar perpendicular to the longitudinal axis and in particular embodiments in all cross-sections of the busbar perpendicular to the longitudinal axis, whereby the width is 10 mm to 50 mm, alternatively 20 mm to 30 mm and/or the height alternatively is 1.5 mm to 5 mm, alternatively 2 mm to 3.5. The cross section can be between 50 $mm^2$ and 120 $mm^2$.

In one embodiment, the length of the busbar is more than 20 mm, alternatively more than 30 mm, 40 mm or even 50 mm. In one embodiment, the length of the busbar is smaller than 500 mm, alternatively smaller than 400 mm, 300 mm even smaller than 250 mm.

In one embodiment, this busbar has a thermally and electrically well conducting material, in particular a material having a conductivity of at least 107 S/m (at 20° C.). Some options are copper, in particular high purity electrical grade copper (ETP copper) or aluminum, specifically electrical grade aluminum (such as 1000 or 6000 series).

In a possible embodiment, the busbar has a core that is made from a core material and has an insulation whereby the insulation encapsules at least a part of the core. The above also holds for the core material, namely that a thermally and electrically well conducting material may be used.

In one embodiment, the busbar that has a core and an insulation has one free end that is not encapsulated by the insulation and has a second end that is arranged opposite to the first end that also has no insulation. In one embodiment, the length of the free end that has no insulation is more than 5% of the total length of the busbar and is less than 30% of the total length of the busbar.

In one embodiment, the electrode has an end portion.

In one embodiment, the end portion of the electrode is a longitudinal object that extends along a longitudinal axis. In one embodiment, the cross-sectional area of the end portion of the electrode has the same size in the majority of sections of the busbar perpendicular to the longitudinal axis, in some embodiments in the overwhelming majority (more than 75%) of the cross-sections of the end portion of the electrode perpendicular to the longitudinal axis and even more in certain embodiments in all cross-sections of the end portion of the electrode perpendicular to the longitudinal axis.

In one embodiment, the shape of the cross-sectional area of the end portion of the electrode is the same in the majority of sections of the busbar perpendicular to the longitudinal axis, in specific embodiments in the overwhelming majority (more than 75%) of the cross-sections of the end portion of the electrode perpendicular to the longitudinal axis and even more in some embodiments in all cross-sections of the end portion of the electrode perpendicular to the longitudinal axis.

In one embodiment, the cross-sectional area of the end portion of the electrode is rectangular or round or elliptical in the majority of sections of the busbar perpendicular to the longitudinal axis, in particular embodiments in the overwhelming majority (more than 75%) of the cross-sections of the end portion of the electrode perpendicular to the longitudinal axis and even more in certain embodiments in all cross-sections of the end portion of the electrode perpendicular to the longitudinal axis.

In one embodiment, the cross-sectional area of the end portion of the electrode is rectangular and has a width and a height in the majority of sections of the busbar perpendicular to the longitudinal axis, in some embodiments in the overwhelming majority (more than 75%) of the cross-sections of the end portion of the electrode perpendicular to the longitudinal axis and in certain embodiments in all cross-sections of the end portion of the electrode perpendicular to the longitudinal axis. As regards the width and the height and the resulting cross section of the electrode end portion, the quantitative values given for the busbar apply as well.

In one embodiment, the length of the end portion of the electrode is more than 20 mm and it can for example be up to 50 mm long.

In one embodiment, the end portion of the electrode has a core that is made from a core material and has an insulation whereby the insulation encapsules at least a part of the core.

As regards a thermally and electrically well conducting material for the electrode and in particular its end portion and for the core material, if any, the explanations with regard to the busbar apply as well.

In one embodiment, the busbar is a solid object that is free from through-holes. In one embodiment, the end portion of the electrode is a solid object that is free from through-holes.

In one embodiment, the busbar and the electrode are not connected to each other by way of screws, bolts, nails, rivets or by way of welding or soldering. In one embodiment, the busbar and the end of the electrode are held in place by the clamp.

In one embodiment, the busbar is a longitudinal object that extends along a longitudinal axis and the end portion of the electrode is a longitudinal object that extends along a longitudinal axis. In one embodiment, the longitudinal axis of the busbar is parallel to the longitudinal axis of the electrode. In these embodiments, embodiments where the busbar and the end portion of the electrode extend away from the area where they are in contact in the same direction are feasible. In such an embodiment, the end of the electrode would extend in one direction and the busbar would extend back into the direction the end of the electrode extended from. In an alternative of these embodiments, the busbar extends away from the area where they are in contact into one direction and the end portion of the electrode extends into a different direction that is not parallel to the one direction. In such an embodiment, the busbar could be in line with the end of the electrode. In alternative embodiments, the longitudinal axis of the busbar is arranged at an angle between 20° and 160°, alternatively in an angle of 45° to 135°, alternatively in an angle from 75° to 105° and alternatively at an angle of 90° to the longitudinal axis of the end of the electrode.

In one embodiment, the busbar is a longitudinal object that extends along a longitudinal axis and the further busbar is a longitudinal object that extends along a longitudinal axis. In one embodiment, the longitudinal axis of the busbar is parallel to the longitudinal axis of the further busbar. In these embodiments, embodiments where the busbar and further busbar extend away from the area where they are in contact in the same direction are feasible. In such an embodiment, the further busbar would extend in one direction and the busbar would extend back into the direction the further busbar extended from. In an alternative of these embodiments, the busbar extends away from the area where they are in contact into one direction and the further busbar extends into a different direction that is not parallel to the one direction. In such an embodiment, the busbar could be in line with the further busbar. In alternative embodiments, the longitudinal axis of the busbar is arranged at an angle between 20° and 160°, alternatively in an angle of 45° to 135°, alternatively in an angle from 75° to 105° and alternatively at an angle of 90° to the longitudinal axis of the further busbar.

The invention also relates to a battery set comprising a plurality of battery units, namely at least two, each of which having at least two electrodes. Here, a busbar is provided for electrically connecting at least two of these electrodes wherein each one of the two belongs to another battery unit. At least one of the above described contact systems serves for connecting the busbar with at least one of the electrodes. Naturally, there is alternatively one contact system for each electrode participating in the interconnection and two such contact systems share their busbar.

Alternatively, their busbars are interconnected by a further contact system (to which both busbars belong as well).

In one embodiment the potential difference between one electrode of a battery unit and the further electrode of the battery is more than 200 V or even 250 V, 300 V or 350 V. In one embodiment the potential difference between one electrode of a battery unit and the further electrode of the battery is less than 1200 V, alternatively less than 1100 V, 1000 V or even less than 900 V. In one embodiment the capacity of the battery set is more than 20 kWh.

In one embodiment the battery set is used as a battery of an electric car.

BRIEF DESCRIPTION OF THE DRAWINGS

The foregoing aspects and many of the attendant advantages will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

Figure 1:
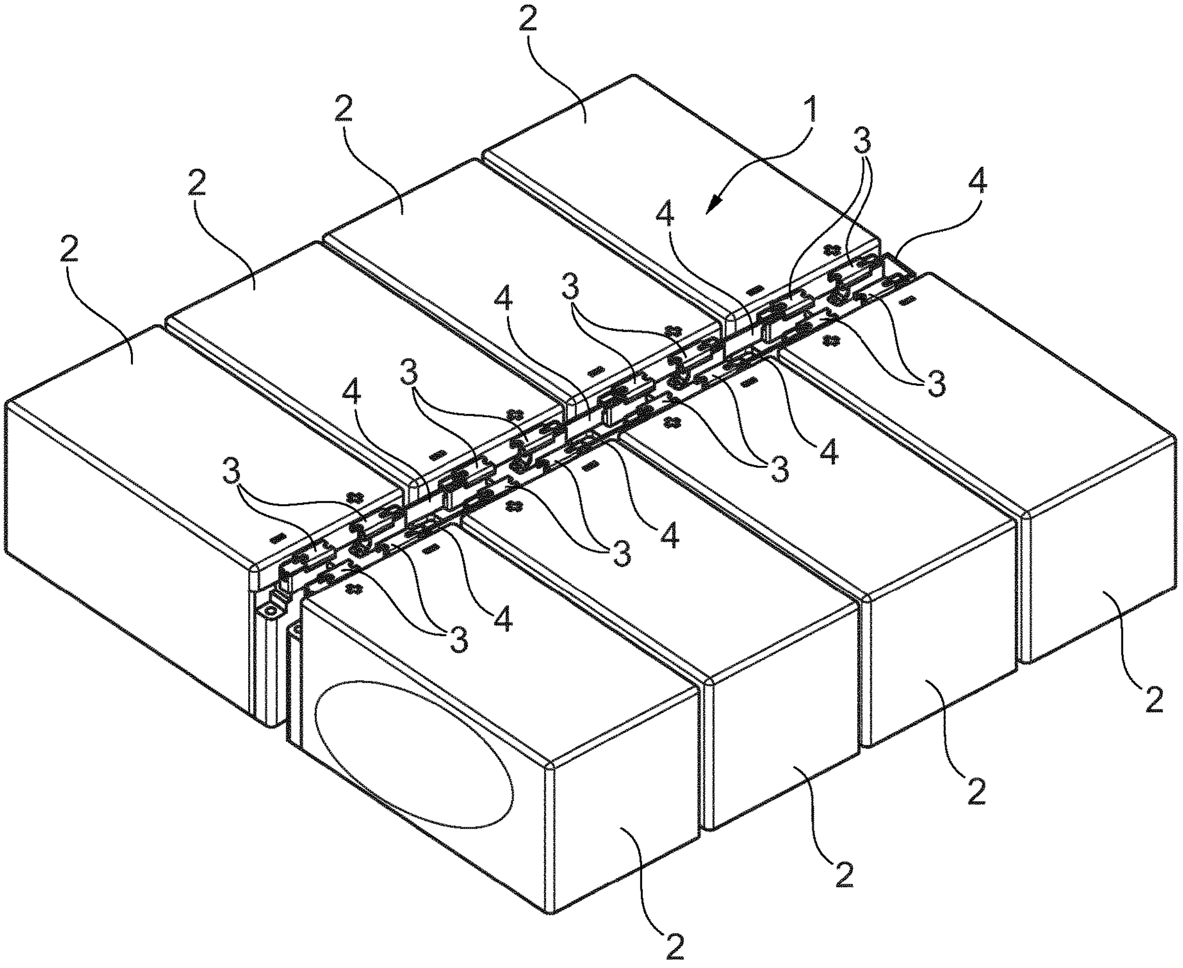
FIG. 1 a schematic perspective view onto an array of battery blocks.

FIG. 1 shows an array 1 of battery blocks 2. In the embodiment shown in FIG. 1, the array 1 has eight battery blocks 2. Four battery blocks 2 each are grouped into one line of battery blocks 2. The two lines of four battery blocks 2 each are arranged in parallel to each other.

Each battery block 2 can comprise individual battery cells, not visible in the FIG., and connected for example in series. The term battery unit as used herein can relate to such a battery block, but also to a battery cell therein whereas the term battery set can relate to the array 1 or to the battery block 2.

Each battery block has two electrodes (not shown in FIG. 1), an electrode for providing the negative potential and one electrode for providing the positive potential. For each electrode, each battery block 2 is provided with a connector 3. Hence each battery block 2 has two connectors 3 in total. Between a connector 3 of one battery block 2 and a neighbouring connector 3 of a neighbouring battery block 2, a busbar 4 is arranged. The busbar 4 arranged at the end of the lines of battery blocks 2 is U-shaped. The other busbars 4 are bar-shaped.

Figure 2:
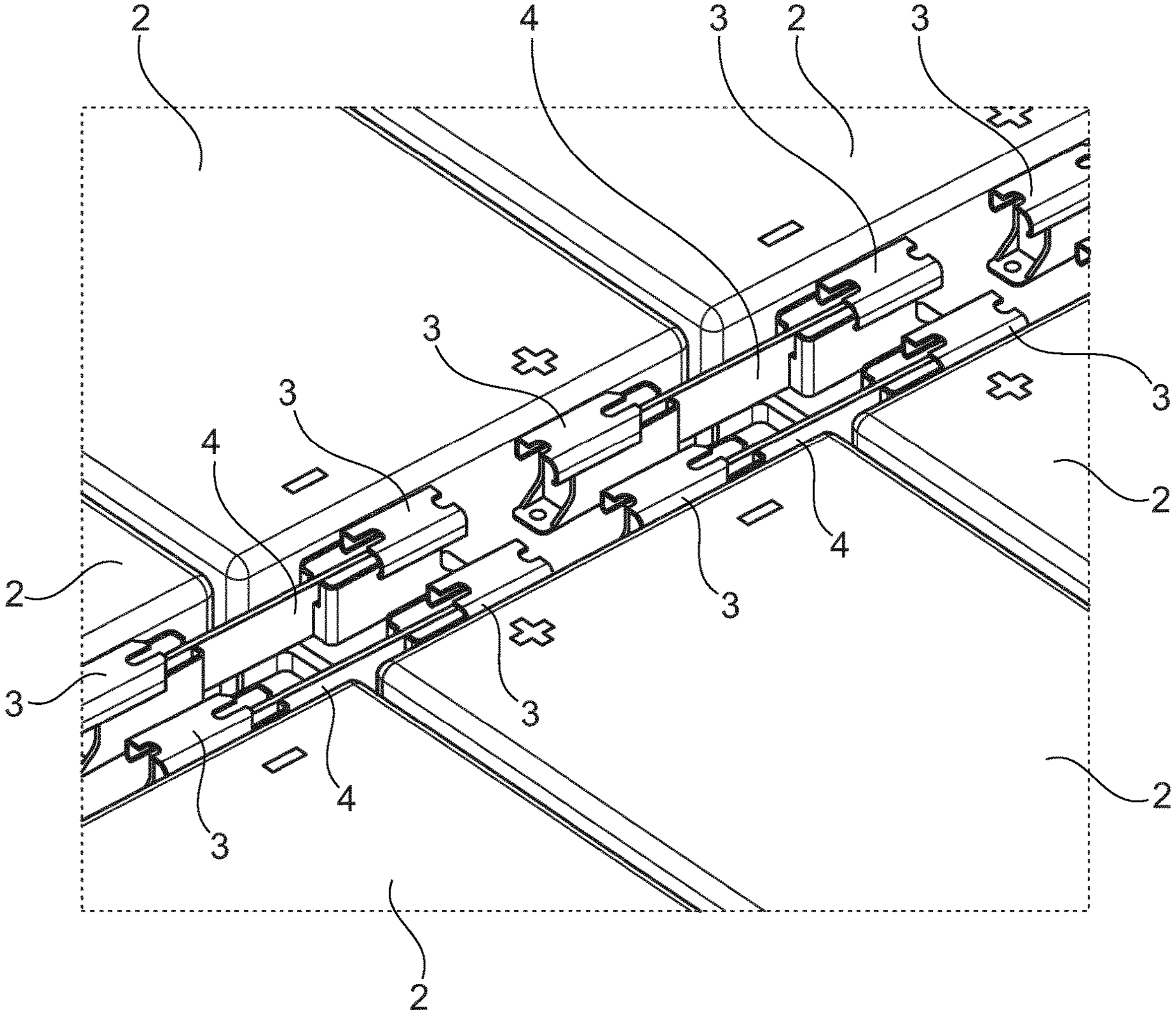
FIG. 2 a schematic enlarged perspective view of a portion of the array of battery blocks of FIG. 1.

For ease of reference, the connectors 3 shown in FIG. 1 are drawn with their lids 13 open. The same goes for FIG. 2.

Figure 3:
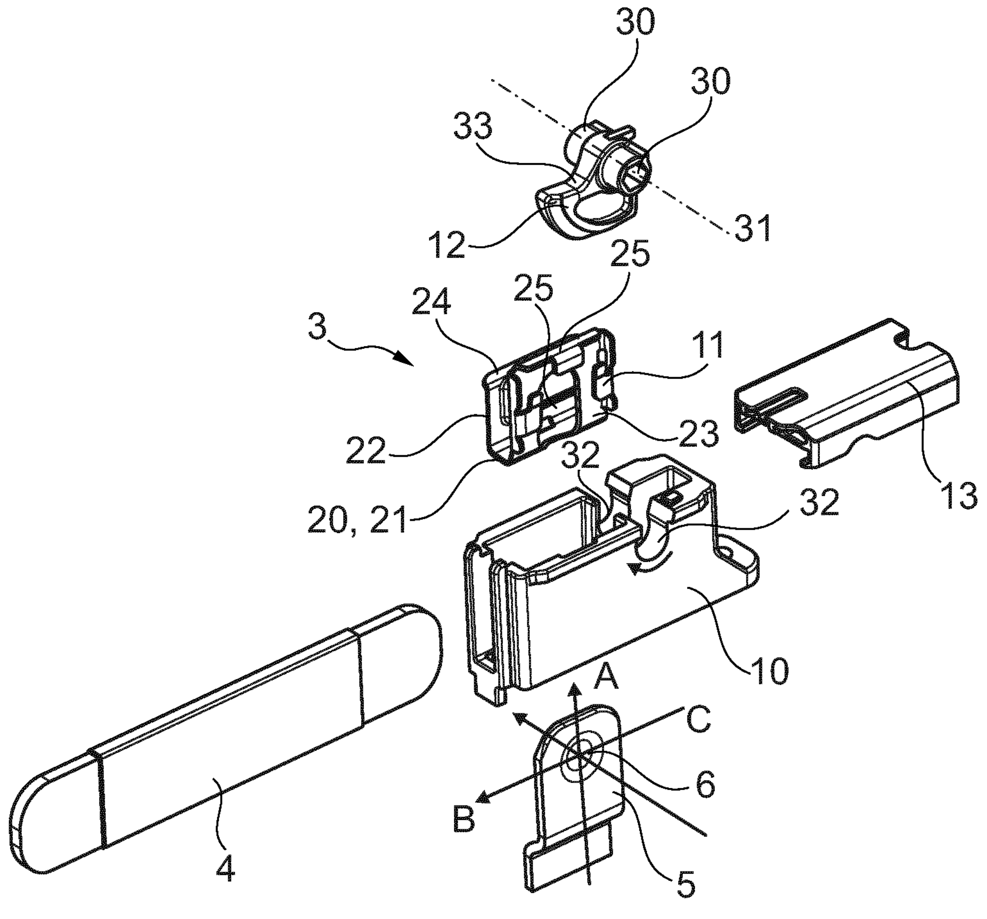
FIG. 3 a schematic exploded perspective view of the elements of a connector, an electrode and a busbar.

The connector 3 as best seen in FIG. 3 contains a casing 10, a clamp 11, a spacer 12 and a lid 13. FIG. 3 additionally shows an electrode 5 of a battery block and a busbar 4.

The clamp 11 has a transition section 20 that in the embodiment shown in FIG. 3 is made up of a bridge 21. The clamp 11 has a first leg 22 arranged at one end of the transition section 20. Clamp 11 also has a second leg 23 that is arranged at the opposite end of the transition section 20. The first leg has a reference part 24 that in the embodiment shown in FIG. 3 is a longitudinal tip. The second leg 23 in the embodiment shown in FIG. 3 also has a reference part 25 that in the embodiment shown also is a longitudinal tip. The second leg 23 in the embodiment shown in FIG. 3 has an opening 26. The opening 26 allows the electrode 5 to be arranged on one side of the second leg 23 and for a spherical protrusion 6 of the electrode 5 to protrude through the opening 26 into the space between the first leg 22 and the second leg 23 (see for example FIG. 13).

It can be seen that protrusion 6 projects on and from a substantially square electrode contact surface and is adapted to lay against and contact a busbar contact surface, namely an end portion of busbar 4. This busbar contact surface is, in contrast to the protrusion, flat.

Clamp 11 is made by way of cutting and bending from a metal blank and hence is a unitary piece. The transition section 20, the first leg 22 and the second leg 23 are elastically deformable.

Figure 4:
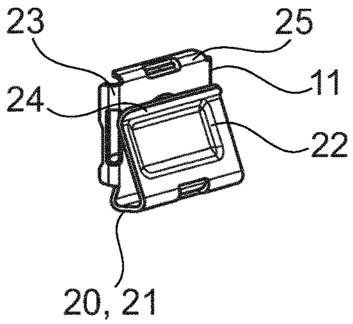
FIG. 4 a schematic exploded perspective view showing a clamp and a casing of a connector.
Figure 4:
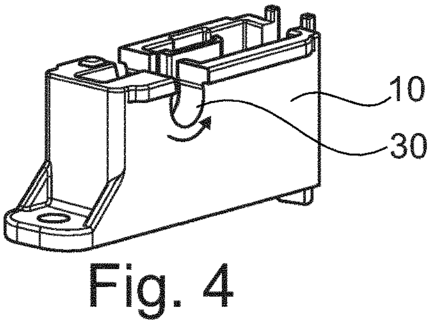
Figure 5:
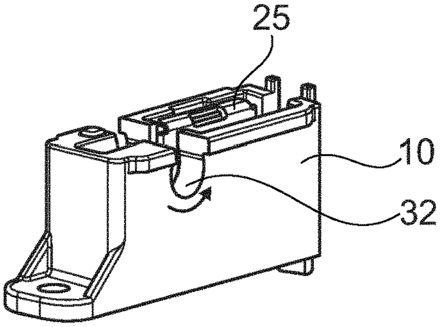
FIG. 5 a schematic perspective view showing the clamp and the casing of FIG. 4 in assembled form.
Figure 6:
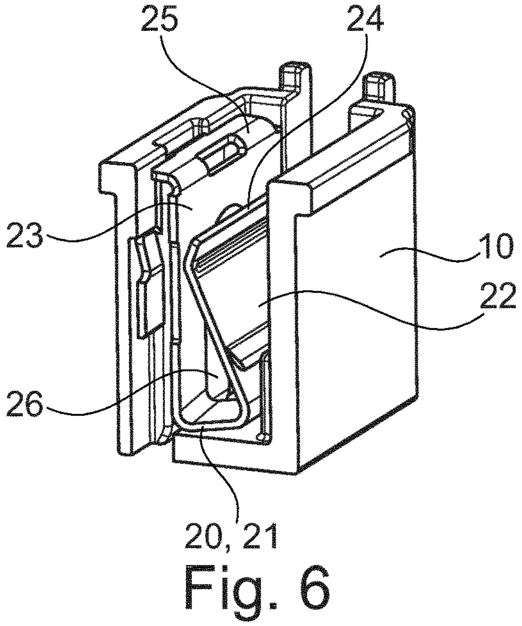
FIG. 6 a schematic sectional perspective view showing the clamp and the casing of FIG. 4 in assembled form.

The clamp 11 has a first state shown in FIG. 3, FIG. 4 and FIG. 6 for example. In this first state, the reference part 24 and the reference part 26 are distanced from each other by a first amount. The clamp has a second state (see FIG. 7 for example), in which the reference part 24 and the reference part 25 are distanced from each other by second amount that is different from the first amount, namely larger than the second amount.

Figure 7:
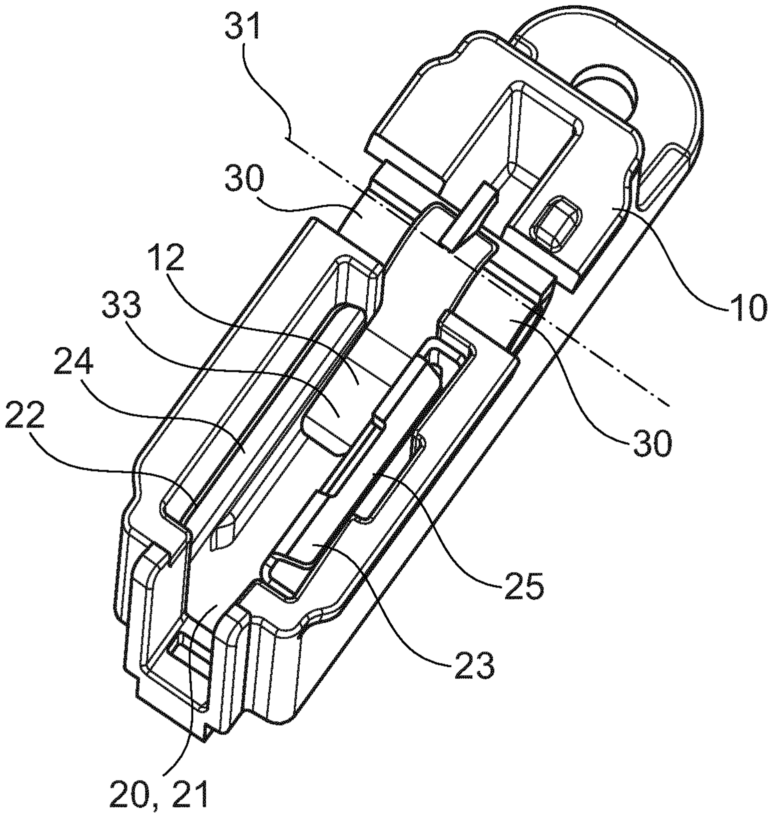
FIG. 7 a schematic perspective view onto the clamp and the casing of FIG. 4 in assembled form with a spacer.

As can be seen when comparing FIG. 6 and FIG. 7, the transition section, the first leg and the second leg are not elastically deformed in the first state. In the first state, the clamp 11 takes up its normal form. At least one of the group of elements containing the transition section 20, the first leg 22 and the second leg 23 are further elastically deformed (more elastically deformed) in the second state than in the first state. As can be seen when comparing FIG. 6 and FIG. 7, the distance between the reference part 24 and the reference part 25 has been increased from the first state shown in FIG. 6 to the second state shown in FIG. 7. This increase in distance is achieved by elastically deforming at least one of the elements of the group that contains the transition section 20, the first leg 22 and the second leg 23.

Figure 15:
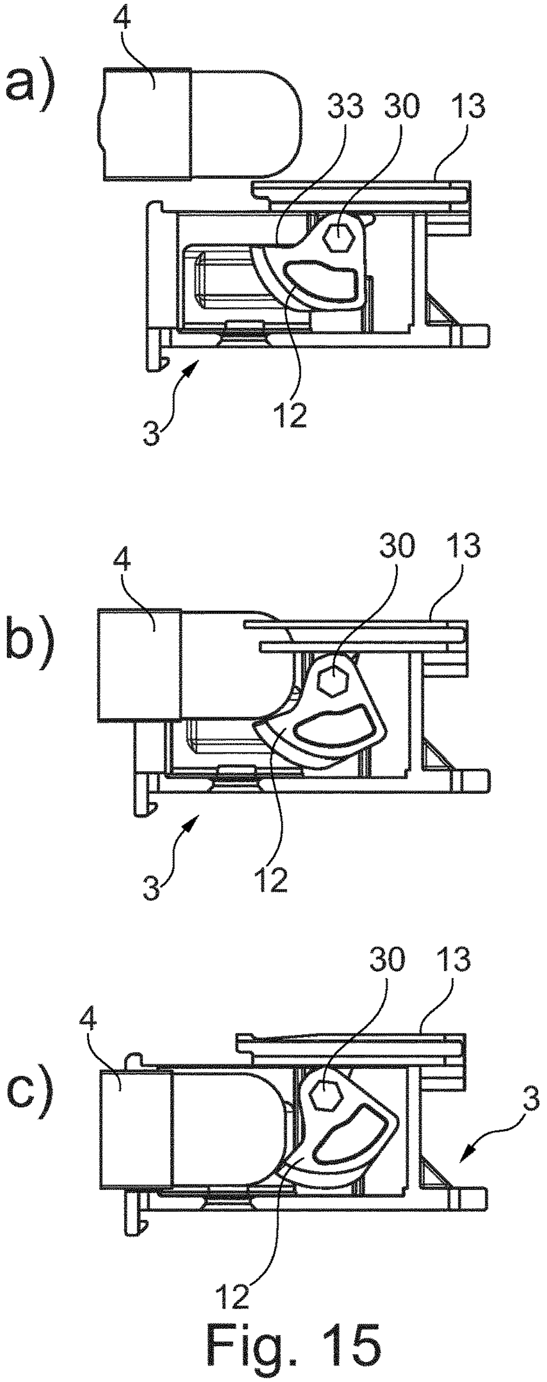
FIG. 15*a,b,c* a sequence of sectional views onto a connector and a part of a busbar showing assembly steps of the part of the busbar and the connector.

The spacer 12 is movable between a first position best shown in FIG. 7 and FIG. 15*a* and a second position (best shown in FIG. 15*c*). As can best be seen from FIG. 7, the spacer 12 when it is in the first position is in contact with a part of the first leg 22 when the clamp 11 is in the second state (see FIG. 7).

As can best be seen from FIG. 15*a*, FIG. 15*b* FIG. 15*c*, the spacer 12 is designed to be rotated from the first position into the second position.

FIG. 3 and FIG. 7 for example show that two rods 30 extend from the spacer 12 along a rotational axis 31. As can be seen from FIG. 7 and FIG. 8, the rods 30 are arranged in holes 32 of the casing 10 and allow the spacer 12 to rotate relative to the casing 10 about the rotational axis 31.

Figure 8:
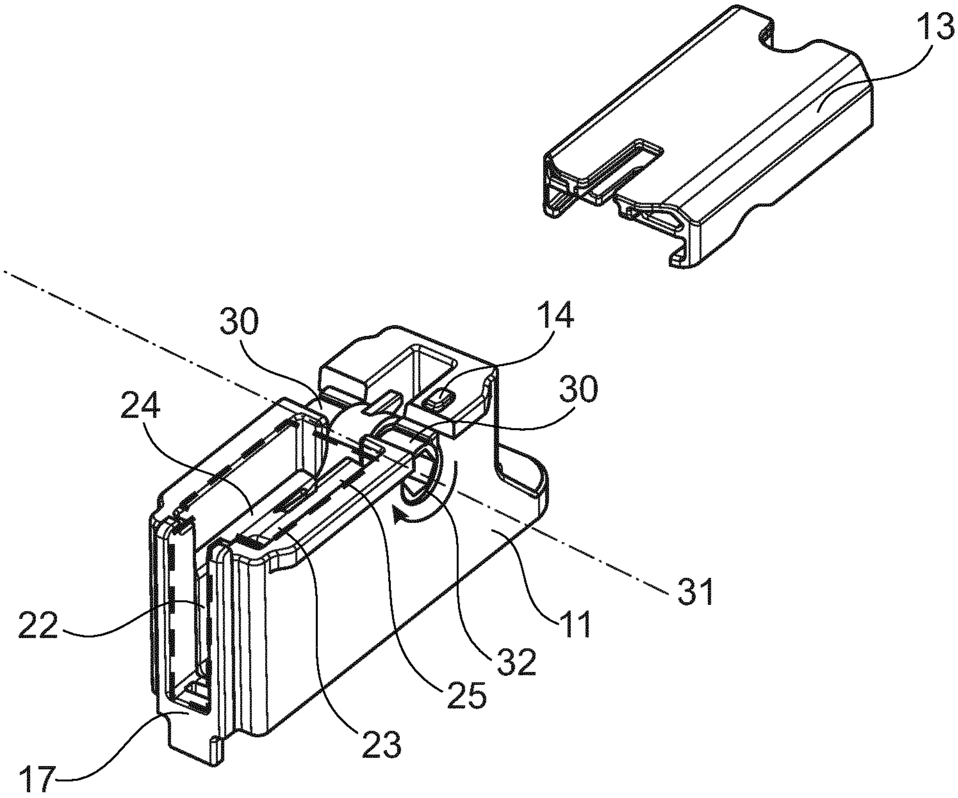
FIG. 8 a schematic exploded perspective view onto the clamp and the casing and the spacer of FIG. 7 in assembled form and a lid.
Figure 9:
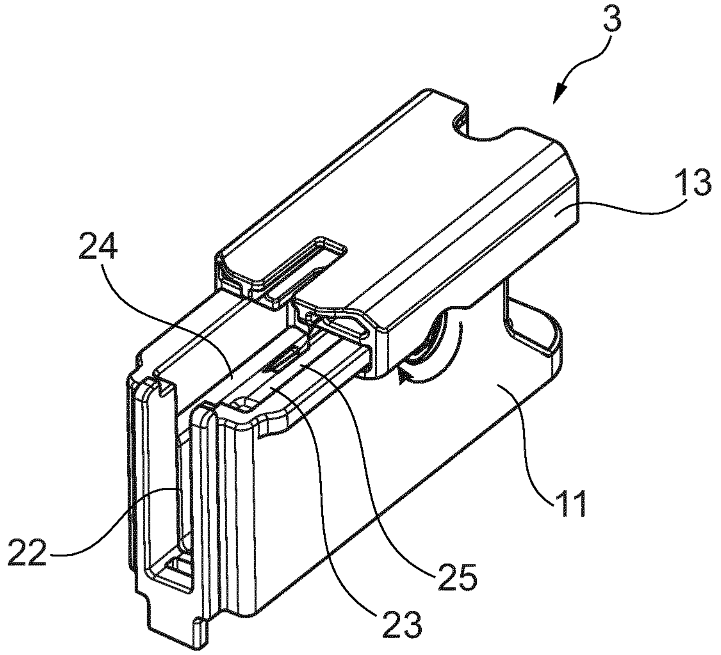
FIG. 9 a schematic perspective view onto the clamp and the casing and the spacer and the lid of FIG. 8 in assembled form.
Figure 12:
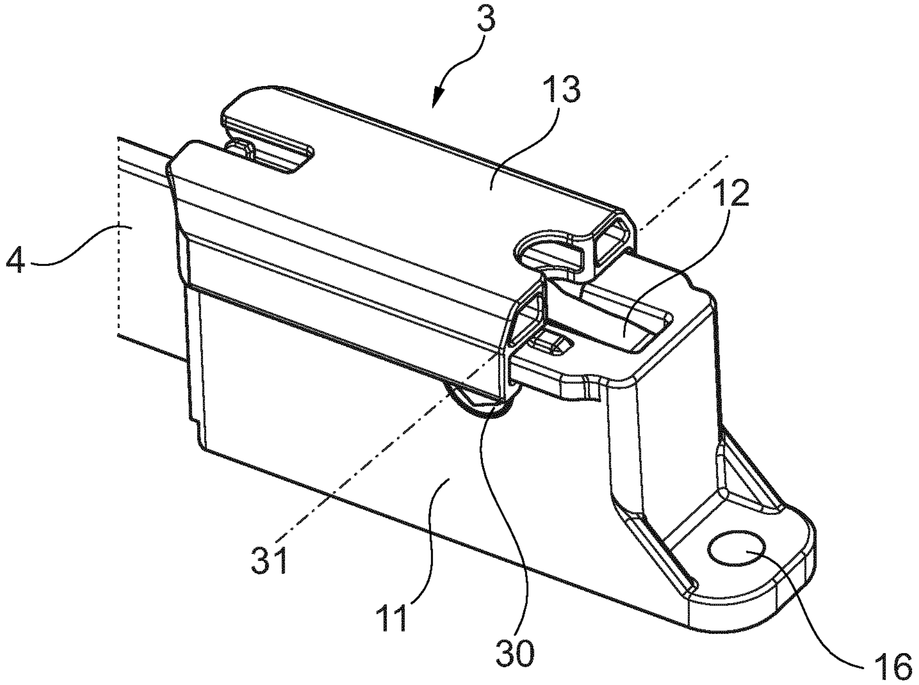
FIG. 12 a schematic perspective view onto a connector and a part of a busbar.

FIG. 8, FIG. 9 and FIG. 12 show that the connector 3 has a lid 13. The lid 13 can be arranged in an open position (FIG. 9) on the casing 10. FIG. 12 shows the closed position of the lid 13 on the casing 10. On the casing 10, a knob 14 can be provided that holds the lid 13 in the open position (FIG. 9) and that needs to be overcome by the lid 13 as it is moved from the open position (FIG. 9) to the closed position (FIG. 12). As shown in FIG. 12, the knob 14 can also be used to hold the lid 13 in the closed position. The knob 14 is so to say a part of an elastic latch mechanism, the lid 13 providing for the required elasticity.

Figure 10:
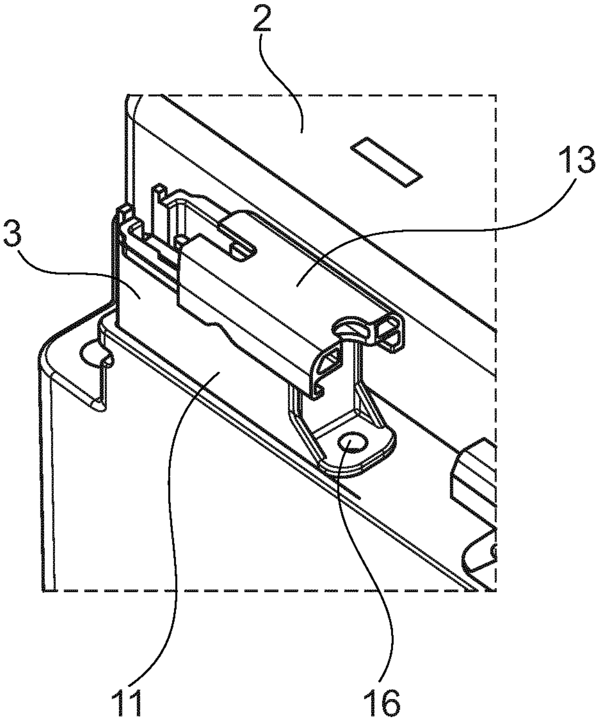
FIG. 10 a schematic perspective view onto a part of a battery block with a connector attached to it from a first perspective.
Figure 11:
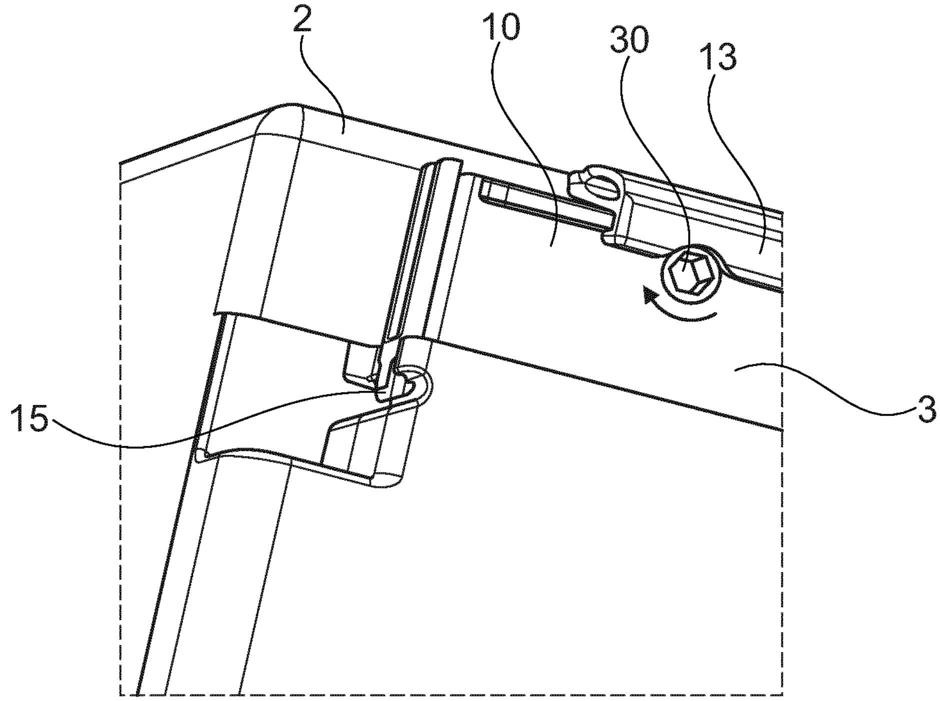
FIG. 11 a schematic perspective view onto the part of a battery block with the connector attached to it of FIG. 10 from a second perspective.

FIGS. 10 and 11 show that the connector 3 can be arranged at an end portion of the battery block 2. On one end, the connector 3 can have a projection 15 that in a form-fit manner engages with a recess on the battery block 2 (see FIG. 11). The casing 10 of the connector 3 can have a through-hole 16 that can be used to bolt the casing 10 to the battery block 2.

Figure 13:
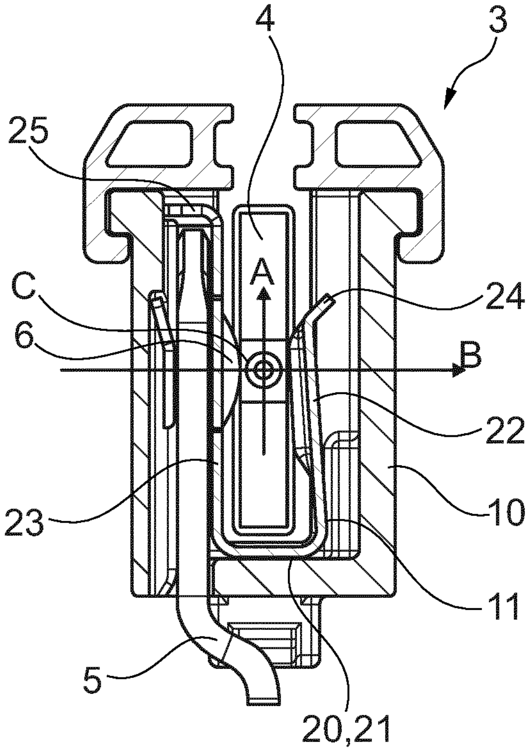
FIG. 13 a schematic sectional view onto the connector and the part of the busbar of FIG. 12 and an electrode.

FIG. 12 shows a perspective view onto a connector 3 and a part of a busbar 4. To simplify the view of FIG. 12, the electrode 5 has not been drawn. FIG. 13 shows a sectional view onto the connector 3 and the part of the busbar 4 of FIG. 12 together with the electrode 5.

FIG. 13 shows that the flat end of the busbar 4 is in contact with the spherical protrusion 6 of the electrode 5. The first leg 22 rests against the busbar 4 from the opposite side compared to the protrusion 6. The first leg 22 hence holds the busbar 4 in contact with the protrusion 6 of the electrode.

FIG. 13 also shows that the protrusion 6 of the electrode 5 protrudes through the opening 26 in the second leg 23. The main body of the electrode 5 is arranged on the opposite side of the leg 23 compared to the side that the end of the busbar 4 is arranged on.

Figure 16:
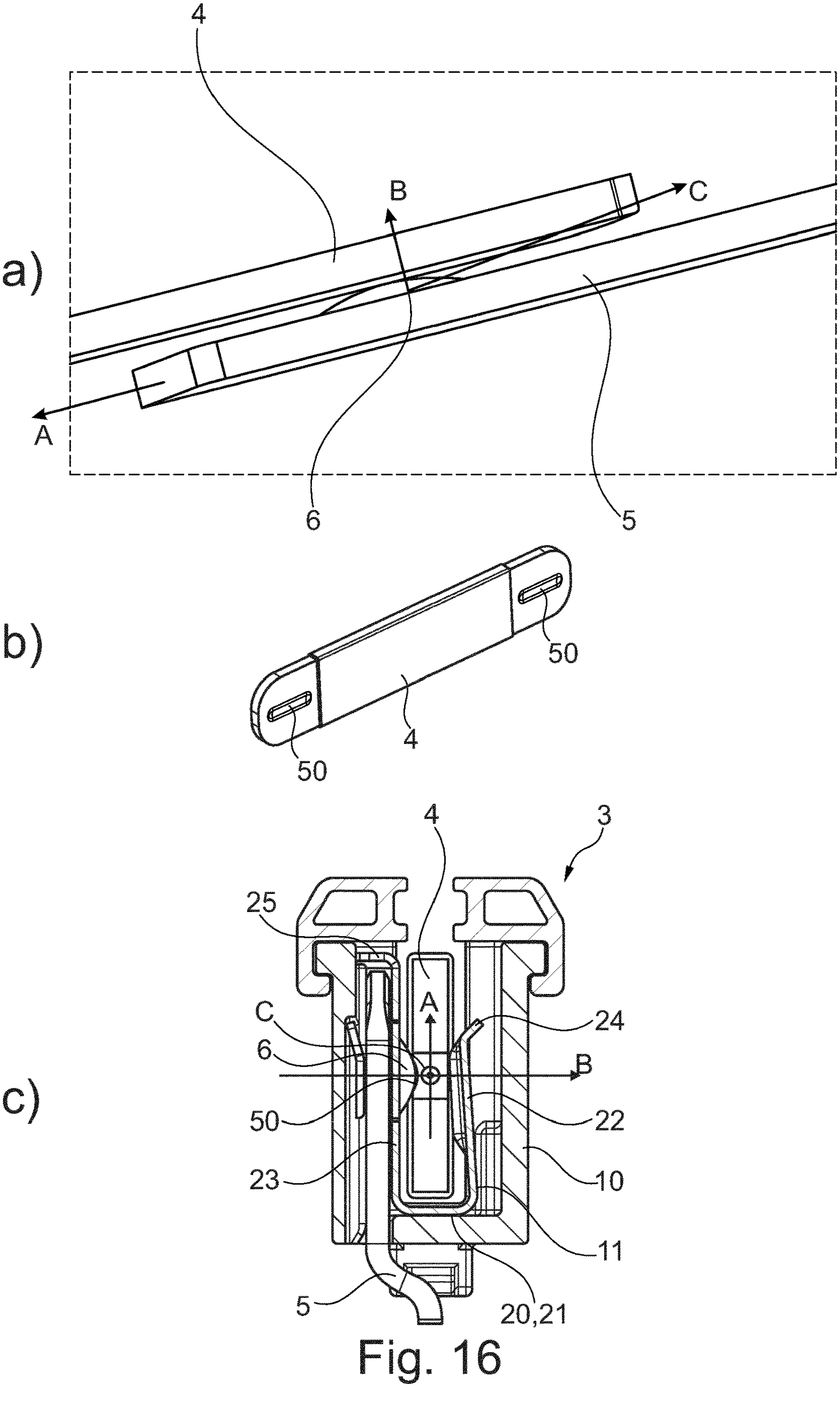
FIG. 16*a* a schematic perspective view of an end of a busbar in contact with an electrode.
FIG. 16*b* a prospective view of a modified version of the busbar 4 of FIG. 3.
FIG. 16*c* a modified version of the schematic sectional view of FIG. 13, but with the busbar 4 of FIG. 16*b;*

Given the shape of the protrusion 6 of the electrode 5, the end of the busbar can swivel about the axis A, the axis B and the axis C (which points out of the plane of the paper) to a certain degree without losing contact to the protrusion 6 or changing the very contact location at the tip of protrusion 6 in an uncontrolled manner (see also FIG. 16). Further, shifts along the directions of the axis A and C are possible by a sliding of protrusion 6 on the flat busbar contact surface. The shape of the protrusion 6 and the arrangement of the busbar 4 in contact with the protrusion 6 hence allows for a large degree of tolerance compensation.

Figure 14:
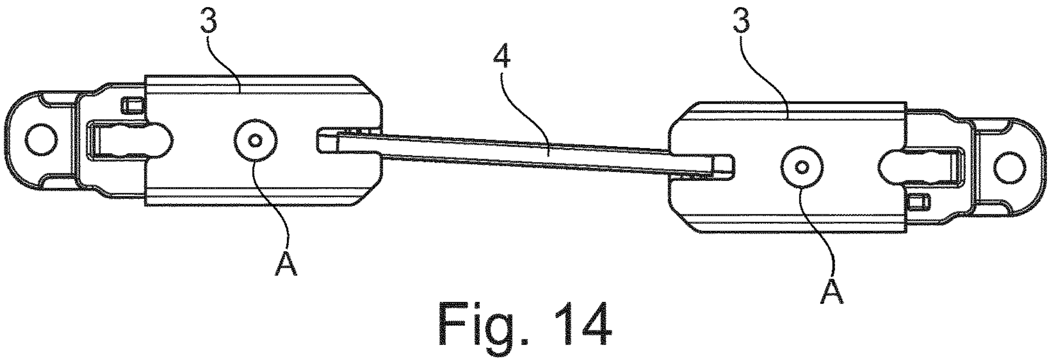
FIG. 14 a schematic top view onto two connectors and a busbar arranged between the two connectors.

FIG. 14 shows a top view onto two connectors 3 with a busbar 4 arranged between the two connectors 3. FIG. 14 shows, how the busbar 4 has swivelled about the axis A in FIG. 13 in order to compensate a misalignment of the connectors 3.

The sequence of FIGS. 15*a*, 15*b*, 15*c* shows assembly steps of a system with a connector and a busbar. The electrode that is for example visible in FIG. 13 has been purposefully left out of the FIGS. 15*a*, 15*b*, 15*c* for a better overview. In FIG. 15*a*, the end of the busbar 4 is arranged outside the connector 3. FIG. 15*a* shows that there is a clearance between the opening 17 of the casing 10 and a busbar abutment surface 33 on the spacer 12. FIG. 15*b* shows the situation where the end of the busbar 4 has been inserted through the opening 17 into the casing 10 to the extent that it comes into contact with the busbar abutment surface 33. FIG. 15*c* shows the situation where the end of the busbar 4 has been fully inserted into the casing 10 by being moved from the situation shown in FIG. 15*b* to the situation shown in FIG. 15*c* leading to the spacer 12 being rotated from the first position (FIG. 15*a*) to the second position (FIG. 15*c*).

In a next step in the situation shown in FIG. 15*c*, lid 13 can be closed. The lid 13 can provide a stopper against the busbar 4 being pulled out of the connector 3.

FIG. 8 by way of a dotted line shows the extent of the opening 17 into which the end of the busbar 4 can be inserted into the casing 10.

As can be seen from FIG. 13, part of the busbar 4 is arranged between the reference part 24 and the reference part 25.

Figure 49:
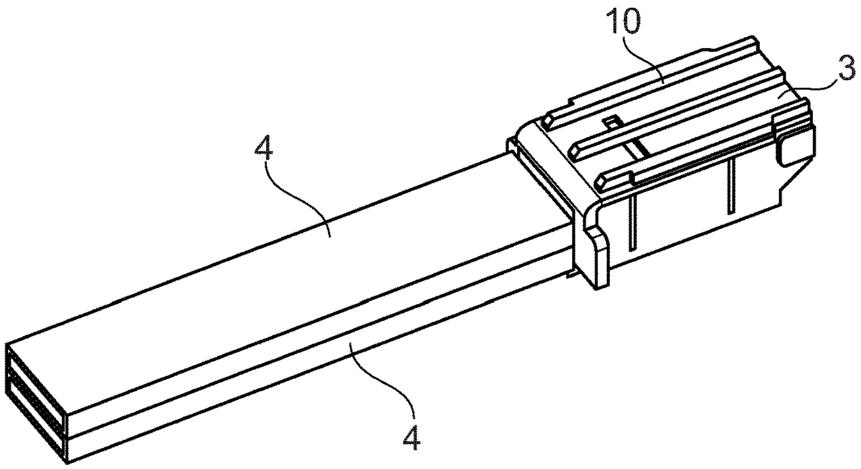
FIG. 49 a schematic perspective view onto a connector and a busbar and a further busbar.
Figure 57:
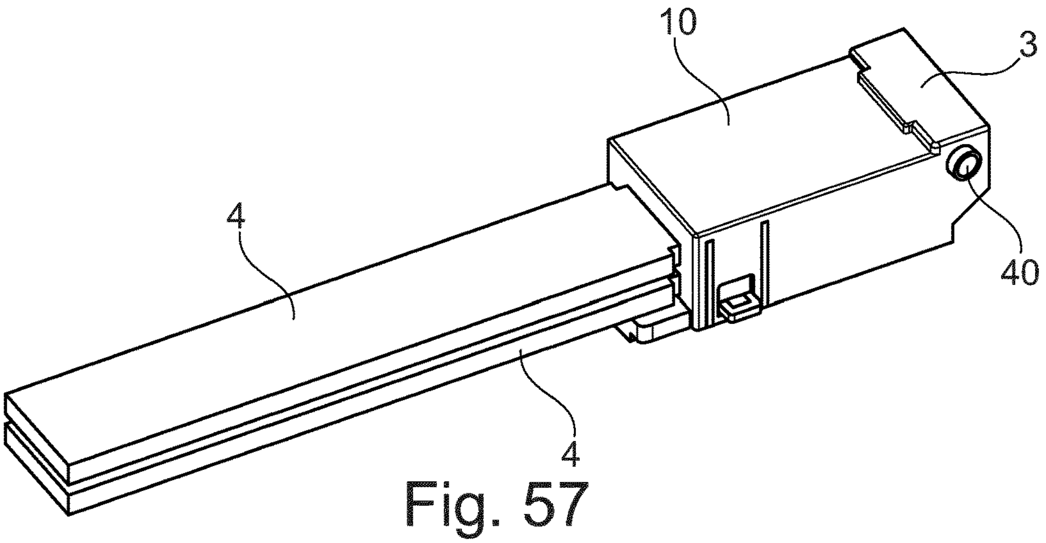
FIG. 57 a schematic perspective view onto a connector and a busbar and a further busbar.

FIG. 16*a* shows a schematic perspective view of an end of a busbar 4 in contact with an electrode 5. The purpose of FIG. 16*a* is to highlight that the protrusion 6 as provided on the electrode 5 is a suitable means to allow the busbar 4 and the electrode 5 to perform relative movements, especially rotations about the three perpendicular axes A, B, C without the surface contact between the end of the busbar 4 and the electrode 5 being influenced. The embodiment shown in FIG. 16*a* shows the busbar 4 and the electrode 5 to be arranged in line, which means that the longitudinal axis of the busbar 4 is parallel to the longitudinal axis of the electrode 5 and/or parallel to the plane from which the protrusion 6 projects. Similar arrangements are shown in FIG. 23, FIG. 52, FIG. 65, FIG. 74, FIG. 82. It is apparent to the person skilled in the art, however, that the ability to keep the good surface contact between the end of the busbar 4 and the electrode 5 by means of the protrusion 6 even in situations, where the end of the busbar 4 and the electrode 5 tilt relative to each other about one of the perpendicular axes A, B, C will also be kept for those embodiments, where the busbar 4 is arranged perpendicular to the electrode 5 for example in the design shown in FIG. 13 or those embodiments, where a busbar and a further busbar are pointing in the same direction as shown in FIG. 49, FIG. 57.

The protrusion 6 could of course also be an element of the busbar 4 instead of the electrode 5. This would not change the contents and discussion of FIG. 16*a*. This also applies with regard to FIGS. 3 to 15. Moreover, the protrusion could in some embodiments also be integrally formed in at least one of the clamp legs, for example in both of them, these protrusions contacting the busbar contact surface and the electrode surface, respectively. In such embodiments, the clamp can also serve as an electrically conducting element so that the contact between at least one of the clamp legs and the busbar or the electrode would carry a substantial part of the current. In many cases, however, this is not the case in view of the larger cross sections of the electrode and, in particular, the busbar.

Further, generally the design of the busbar and/or the electrode is as simple as possible. Such a simple busbar design and electrode design (at least of the electrode portion for making the contact and outside of the battery casing) can be square as shown, wherein shapes with somewhat rounded edges and protrusions as shown are included.

It goes without saying, that further elements of the connector 3 additional to the clamp, the bus bar and the electrode will be adapted to the tolerances (with regard to rotations and shifts) contemplated by means of sufficient clearances. Since the casing predominantly has functions of protecting, insulating and holding the electrically relevant elements, this does not imply substantial differences and is clear to the person skilled in the art.

The busbar 4 as discussed so far and as shown in FIG. 3 has a flat portion to be contacted by the protrusion 6. FIG. 16*b* illustrates a modified version of the busbar 4, namely having two oval concave grooves 50 wherein the transition from the flat surface portions there around to the grooves 50 is somewhat rounded. As shown in FIG. 16*c* which can be compared to FIG. 13 and is a modified version thereof, the protrusion 6 is adapted for engaging into the respective groove 50 but the radius of curvature of the concavity of the groove 50 is substantially smaller than the radius of curvature of the protrusion 6. Therefore, the protrusion 6 contacts the rounded borders of the groove 50.

This applies to the vertical direction of the Figures. As regards the horizontal direction, the grooves 50 are longer than in the vertical direction by so to say including straight sections (in their profile as seen horizontally). Therefore, the protrusion 6 can shift within the groove 50 in case of horizontal relative movements, for example due to a thermal expansion of the busbar 4.

Further, the rolling movement in cases illustrated in FIG. 14 is still possible. Articulations around other axis would lead to some shifting movements as well (as in the case of the longitudinal shifting movement).

The grooves 50 have the advantage of splitting the contact load provided into two points which have a lower overall resistivity than just one contact point. Further, the oblong shape of the groove is particularly adapted for the already described relative movement in the longitudinal direction of the busbar 4 and some sense secures the engagement of the protrusion 6 into the groove 50 therein.

Beside that, the above explanations also apply to these modifications.

FIG. 16 shows that the protrusion 6 is rounded and convex in two non-parallel sectional planes. The protrusion 6 is rounded and convex in the plane that contains the axis A and B and the protrusion 6 is rounded and convex in the plane that contains the axis B and C.

Figure 17A:
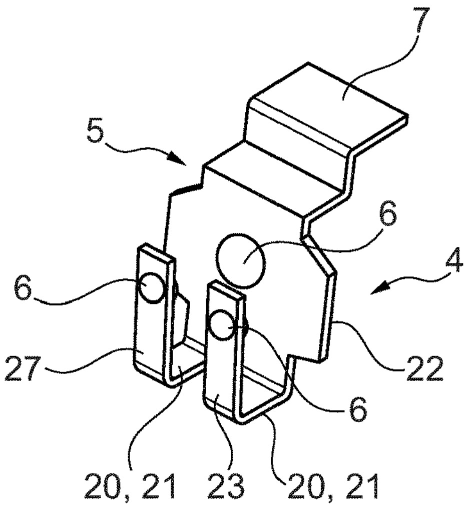
FIG. 17*a* a schematic perspective view of an electrode.
Figure 17B:
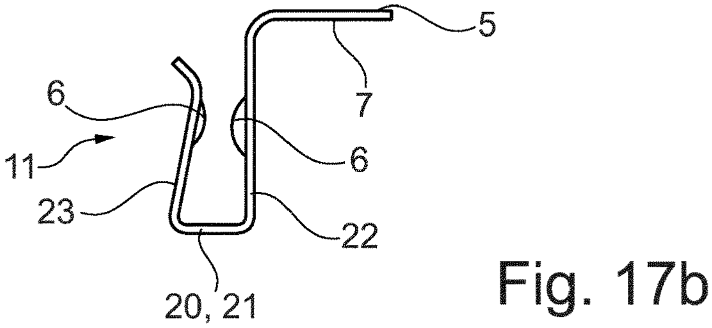
FIG. 17*b* a schematic side view onto an electrode.

While in the embodiment shown in FIGS. 3 to 15, the electrode 5 is designed as a separate element from a clamp of a connector, the embodiment shown in the FIGS. 17*a* to 20 shows that the electrode 5 can have a part that provides the clamp 11. The clamp 11 that is part of the electrode 5, here, has a first leg 22, a second leg 23 and a third leg 27. The clamp 11 has in the embodiment of FIG. 17*a* two transition sections 20, which in the embodiments of FIG. 17*a* are made up as two separate bridges 21. In the embodiment shown in FIG. 19, the clamp 11 has one transition section 20 that is made up as one bridge 21. A first leg 22 is arranged at one end of the transition section 20. The second leg 23 is arranged at the opposite end of the transition section 20. The third leg 27 is arranged also at the opposite side of the transition section 21 in comparison to the arrangement of the first leg 22 that is arranged at one end of the transition section 20. Hence, the second leg 23 and the third leg 27 are arranged on one side when compared with the arrangement of the first leg 22 relative to the transition section 20.

Each of the first leg 22, the second leg 23 and the third leg 27 has a respective protrusion 6 that is intended for coming into contact with an end of the busbar 4. The protrusion 6 of the first leg 22, the second leg 23 and the third leg 27 each allow for tolerance compensation if a busbar 4 (like the busbar shown in FIG. 16) is arranged between the first leg 22, the second leg 23 and the third leg 27. The effect described in conjunction with FIG. 16 will come true for each individual protrusion 6 shown in FIG. 17*a*.

Figure 18:
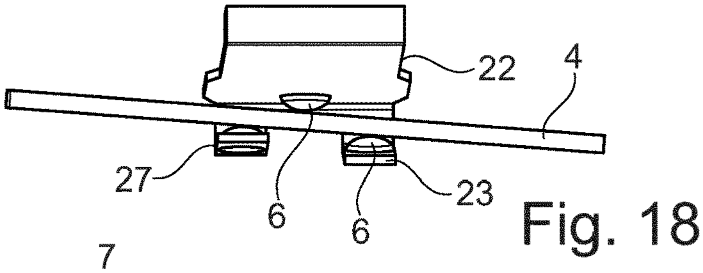
FIG. 18 a schematic illustration in top view.
Figure 19:
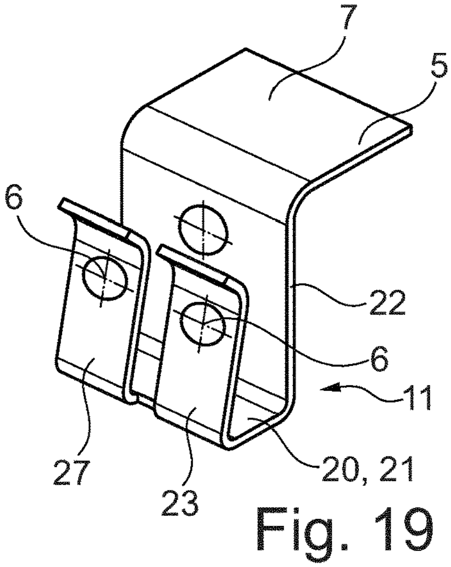
FIG. 19 a schematic perspective view of the electrode of FIG. 18.

It should be mentioned that any (limited) rotations about a vertical axis in FIGS. 17*a* to 20 will be compensated also by an elastic response of the second leg 23 and the third leg 27 together with the already described functions of the protrusion 6. This is illustrated in FIG. 18 which is a view of the clamp 11 from above (in relation to FIG. 17*a*). It shows that the second and third legs 23 and 27 are not aligned any more but have elastically reacted to a rotation of busbar 4 around a rotation axis perpendicular to the drawing in FIG. 18. It can be seen that the protrusions 6 have a rolling function in this reaction.

It should be noted, however, that the protrusions 6 of the clamp 5 shown in FIGS. 17*a* to 20 are not mandatory and the same embodiment is contemplated without these protrusions (and thus just bent from a flat sheet metal).

The electrode 5 shown in FIGS. 17*a* to 20 has a connection end 7 that is connected, for example welded, to a further section to contact to a battery cell or a parallel arrangement of battery cells.

The respective bridges 21 and/or the respective first legs 22 and/or the respective second legs 23 and/or the respective third legs 27 are elastically deformable. These parts of the electrode 5 provide the clamp 11, which in the embodiments shown in FIGS. 17*a* to 20 has a first state, in which a reference part of the first leg 22 (for example the protrusion 6 of the first leg 22) is distanced from a reference part of the second leg 23 (for example the protrusion 6 of the second leg 23) by a first amount and whereby a reference part of the first leg 22 (for example the protrusion 6 of the first leg 22) is distanced from a reference part of the third leg 27 (for example the protrusion 6 of the third leg 23) by a first amount. The clamp 11 also has a second state, in which the same part of the first leg 22 is distanced from the same part of the second leg 23 by a second amount that is different from the first amount and in which the same part of the first leg 22 is distanced from the same part of the third leg 27 by a second amount.

Figure 20:
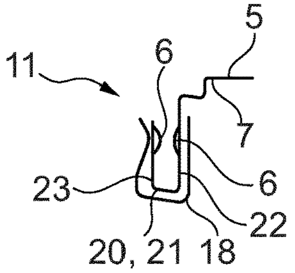
FIG. 20 a schematic side view onto the electrode of FIG. 17 together with a spring clamp.

FIG. 20 shows that in the embodiment shown in FIGS. 17*a* to 20, a spring clamp 18 is provided. The spring clamp 18 can be used to introduce forces that move the clamp 11 from the second state into the first state into parts of the clamp 11. In particular, spring clamp 18 can be designed in view of its mechanical function and elastic properties and clamp 11, on the other hand, can be designed more in view of its electrical functions such as Ohmic resistances of the clamp as such and of the contact to be made. For example, clamp 11 could be made of a well conducting material as defined above, for example copper and spring clamp 18 of spring steel. Similar ideas apply to other embodiments as well.

Figure 21:
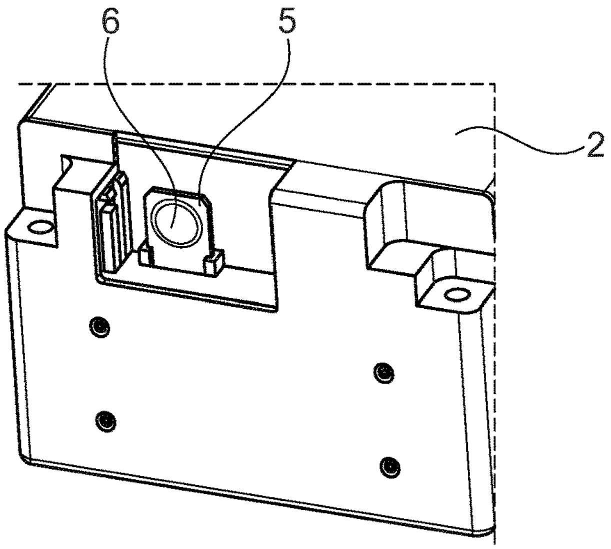
FIG. 21 a schematic perspective view onto a part of a battery block.

FIG. 21 shows the end part of a battery block 2 of an array of battery blocks 1. The battery block 2 has an electrode 5 that has a protrusion 6 as already described. It can be seen in FIG. 22 that a connector 3 can be placed at the end of the battery block 2 and used to connect the electrode with a busbar 4 (see FIG. 22). In this connection, the same way of tolerance compensation will be achieved as explained in the context of FIG. 16. FIG. 23 for means of illustration shows (without showing the connector 3) how the end of the busbar 4 is arranged to come into contact with the electrode 5 and the protrusion 6 of the electrode 5. The connector 3 is the means for holding the busbar 4 in contact with the electrode 5.

The connector 3 used in the embodiment shown in FIGS. 21 to 35 has a casing 10, a clamp 11 and a spacer 12. The spacer 12 has a part that can function as a lid.

Figure 32:
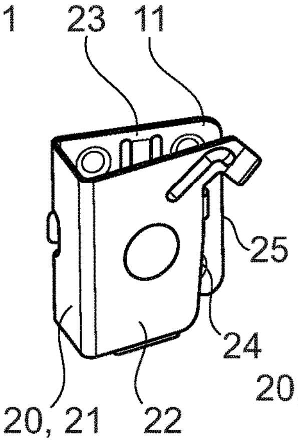
FIG. 32 a schematic perspective view onto the clamp of FIG. 30.
Figure 33:
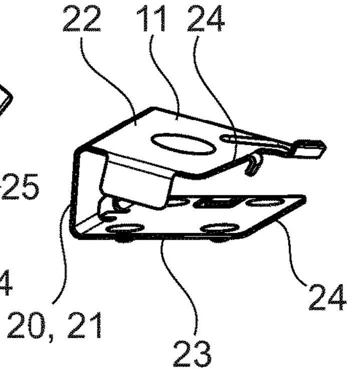
FIG. 33 a schematic perspective view onto the clamp of FIG. 30.
Figure 34:
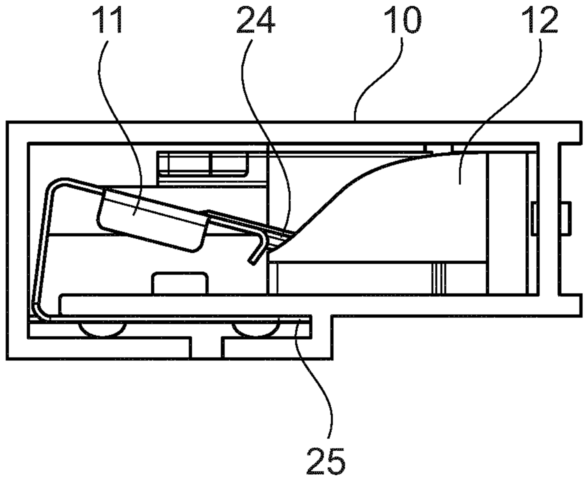
FIG. 34 a schematic view from below onto the connector of FIG. 22.
Figure 35:
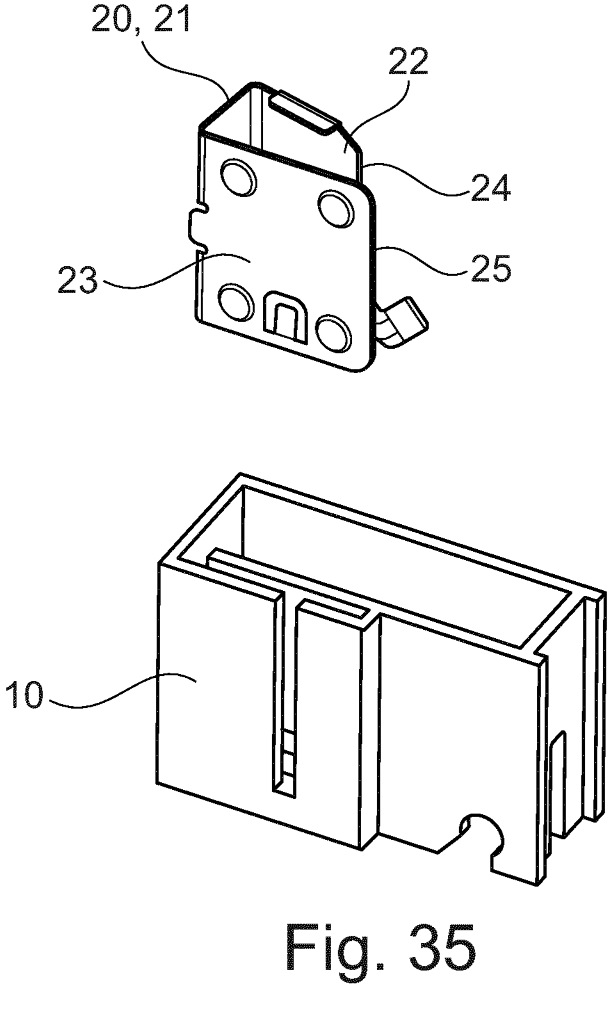
FIG. 35 a schematic exploded view onto the casing and the clamp of the connector of FIG. 22.

The clamp 11 (see especially FIGS. 30 to 33) has a transition section 20 that is formed as a bridge 21. The transition section 20 connects a first leg 22 that is arranged at one end of the transition section 20 with a second leg 23 that is arranged at the opposite end of the transition section. At least one of the transition section 20, the first leg 22 and the second leg 23 is elastically deformable. The clamp 11 has a first state shown in FIG. 26, 32, 33, 34, in which the reference part 24 of the first leg 22 is distanced from the reference part 25 of the second leg 23 by a first amount. The clamp 11 has a second state best seen in FIGS. 30, 31 and 25, in which reference part 24 is distanced from the reference part 25 by a second amount that is different from the first amount, namely larger. In the second state (FIG. 30,31), the transition section 20 and/or the first leg 22 and/or the second leg 23 is further elastically deformed compared to the first state (FIGS. 32, 33).

The FIGS. show that here clamp 11 has a spherical protrusion, as already discussed earlier.

Figure 22:
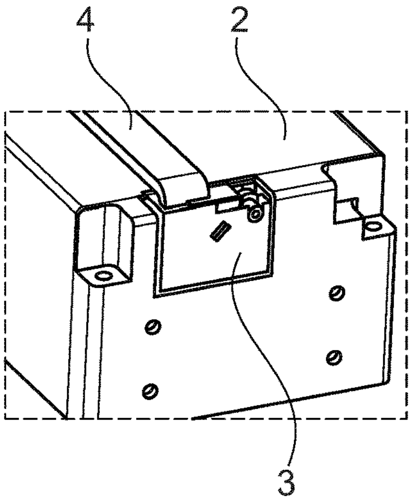
FIG. 22 a schematic perspective view onto a part of the battery block of FIG. 21 with a connector and a busbar.
Figure 23:
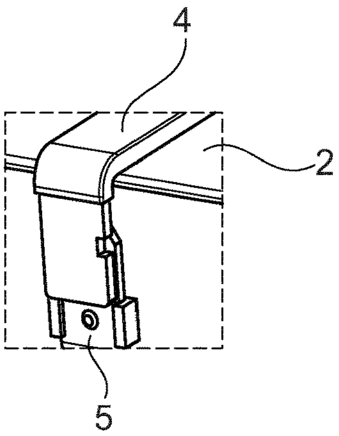
FIG. 23 a schematic perspective view onto a part of the battery block of FIG. 21 with an end of a busbar in contact with the electrode of the battery block.
Figure 24:
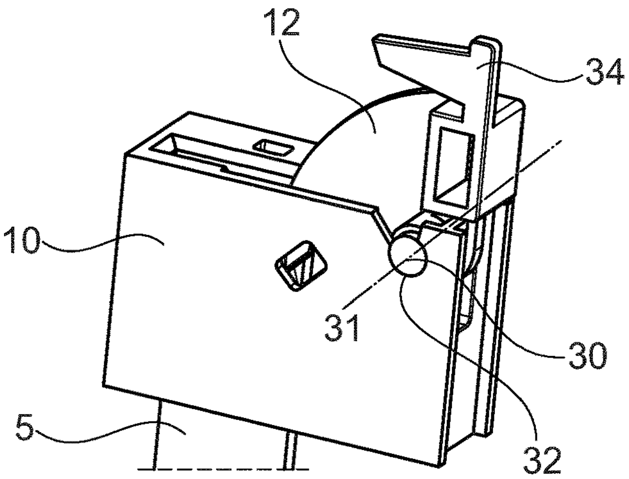
FIG. 24 a schematic perspective view onto the connector of FIG. 22 set on the electrode.
Figure 25:
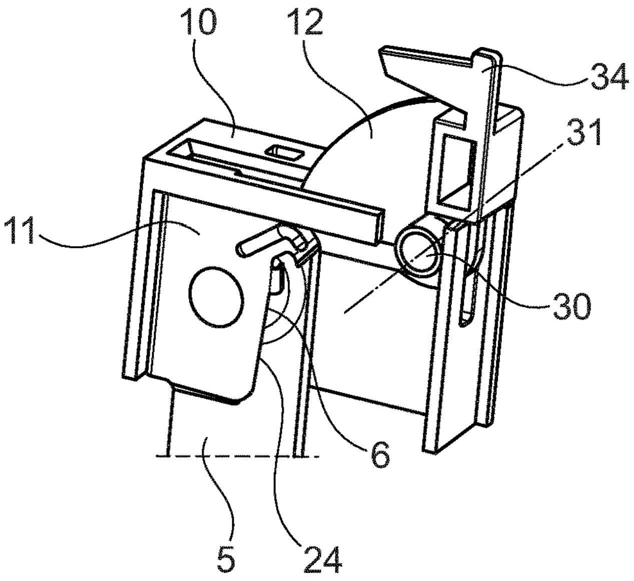
FIG. 25 a schematic sectional perspective view of the connector of FIG. 22 set on the electrode.
Figure 26:
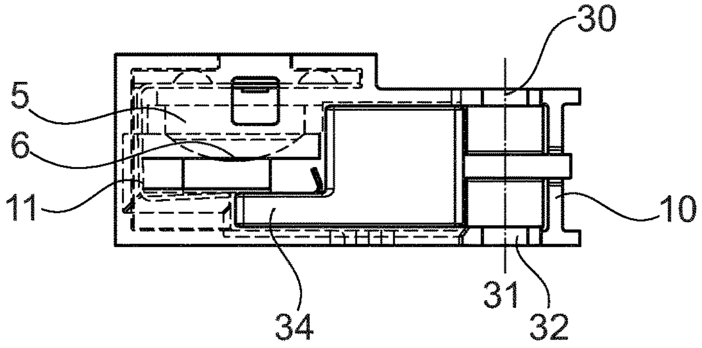
FIG. 26 a schematic top view onto the connector of FIG. 22 set on the electrode.
Figure 27:
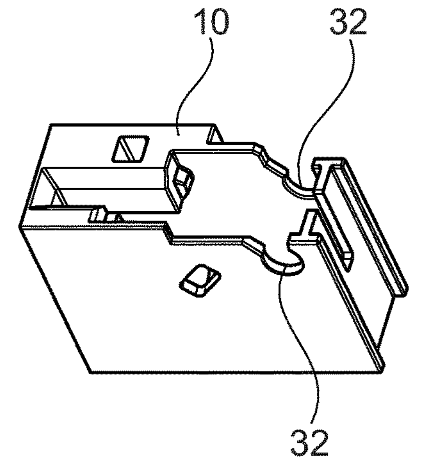
FIG. 27 a schematic perspective view onto the casing of the connector of FIG. 22.
Figure 28:
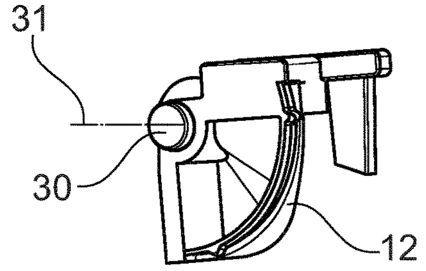
FIG. 28 a schematic perspective view onto a spacer of the connector of FIG. 22.
Figure 29:
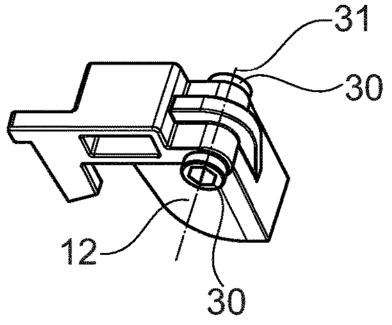
FIG. 29 a schematic perspective view onto the spacer of FIG. 28.
Figure 30:
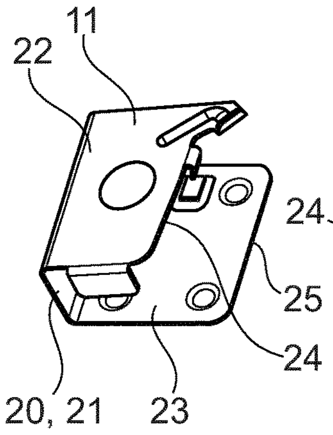
FIG. 30 a schematic perspective view onto a clamp of the connector of FIG. 22.
Figure 31:
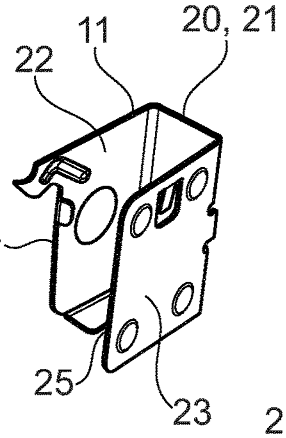
FIG. 31 a schematic perspective view onto the clamp of FIG. 30.

The spacer 12 is movable between a first position shown in the FIGS. 24 and 25 to a second position shown in FIG. 22 and FIG. 26. The spacer 12 is in contact with a part of the first leg 22 when the clamp 11 is in the second state and the spacer 12 is in the first position. The spacer 12 is designed to rotate from the first position (FIG. 24, 25) to the second position (FIG. 22, 26). If the spacer 12 is rotated into the second position, the spacer 12 will lose contact with the part of the first leg 22 and will allow the first leg 22 to come into contact with the end of the busbar 4 in order to hold the end of the busbar 4 in contact with the protrusion 6 on the electrode 5 (this arrangement of busbar 4 and electrode 5 being illustrated in FIG. 23 without the connector for illustrative purposes).

Compared to the embodiment of the connector shown in FIGS. 3 to 15, the spacer 12 in the embodiment shown in FIGS. 21 to 35 has a lever 34 that can be used to manually move the spacer 12 from the first position (FIG. 24, 25) to the second position (FIG. 22, FIG. 26) manually.

Figure 36:
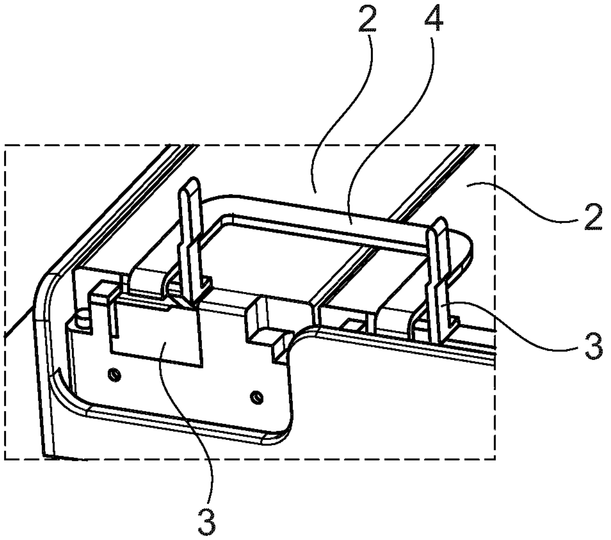
FIG. 36 a schematic perspective view onto a part of a battery block with a connector and a busbar.

The embodiment shown in FIGS. 36 to 47 also has a spacer 12 that can be operated manually. FIG. 36 shows parts of two battery blocks 2 whereby a connector 3 is provided per battery block 2. A busbar 4 is arranged between the electrodes (not shown in FIG. 36) of the respective battery blocks 2 and held by the respective connectors 3. FIG. 36 shows the connectors 3 in the opened position, which has the spacer 12 in the first position and the clamp 11 in the second state.

Figure 37:
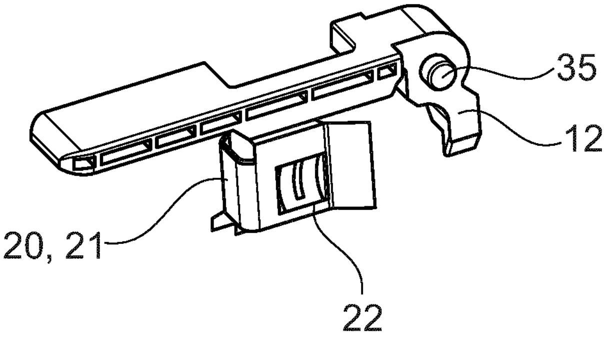
FIG. 37 a schematic perspective view onto the spacer and the clamp of the connector of FIG. 36 with the spacer in a second position.
Figure 38:
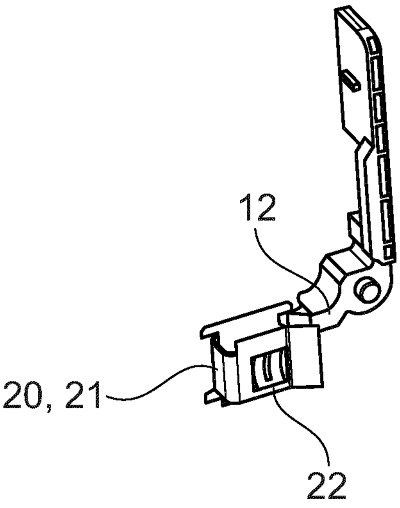
FIG. 38 a schematic perspective view onto the spacer and the clamp of FIG. 37 with the spacer in a first position.
Figure 39:
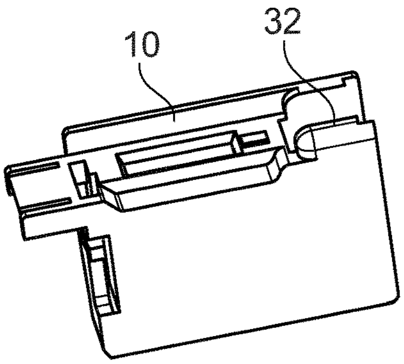
FIG. 39 a schematic perspective view onto the casing of the connector of FIG. 36.
Figure 40:
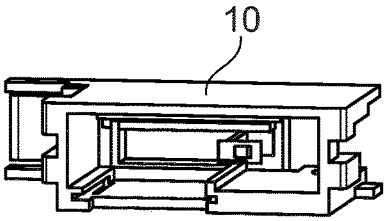
FIG. 40 a schematic perspective view onto the casing of FIG. 39.
Figure 41:
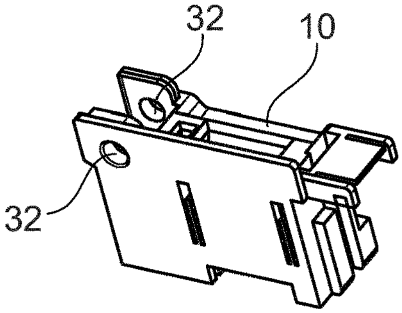
FIG. 41 a schematic perspective view onto the casing of FIG. 39.
Figure 42:
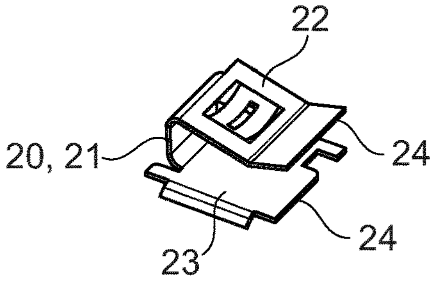
FIG. 42 a schematic perspective view onto the clamp of the connector of FIG. 36, the clamp being in the first state.
Figure 43:
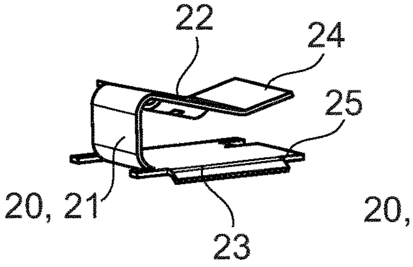
FIG. 43 a schematic perspective view onto the clamp of FIG. 42, the clamp being in the first state.
Figure 44:
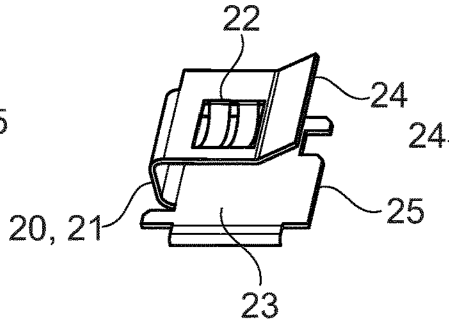
FIG. 44 a schematic perspective view onto the clamp of FIG. 42, the clamp being in the second state.
Figure 45:
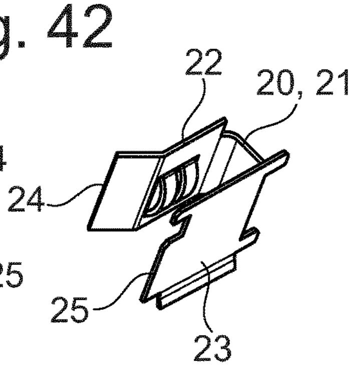
FIG. 45 a schematic perspective view onto the clamp of FIG. 42, the clamp being in the second state.
Figure 46:
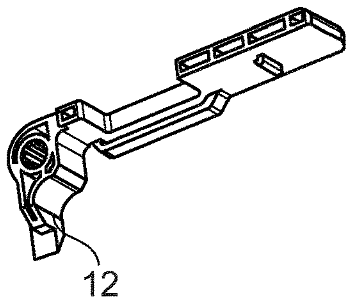
FIG. 46 a schematic perspective view onto the spacer of the connector of FIG. 36.
Figure 47:
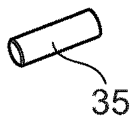
FIG. 47 a schematic perspective view onto the axle of a spacer of the connector of FIG. 36.
Figure 48:
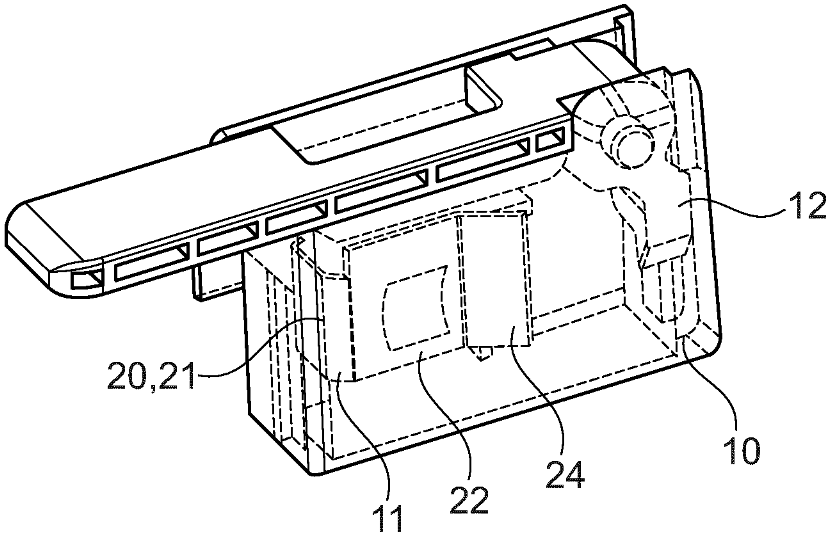
FIG. 48 a schematic perspective view of the connector of FIG. 36.

FIGS. 37 and 38 show the spacer 12 and the clamp 11 and indicate, how the spacer 12 is in contact with a part of the first leg 22 of the clamp 11 when the clamp 11 is in the second state and the spacer is in the first position (FIG. 38). FIGS. 37, 38 and 47 show the spacer 12 sits on an axle 35. The axle 35 is arranged in holes 32 in the casing 10 of the connector 3.

Figure 50:
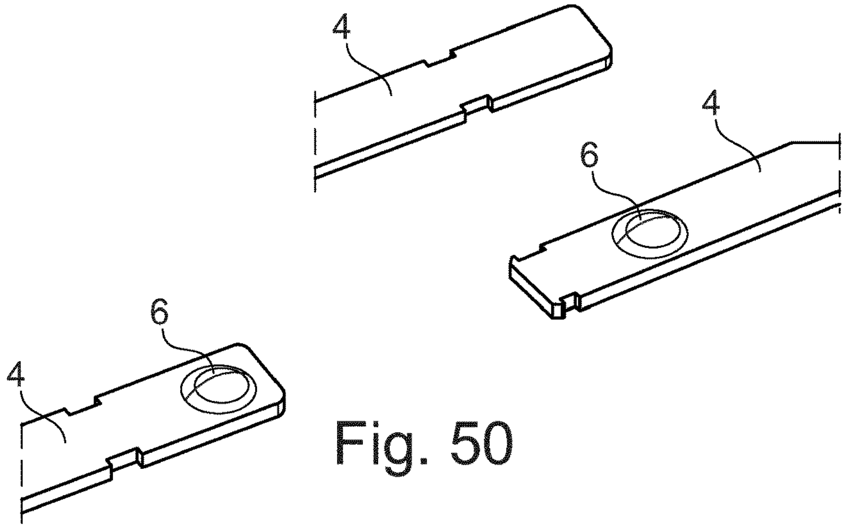
FIG. 50 a schematic exploded view of a busbar and two further busbars.

The embodiment shown in the FIGS. 49 to 56 shows a connector 3 that is designed to connect the busbar 4 with a further busbar 4. FIGS. 49 to 56 are explained with the element 4 with the protrusion 6 being a busbar. It will be apparent to the skilled person that the element 4 shown in FIGS. 49 to 56 could likewise be referred to as an electrode 5 with a protrusion 6. The disclosure of FIGS. 49 to 50 is hence being applicable as a disclosure for connecting an electrode with a protrusion 6 to the busbar 4 or to another electrode.

Figure 51:
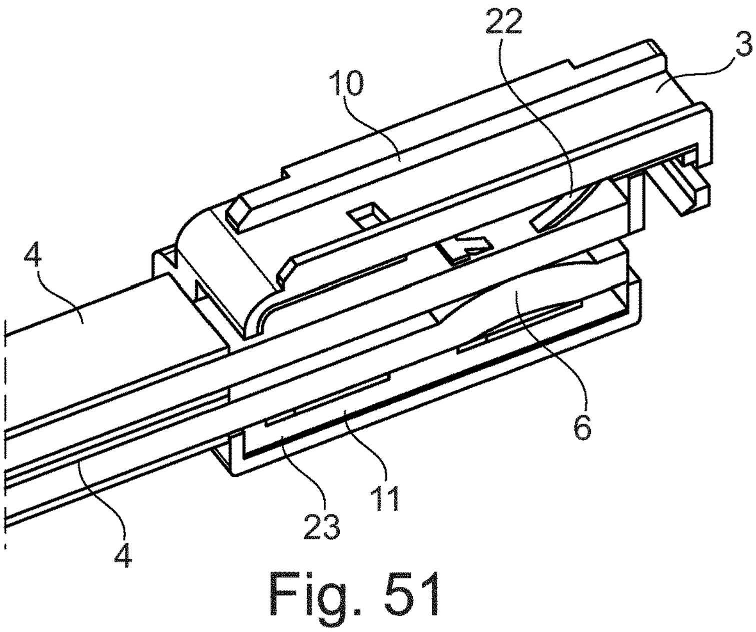
FIG. 51 a schematic perspective sectional view onto the connector, the busbar and the further busbar of FIG. 49.

The connector 3 has the ability to connect the busbar 4 to the further busbar 4 in a manner that busbar 4 and further busbar 4 extend into the same direction away from the connector 3 (see FIG. 49 and FIG. 51). The connector 3 is, however, also designed to be used to connect a busbar 4 to a further busbar 4 that extends away from the busbar 4 in the manner shown in FIG. 52.

FIG. 50 is used to highlight the two possible scenarios where the connector 3 of FIG. 49 could be used: The connector 3 could be used to connect the busbar 4 shown in the upper part of FIG. 50 with the further busbar 4 shown in the lower left-hand side of FIG. 50. In this scenario, the connector 3 would join the busbar 4 and the further busbar 4 in the manner shown in FIGS. 49 and 51. In the alternative scenario, the busbar 4 shown in the upper part of FIG. 50 can be connected to the further busbar 4 shown in the lower right-hand side of FIG. 50 by the connector 3. In this scenario, the connection would be made as shown in FIG. 52.

Figure 52:
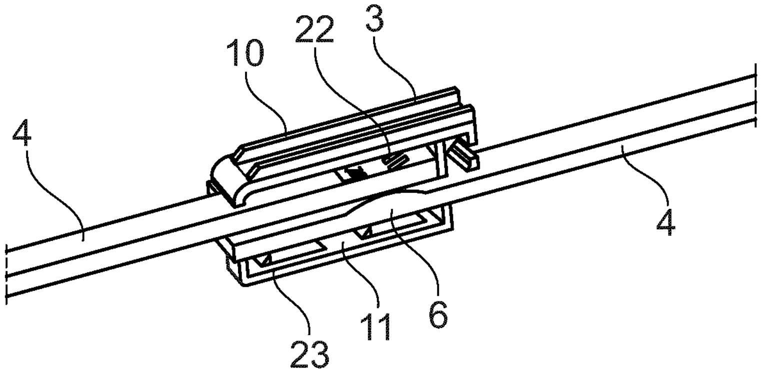
FIG. 52 a schematic perspective sectional view onto the connector and the busbar of FIG. 49 and a further busbar.

FIG. 50, FIG. 51 and FIG. 52 show that the further busbar 4 has a protrusion 6. Here the same effect of tolerance compensation will occur as explained with reference to FIG. 16.

The connector shown in FIGS. 49, 51 and 52 has a casing 10 and a clamp 11 arranged inside the casing 10.

Figure 53:
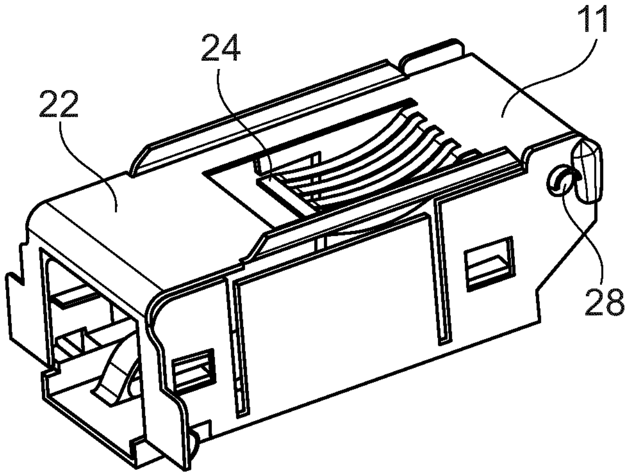
FIG. 53 a schematic perspective view onto the clamp of the connector of FIG. 49.
Figure 54:
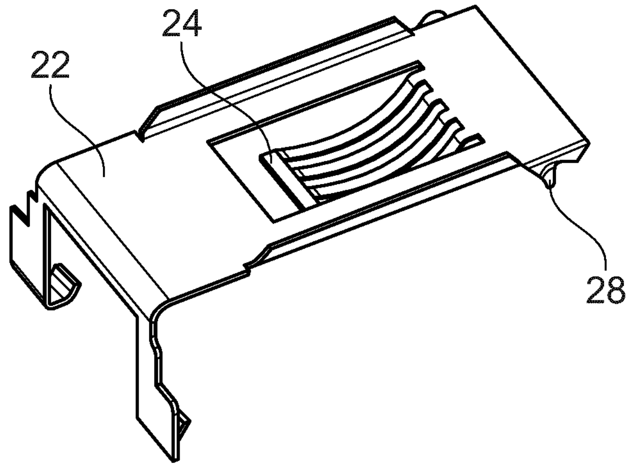
FIG. 54 a schematic perspective view onto the first leg of the clamp of FIG. 53.
Figure 55:
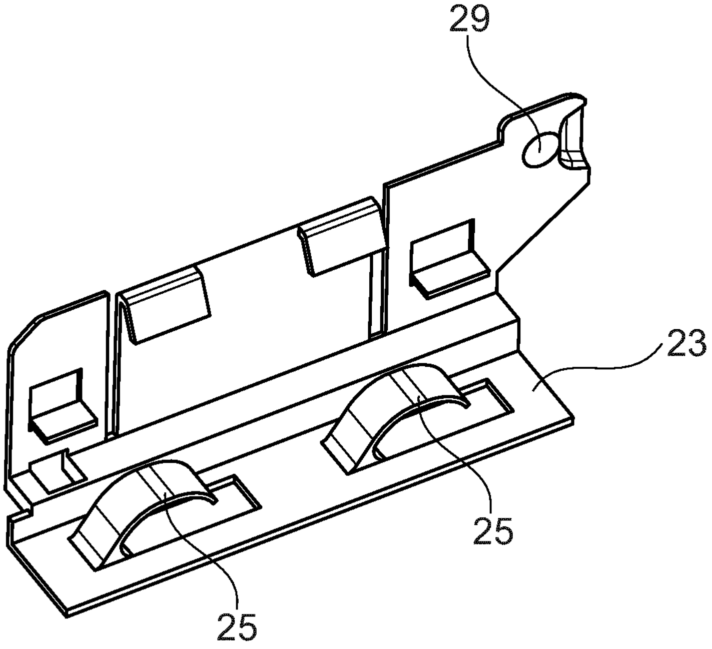
FIG. 55 a schematic perspective sectional view onto the second leg of the clamp of FIG. 53.
Figure 56:
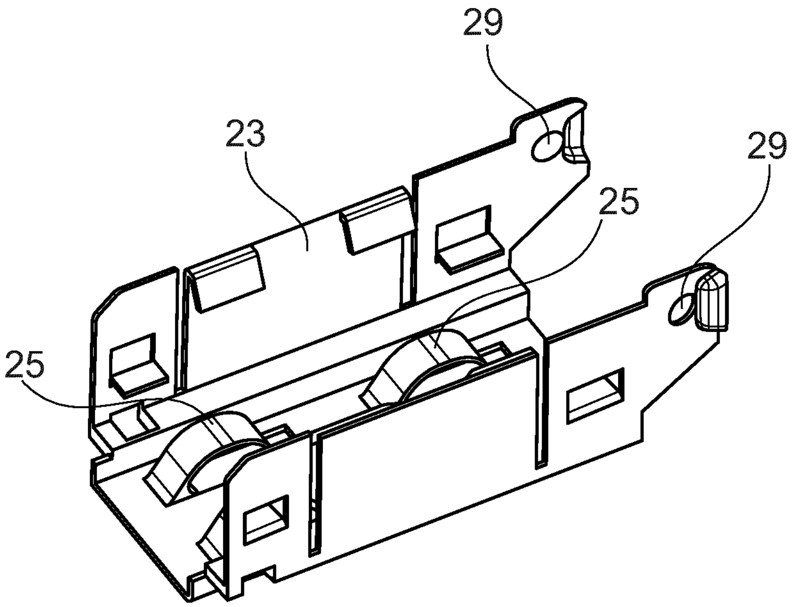
FIG. 56 a schematic perspective view onto the second leg of the clamp of FIG. 53.

The clamp 11 shown in FIG. 53 has a first leg 22 (see also FIG. 54) and a second leg 23 (see also FIGS. 55 and 56). The first leg 22 has a reference part 24 arranged as part of a flexible portion of the first leg 22. The second leg 23 has four reference parts 25.

The first leg 22 is joined to the second leg 23 by way of rods 28 protruding from the first leg 22 that are held in holes 29 on the second leg 23 allowing the first leg 22 to swivel relative to the second leg 23. The casing 10 and the clamp 11 can be moved into an open position (not shown, but similar to the position shown in FIG. 60) that allows for the parts of the busbars 4 that are to be connected by way of the connector 3 to be introduced into the connector 3.

The embodiment shown in the FIGS. 57 to 64 shows a connector 3 that is designed to connect the busbar 4 with a further busbar 4. FIGS. 57 to 64 are explained with the element 4 with the protrusion 6 being a busbar. It will be apparent to the skilled person that the element 4 shown in FIGS. 57 to 64 could likewise be referred to as an electrode 5 with a protrusion 6. The disclosure of FIGS. 57 to 64 is hence being applicable as a disclosure for connecting an electrode with a protrusion 6 to the busbar 4.

The connector 3 is designed to be used to connect a busbar 4 to a further busbar 4 that extends away from the connector 3 in the same direction as shown in FIG. 57.

Figure 58:
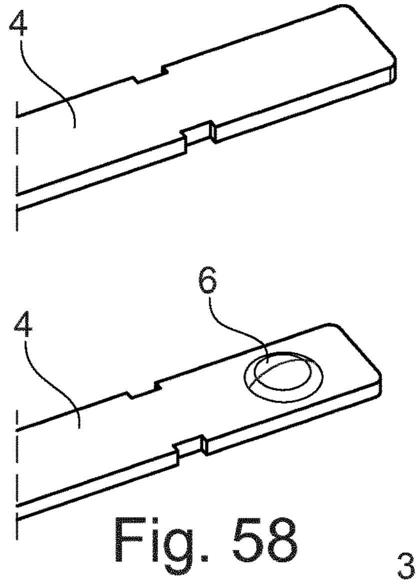
FIG. 58 a schematic exploded view of a busbar and a further busbar.

FIG. 58 shows that the connector 3 is to connect the busbar 4 shown in the upper part of FIG. 58 with the further busbar 4 shown in the lower part of FIG. 58.

Figure 59:
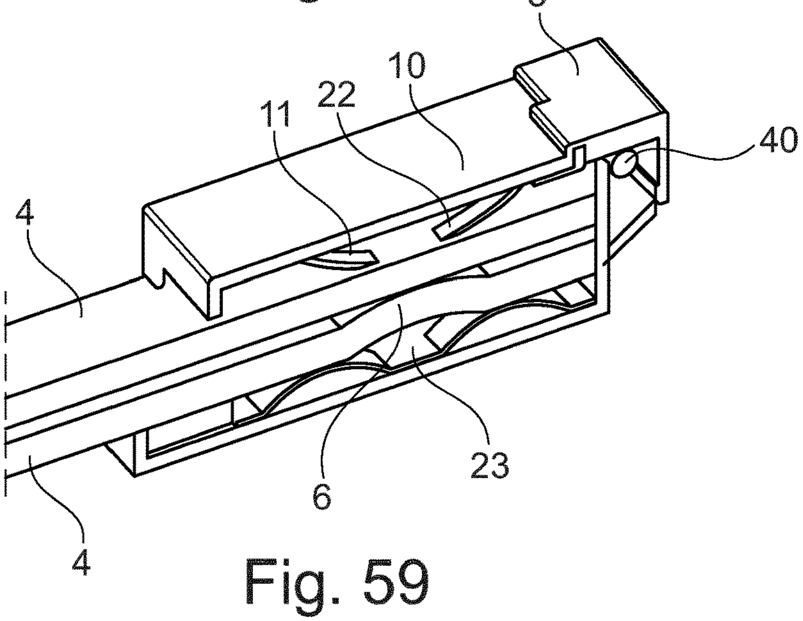
FIG. 59 a schematic perspective sectional view onto the connector, the busbar and the further busbar of FIG. 57.

FIG. 58 and FIG. 59 show that the further busbar 4 has a protrusion 6. Here the same effect of tolerance compensation will occur as explained with reference to FIG. 16.

Figure 60:
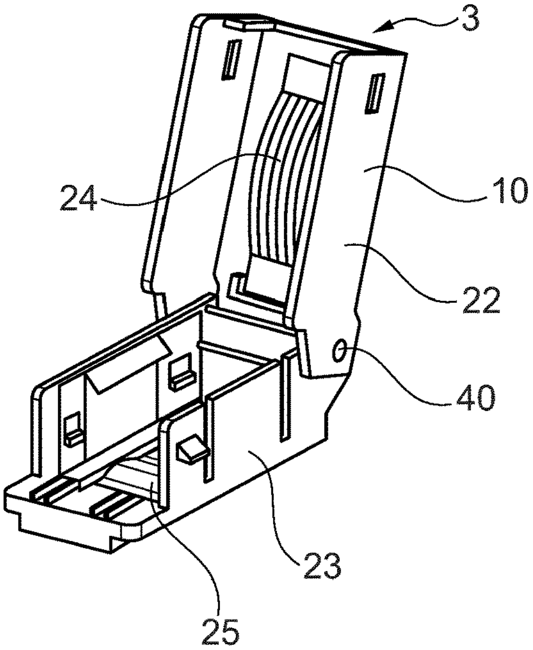
FIG. 60 a schematic perspective view onto the connector of FIG. 57 in the open state.
Figure 62:
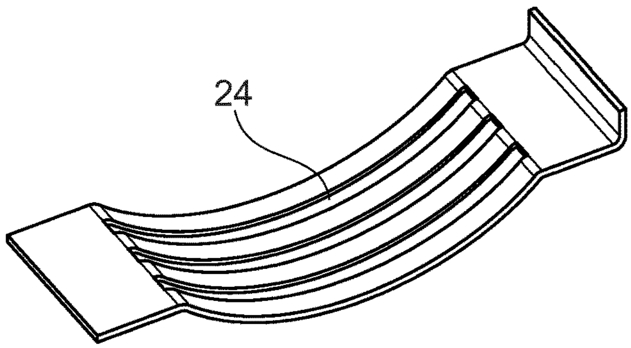
FIG. 62 a schematic perspective view onto a reference part of the first leg of the clamp of the connector of FIG. 57.
Figure 63:
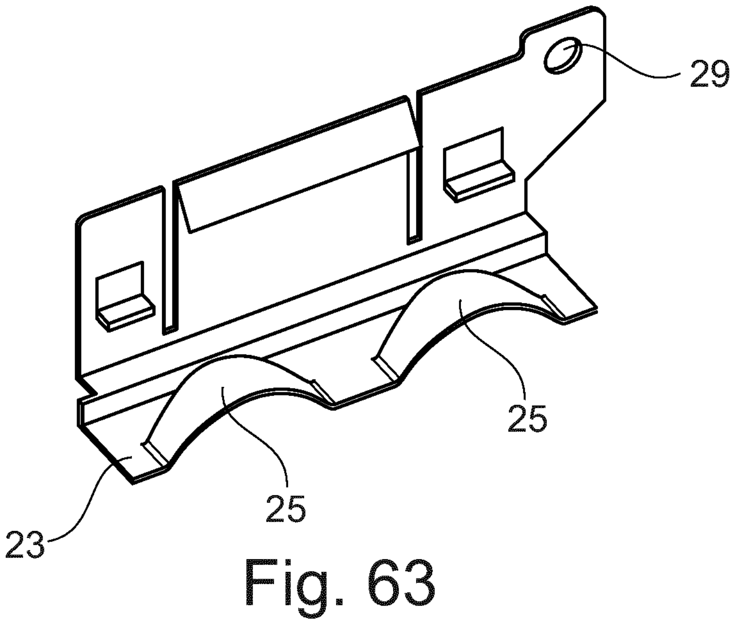
FIG. 63 a schematic perspective sectional view onto the second leg of the clamp of the connector of FIG. 57.
Figure 64:
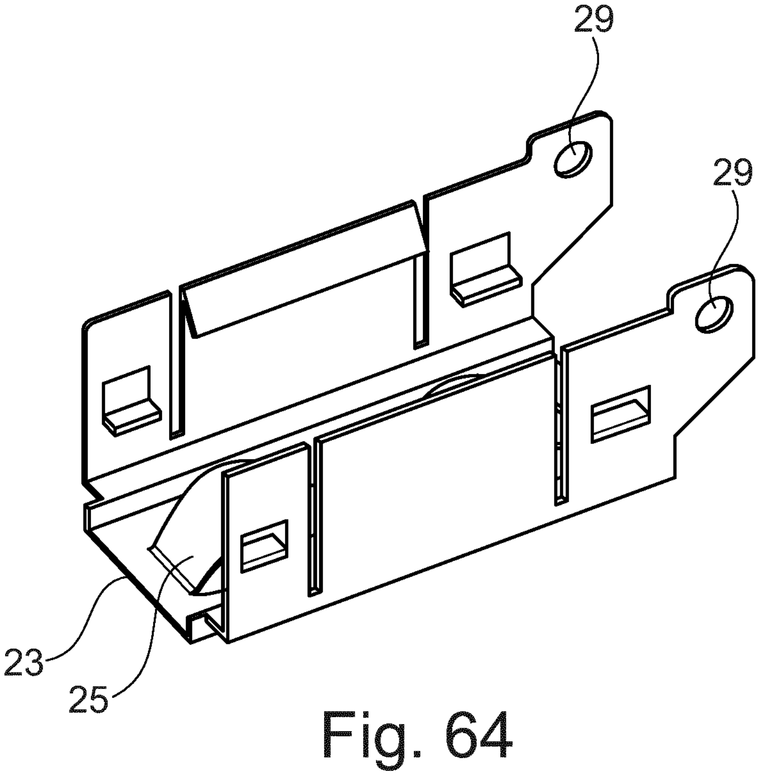
FIG. 64 a schematic perspective view onto the second leg of the clamp of the connector of FIG. 57.

The connector shown in FIGS. 57, 59 and 60 has a casing 10 and a clamp 11. Parts of the casing 10 form part of the clamp 11. The clamp 11 has a first leg 22 that is made up of a first metal part shown in FIG. 62 and by part of the casing 10, namely that part of the casing that the metal part shown in FIG. 62 is attached to. FIG. 60 shows how the upper part of the casing 10 (the opened part) carries the metal part shown in FIG. 62 and thereby forms the first leg of the clamp. The first leg 22 has a reference part 24 that is provided by the metal part shown in FIG. 62. The second leg 23 has two reference parts 25.

Figure 61:
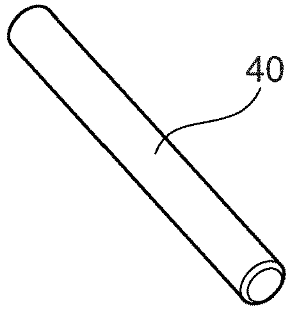
FIG. 61 a schematic perspective view onto an axle used to connect parts of the clamp of the connector of FIG. 57.

The first leg 22 is joined to the second leg 23 by way of an axle 40 shown in FIG. 61 that is held in holes of the plastic part that makes up part of the first leg 22 and that is held in holes 29 on the second leg 23 allowing the first leg 22 to swivel relative to the second leg 23. The casing 10 and the clamp 11 can be moved into an open position (shown in FIG. 60) that allows for the parts of the busbars 4 that are to be connected by way of the connector 3 to be introduced into the connector 3.

The embodiment shown in the FIGS. 65 to 73 shows a connector 3 that is designed to connect the busbar 4 with a further busbar 4. FIGS. 65 to 73 are explained with the element 4 with the protrusion 6 being a busbar. It will be apparent to the skilled person that the element 4 shown in FIGS. 65 to 73 could likewise be referred to as an electrode 5 with a protrusion 6. The disclosure of FIGS. 65 to 73 is hence being applicable as a disclosure for connecting an electrode with a protrusion 6 to the busbar 4.

Figure 65:
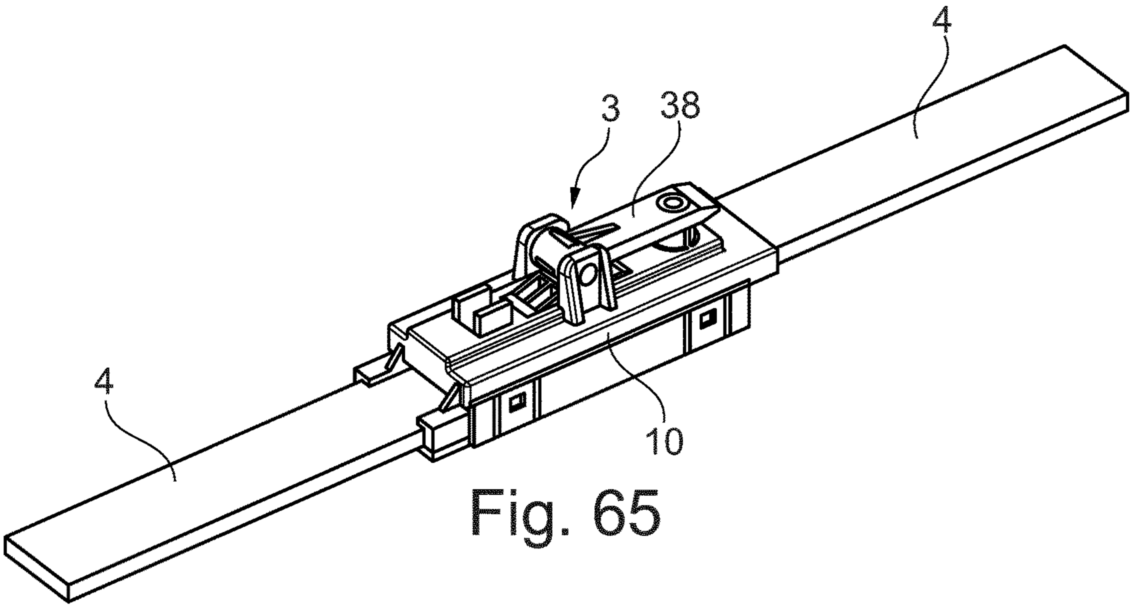
FIG. 65 a schematic perspective view onto a connector and a busbar and a further busbar.

The connector 3 is designed to be used to connect a busbar 4 to a further busbar 4 that extends away from the connector 3 in a different direction as shown in FIG. 65.

Figure 66:
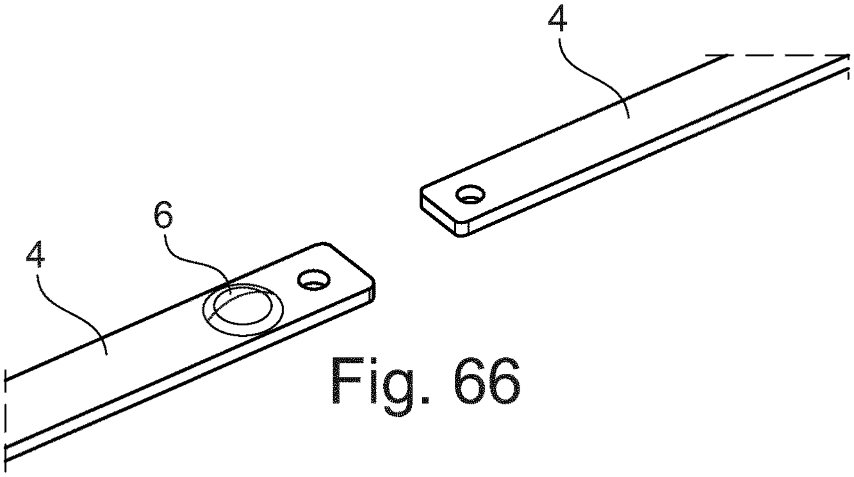
FIG. 66 a schematic exploded view of a busbar and a further busbar.

FIG. 66 shows that the connector 3 is to connect the busbar 4 shown in the right-hand side of FIG. 66 with the further busbar 4 shown in the left-hand side of FIG. 66.

Figure 67:
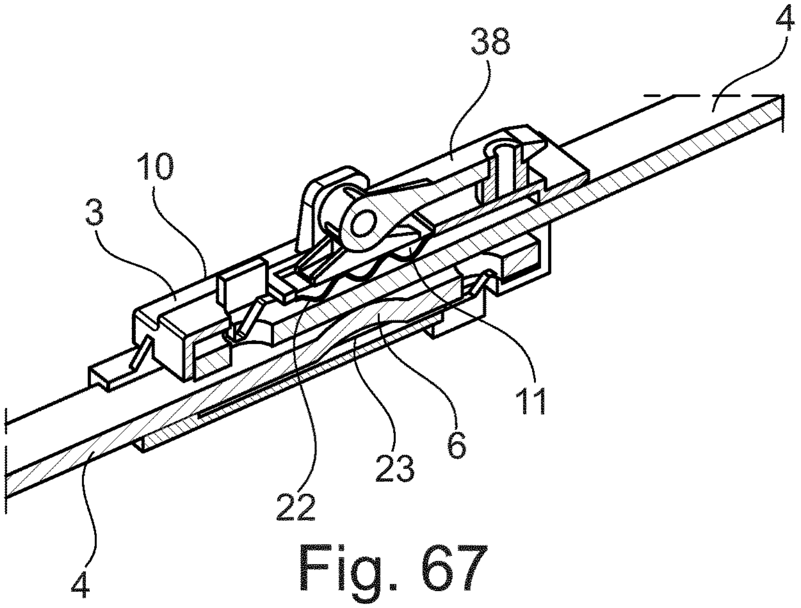
FIG. 67 a schematic perspective sectional view onto the connector, the busbar and the further busbar of FIG. 65.

FIGS. 66 and 67 show that the further busbar 4 has a protrusion 6. Here the same effect of tolerance compensation will occur as explained with reference to FIG. 16.

Figure 68:
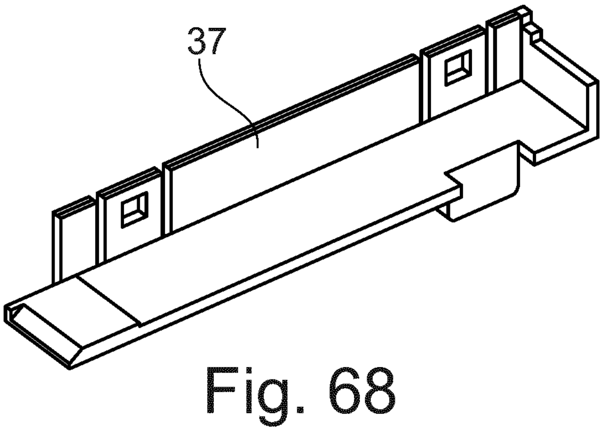
FIG. 68 a schematic perspective sectional view onto a part of the casing of the connector of FIG. 65.
Figure 69:
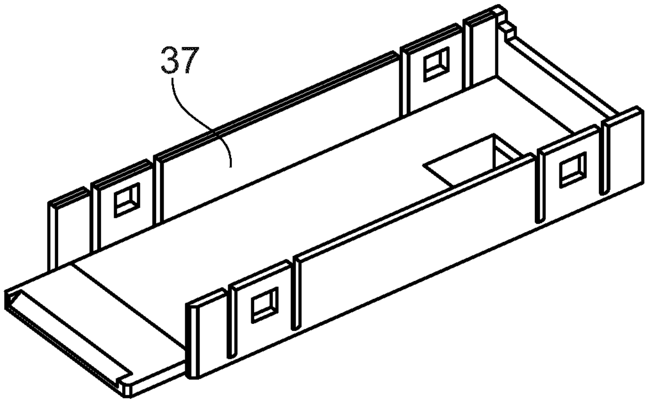
FIG. 69 a schematic perspective view onto a part of the casing of the connector of FIG. 65.
Figure 70:
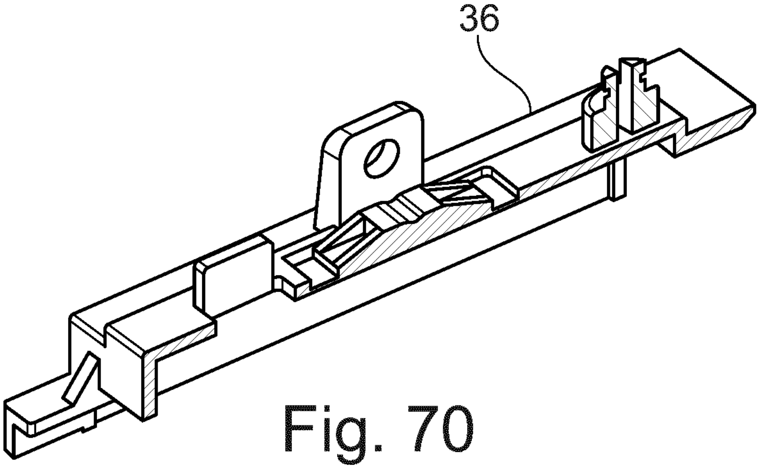
FIG. 70 a schematic perspective sectional view onto a part of the casing of the connector of FIG. 65.
Figure 71:
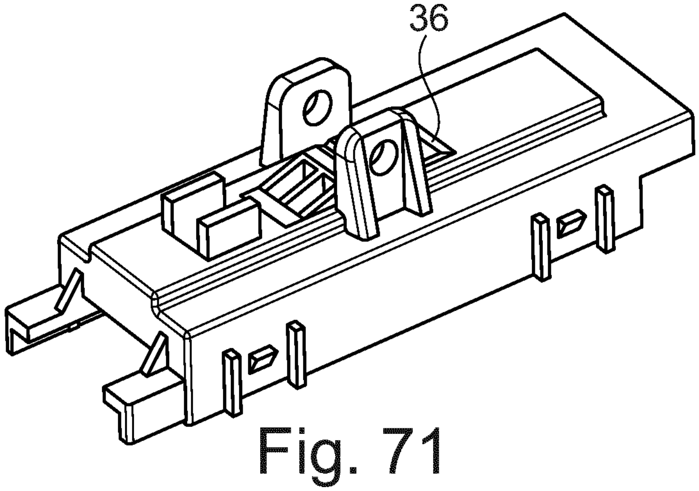
FIG. 71 a schematic perspective view onto a part of the casing of the connector of FIG. 65.

The connector shown in FIGS. 65, 67 and 60 has a two-part casing 10 and a clamp 11. The lower part 37 of the casing 10 is shown in FIGS. 68 and 69. The upper part 36 of the casing 10 is shown in FIGS. 70 and 71. A lever 38 is arranged at the upper part 36 and serves for providing a clamp load. The clamp load can be produced for example by a spring clamp made of spring steel but also or additionally by a mechanism as here. In the present embodiment, the clamp 11 is naturally open and lever 38 serves to bring it into a "closed" position (position 1). For this purpose, the lever 38 has an eccentric shape on the turning axis.

Figure 72:
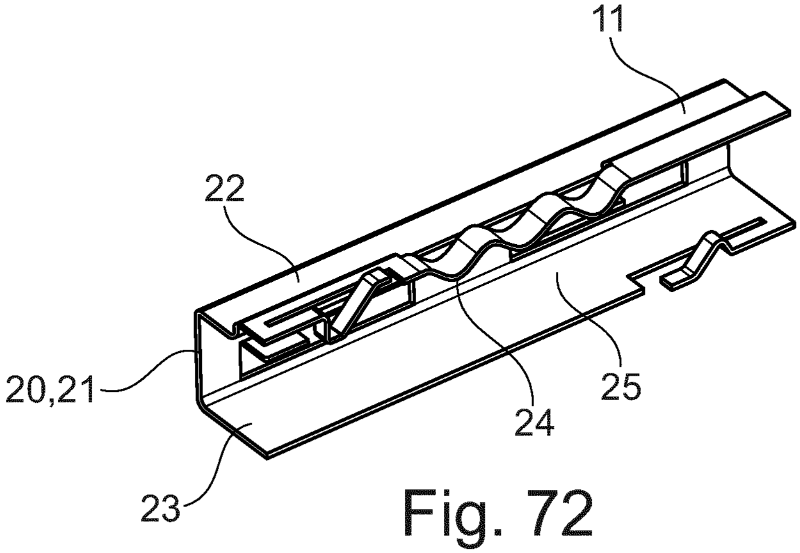
FIG. 72 a schematic perspective sectional view onto the clamp of the connector of FIG. 65.
Figure 73:
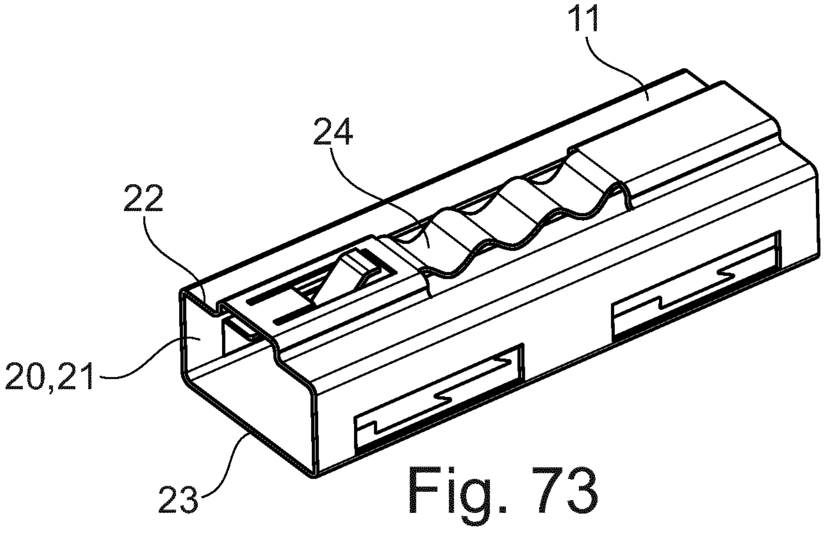
FIG. 73 a schematic perspective view onto the clamp of the connector of FIG. 65.

The clamp 11 shown in FIGS. 72 and 73 has a first leg 22 and a second leg 23. The first leg 22 has a reference part 24 arranged as part of a flexible portion of the first leg 22. The second leg 23 has a reference parts 25 by way of a flat wall.

The first leg 22 is joined to the second leg 23 by way of a transition section 20 that is designed as a bridge 21.

The embodiment shown in the FIGS. 74 to 81 shows a connector 3 that is designed to connect the busbar 4 with a further busbar 4. FIGS. 74 to 81 are explained with the element 4 with the protrusion 6 being a busbar. It will be apparent to the skilled person that the element 4 shown in FIGS. 74 to 81 could likewise be referred to as an electrode 5 with a protrusion 6. The disclosure of FIGS. 74 to 81 is hence being applicable as a disclosure for connecting an electrode with a protrusion 6 to the busbar 4.

Figure 74:
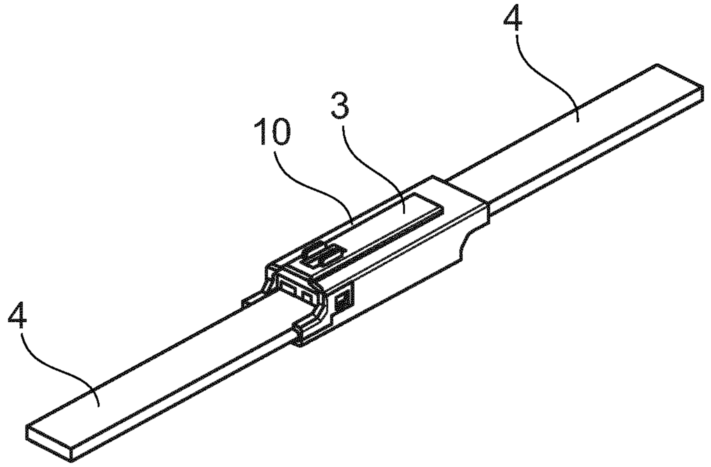
FIG. 74 a schematic perspective view onto a connector and a busbar and a further busbar.

The connector 3 is designed to be used to connect a busbar 4 to a further busbar 4 that extends away from the connector 3 in a different direction as shown in FIG. 74.

Figure 75:
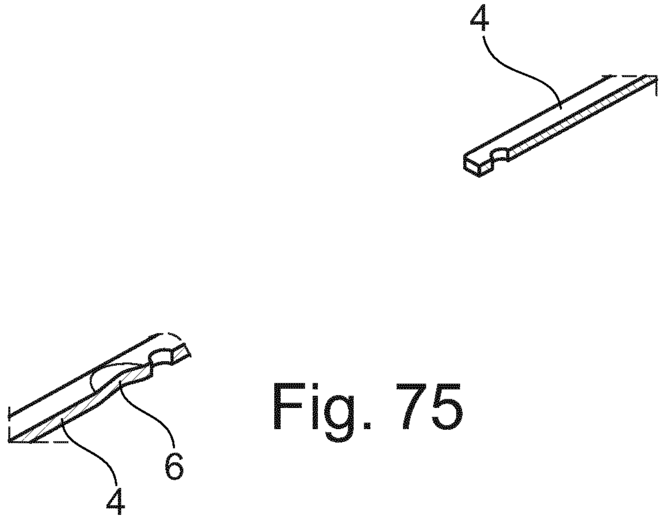
FIG. 75 a schematic exploded view of a busbar and a further busbar.

FIG. 75 shows that the connector 3 is to connect the busbar 4 shown in the right-hand side of FIG. 75 with the further busbar 4 shown in the left-hand side of FIG. 75.

Figure 76:
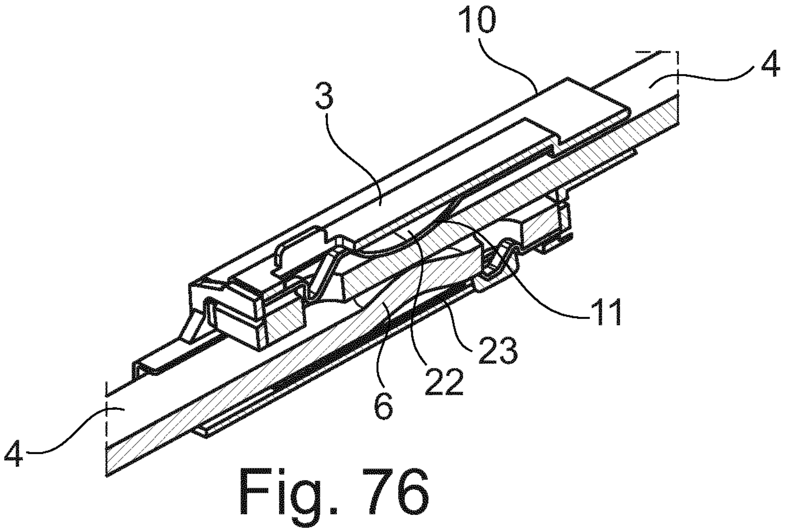
FIG. 76 a schematic perspective sectional view onto the connector, the busbar and the further busbar of FIG. 74.
Figure 77:
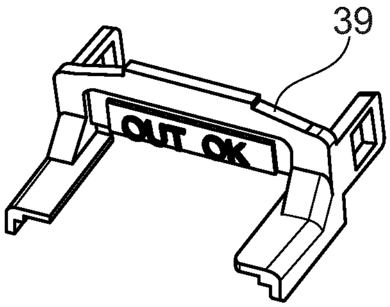
FIG. 77 a schematic perspective view onto a piece of the casing of the connector of FIG. 74.
Figure 78:
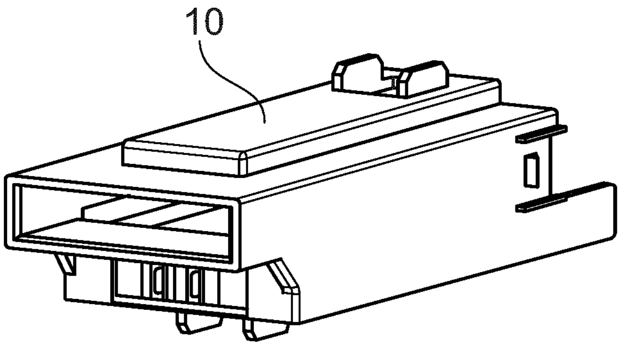
FIG. 78 a schematic perspective view onto the casing of the connector of FIG. 74 from a first perspective.
Figure 79:
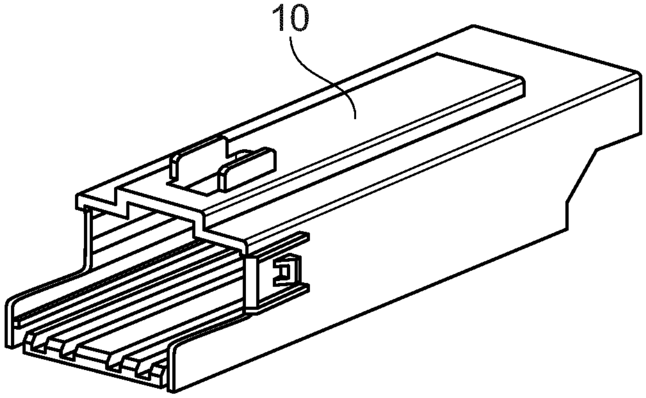
FIG. 79 a schematic perspective view onto the casing of the connector of FIG. 74 from a second perspective.

FIGS. 75 and 76 show that the further busbar 4 has a protrusion 6. Here the same effect of tolerance compensation will occur as explained with reference to FIG. 16.

The connector shown in FIGS. 74 and 76 has a casing 10 and a clamp 11. A closure piece 39 can be inserted into an opening of the casing 10 as shown in FIGS. 74 and 75.

Figure 80:
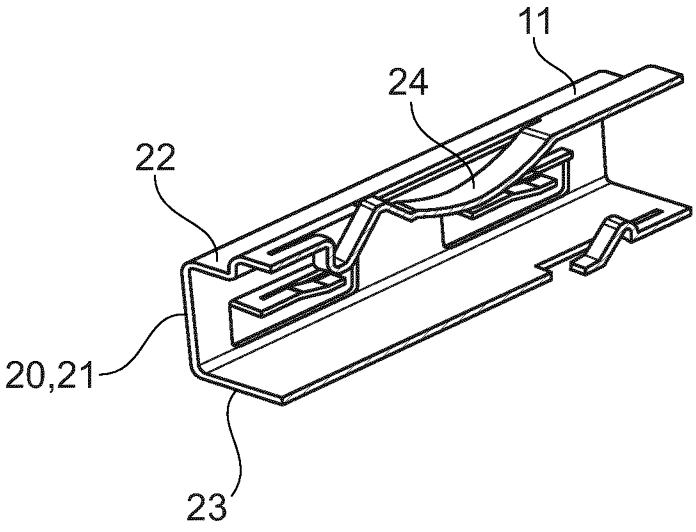
FIG. 80 a schematic perspective sectional view onto the clamp of the connector of FIG. 74.
Figure 81:
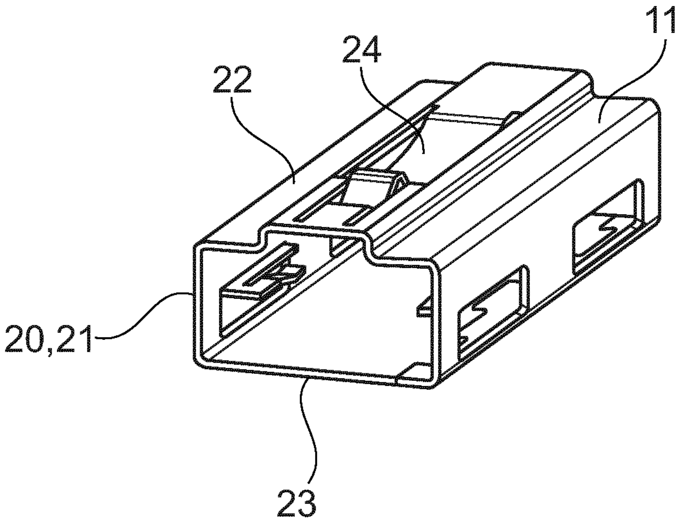
FIG. 81 a schematic perspective view onto the clamp of the connector of FIG. 74.

The clamp 11 shown in FIGS. 80 and 81 has a first leg 22 and a second leg 23. The first leg 22 has a reference part 24 arranged as part of a flexible portion of the first leg 22. The second leg 23 has a reference parts 25 by way of a flat wall.

The first leg 22 is joined to the second leg 23 by way of a transition section 20 that is designed as a bridge 21.

The embodiment shown in FIG. 82 to FIG. 87 shows the connector 3 to connect a first busbar 4 with a further busbar 4. The busbar 4 has a protrusion 6. The embodiment shown in FIGS. 82 to 87 might have an additional casing made of plastic that could be arranged around the elements shown in FIGS. 82 to 87.

FIG. 82 to FIG. 87 are explained with the element 4 with the protrusion 6 being a busbar. It will be apparent to the skilled person that the element 4 shown in FIG. 82 to FIG. 87 could likewise be referred to as an electrode 5 with a protrusion 6. The disclosure of FIG. 82 to FIG. 87 is hence being applicable as a disclosure for connecting an electrode with a protrusion 6 to the busbar 4.

Figure 82:
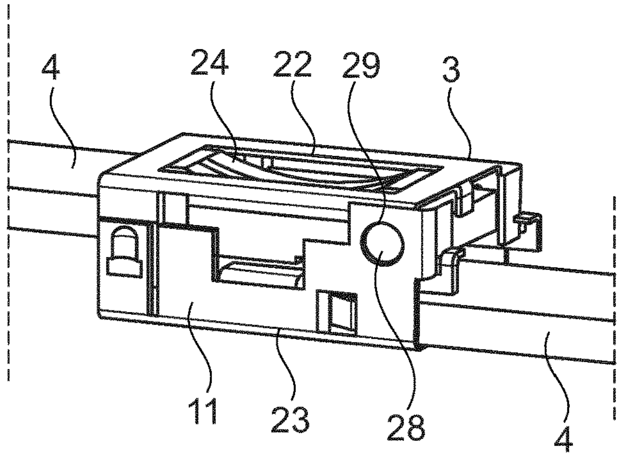
FIG. 82 a schematic perspective view onto a connector and a busbar and a further busbar.

The connector 3 is designed to be used to connect a busbar 4 to a further busbar 4 that extends away from the busbar 4 in the manner shown in FIG. 82.

Figure 83:
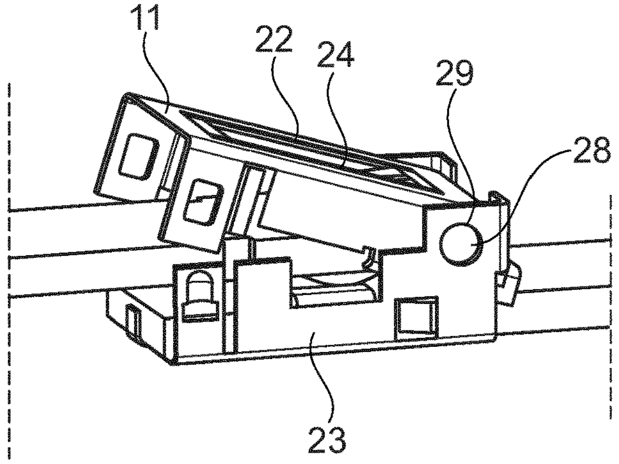
FIG. 83 a schematic perspective view onto the connector and the busbar and the further busbar of FIG. 82 with the connector in the open state.
Figure 84:
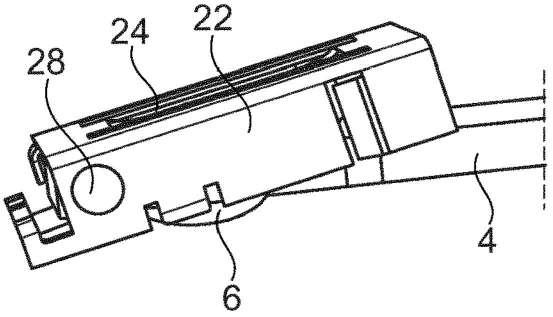
FIG. 84 a schematic perspective view onto the first leg of the clamp of the connector of FIG. 82 and the busbar of FIG. 82.

FIGS. 83 and 84 show that the busbar 4 has a protrusion 6. Here the same effect of tolerance compensation will occur as explained with reference to FIG. 16.

The connector shown in FIGS. 82 and 83 has a clamp 11.

Figure 85:
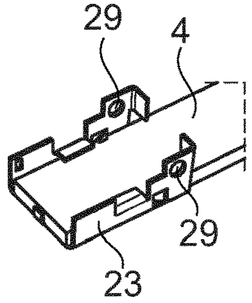
FIG. 85 a schematic perspective view onto the second leg of the clamp of the connector of FIG. 82 and the further busbar of FIG. 82.
Figure 86:
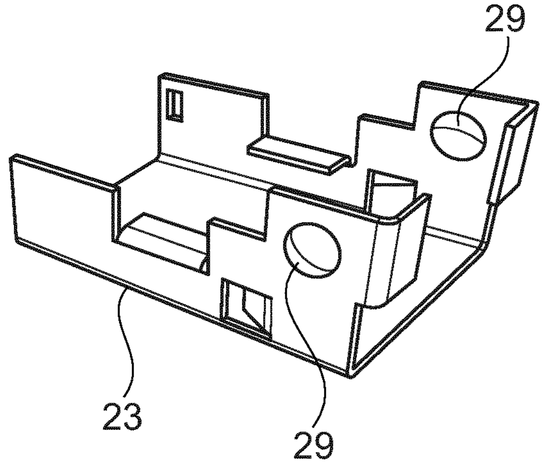
FIG. 86 a schematic perspective view onto the second leg of the clamp of the connector of FIG. 82.
Figure 87:
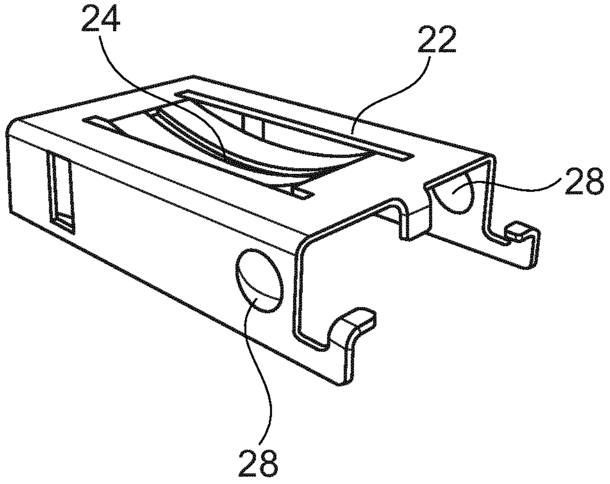
FIG. 87 a schematic perspective view onto the first leg of the clamp of the connector of FIG. 82.
Figure 88:
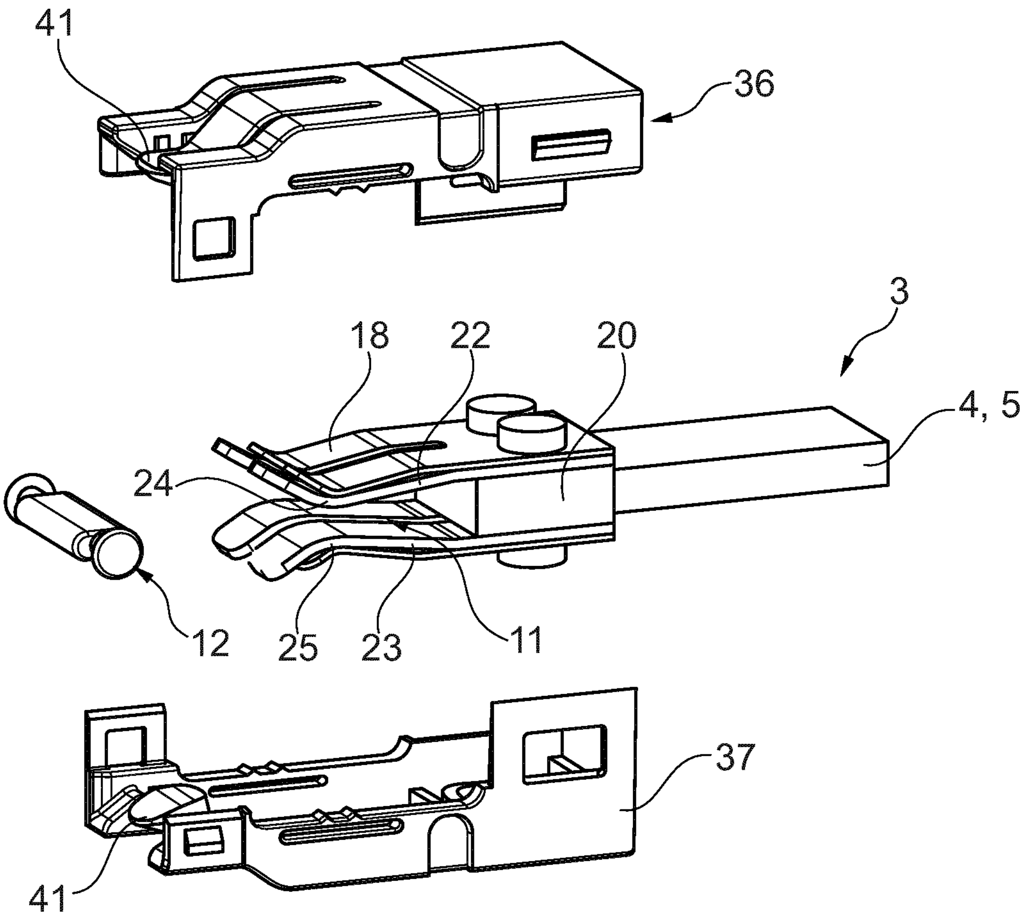
FIG. 88 a schematic perspective exploded view onto a connector and a busbar.

The clamp 11 shown in FIGS. 82 and 83 has a first leg 22 (see also FIGS. 84 and 87) and a second leg 23 (see also FIGS. 85 and 86). The first leg 22 has a reference part 24 arranged as part of a flexible portion of the first leg 22. The second leg 23 has four reference parts 25.

The first leg 22 is joined to the second leg 23 by way of rods 28 protruding from the first leg 22 that are held in holes 29 on the second leg 23 allowing the first leg 22 to swivel relative to the second leg 23. The clamp 11 can be moved into an open position (see FIG. 83).

The embodiment shown in FIGS. 88 to 93 has a connector 3 suitable to hold a busbar 4 in contact with a further busbar 4 that could also be an electrode 5. The connector 3 comprises a clamp 11. A spring clamp 18 is arranged around the clamp 11. The clamp 11 has a transition section 20 formed by a bridge connecting a first leg 22 arranged at one end of the transition section 20 to a second leg 23 arranged at the opposite end of the transition section 20. The first leg 22 and the second leg 23 are elastically deformable. The clamp 11 has a first state (shown in FIG. 91), in which a reference part 24 of the first leg 22 is distanced from a reference part 25 of the second leg 23 by a first amount. The clamp 11 has a second state (shown in FIG. 89), in which the reference part 24 of the first leg 22 is distanced from the reference part 25 of the second leg 24 by a second amount that is different from the first amount. The first leg 22 and the second leg 23 are being further elastically deformed in the second state than in the first state.

Figure 89:
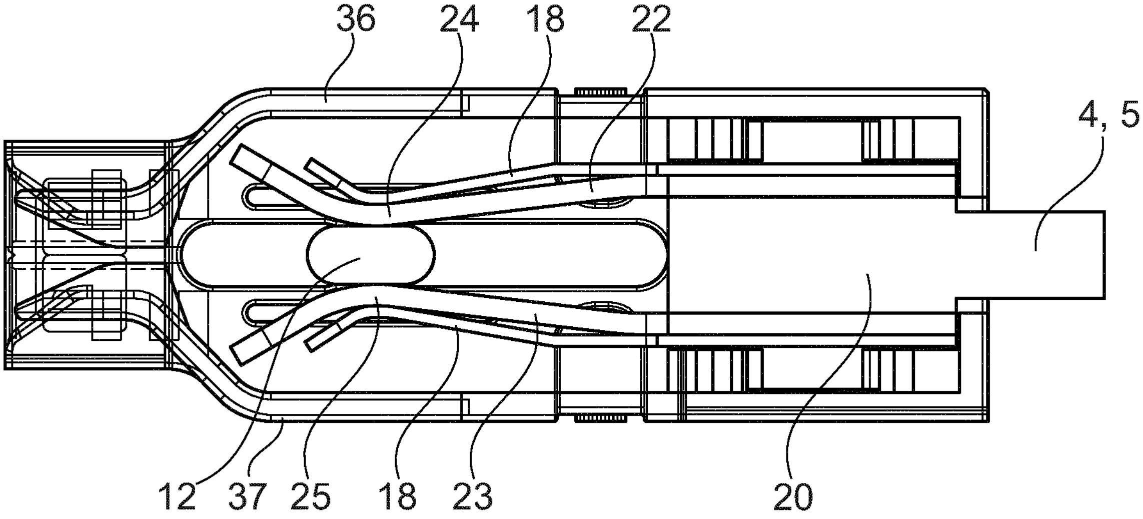
FIG. 89 a schematic sectional view onto the connector and the busbar of FIG. 88.
Figure 90:
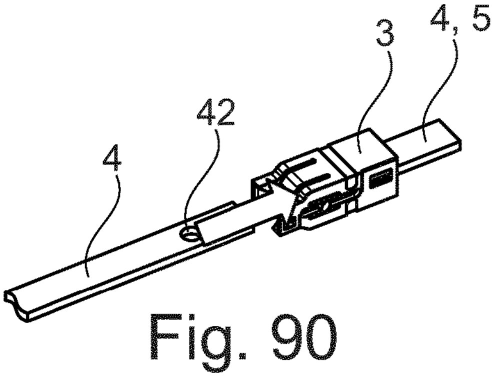
FIG. 90 a schematic perspective view onto the connector and busbar of FIG. 88 and a further busbar.
Figure 91:
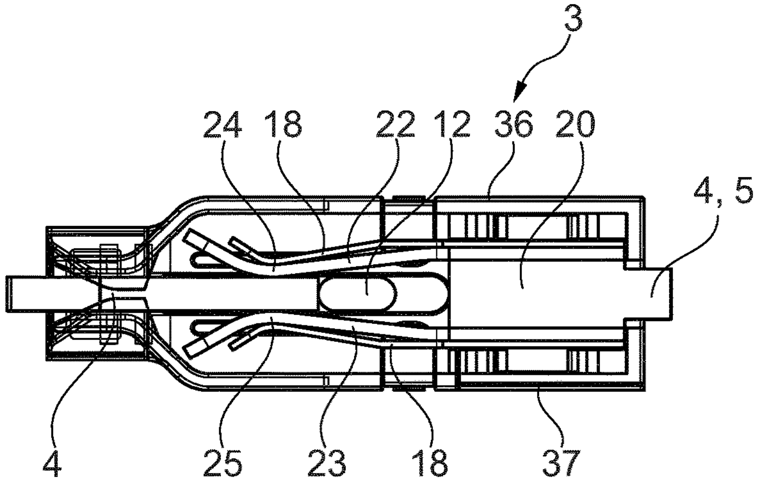
FIG. 91 a schematic sectional view onto the connector and the busbar of FIG. 88 and a further busbar inserted into the connector.

The transition section 20 has a width in a width direction that extends at an angle to a line that connects the one end with the opposite end of the transition section 20. The connector further comprising a spacer 12, the spacer 12 being moveable between a first position (FIG. 89) and a second position (FIG. 91), the spacer 12 being in contact with a part of the first leg 22 when the clamp 11 is in the second state (FIG. 89) and the spacer 12 is in the first position (FIG. 89). The spacer 12 is designed to be moved linearly from the first position into the second position along a retraction direction, the retraction direction pointing towards the transition section 20.

The connector 3 has a housing 10 that has an upper part 36 and a lower part 37.

The clamp 11 is arranged a part of a busbar 4 that could also be an electrode 5 of a battery block 2. FIGS. 88 to 93 shows, how this busbar 4 is connected to a further busbar 4. The spacer 12 holds the clamp 11 in the second position facilitating the insertion of the end of the further busbar 4. During the insertion, the further busbar 4 pushes the spacer 12 from its first position (FIG. 89) to its second position (FIG. 91) in the retraction direction and towards the transition section 20.

Figure 92:
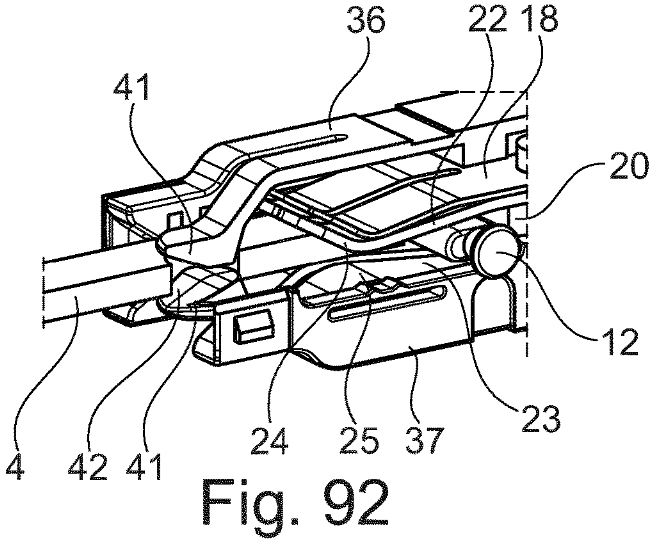
FIG. 92 a schematic perspective view onto the end of the connector and the busbar of FIG. 88 and the further busbar inserted into the connector.
Figure 93:
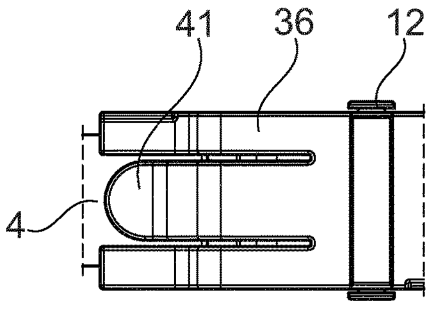
FIG. 93 a schematic top view onto the end of the connector and the busbar of FIG. 88 and the further busbar inserted into the connector.

As shown in FIG. 92, the upper part 36 and the lower part 37 of the housing 10 each have arms 41 that are flexible and engage with a hole 42 in the further busbar 4. FIG. 93 shows that by way of a special marking on the top of the upper part 36 it can be checked if the spacer 12 has correctly reached its second position.

The embodiment shown in FIGS. 94 to 101 has a connector 3 suitable to hold a busbar 4 in contact with an electrode 5. The connector 3 comprises a clamp 11. A spring clamp 18 is arranged around the clamp 11. The clamp 11 has a transition section 20 formed by a bridge connecting a first leg 22 arranged at one end of the transition section 20 to a second leg 23 arranged at the opposite end of the transition section 20. The first leg 22 and the second leg 23 are elastically deformable. The clamp 11 has a first state (shown in FIG. 100), in which a reference part 24 of the first leg 22 is distanced from a reference part 25 of the second leg 23 by a first amount. The clamp 11 has a second state (shown in FIG. 101), in which the reference part 24 of the first leg 22 is distanced from the reference part 25 of the second leg 24 by a second amount that is different from the first amount. The first leg 22 and the second leg 23 are being further elastically deformed in the second state than in the first state.

Figure 101:
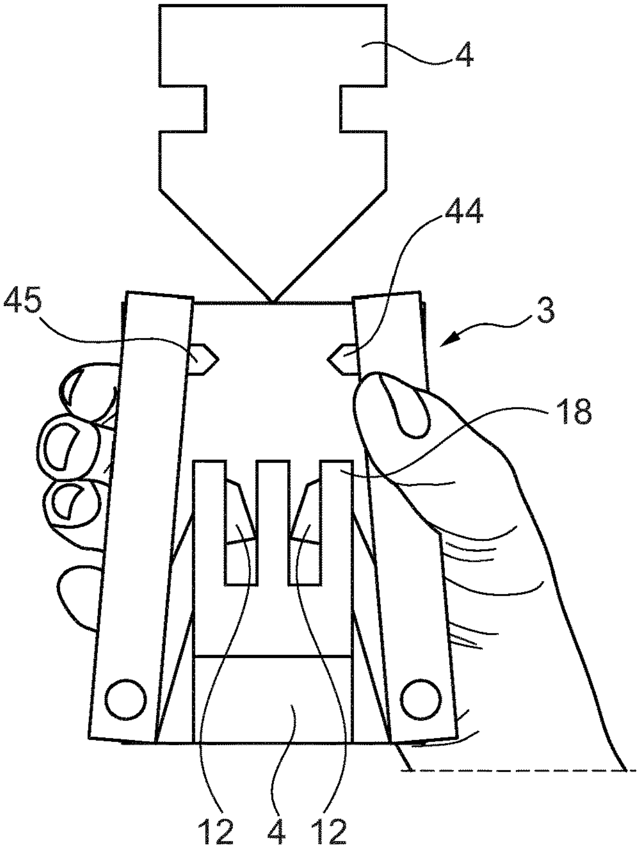
FIG. 101 a schematic sectional view on the connector and the electrode of FIG. 94 and spacers as part of the connector in a second position.

The transition section 20 has a width in a width direction that extends at an angle to a line that connects the one end with the opposite end of the transition section 20. The connector further comprising two spacers 12, each spacer 12 being moveable between a first position (FIG. 101) and a second position (FIG. 100), the spacers 12 being in contact with a part of the first leg 22 when the clamp 11 is in the second state (FIG. 101) and the spacer 12 is in the first position (FIG. 101). The spacer 12 is designed to be rotated from the first position into the second position around the pivot points 43 of the spacers 12.

The connector 3 has a housing 10 that has an upper part 36 and a lower part 37.

The clamp 11 is arranged a part of an electrode 5 of a battery block 2. FIG. FIGS. 94 to 101 shows, how this electrode 5 is connected to a busbar 4. The spacer 12 holds the clamp 11 in the second position facilitating the insertion of the end of the busbar 4. During the insertion, the spacers 12 are allowed to pivot about the pivot points 433 by way of the worker relaxing his grip on the spacers 12 (movement from FIG. 101 to FIG. 100).

Figure 94:
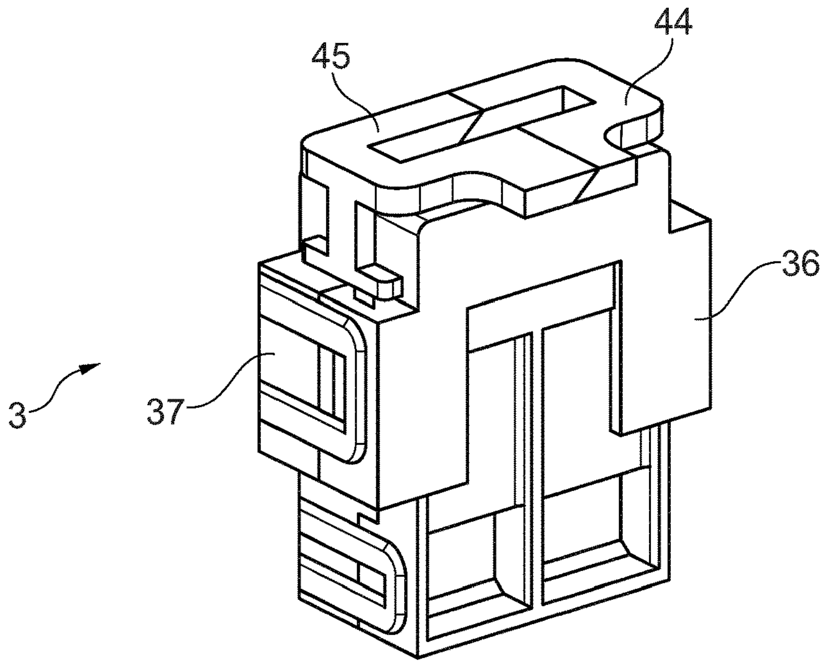
FIG. 94 a schematic perspective view onto a connector.
Figure 95:
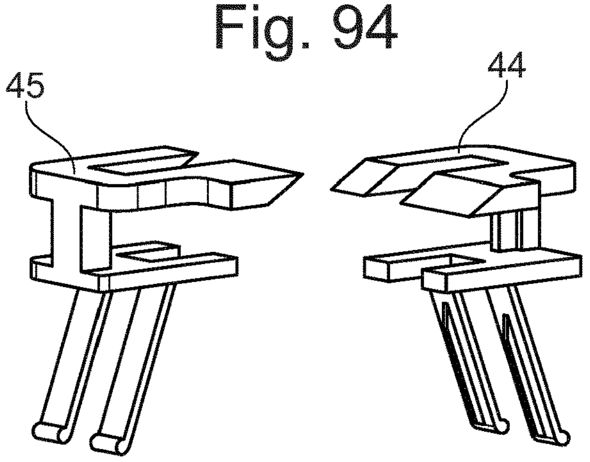
FIG. 95 a schematic perspective view onto pieces of the connector of FIG. 94.
Figure 96:
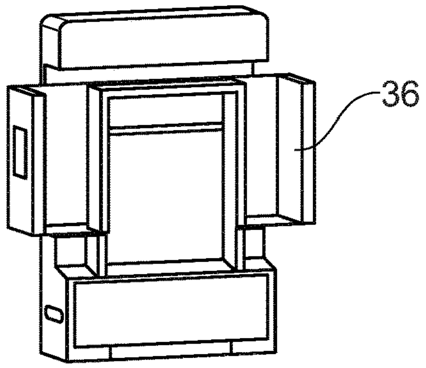
FIG. 96 a schematic perspective view onto a piece of the casing of the connector of FIG. 94.
Figure 97:
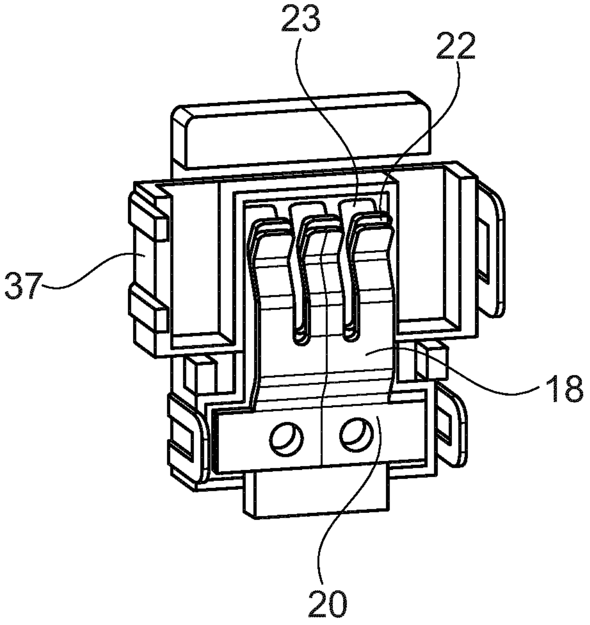
FIG. 97 a schematic perspective view onto a further piece of the casing and of an electrode arranged inside the casing of the connector of FIG. 94.
Figure 98:
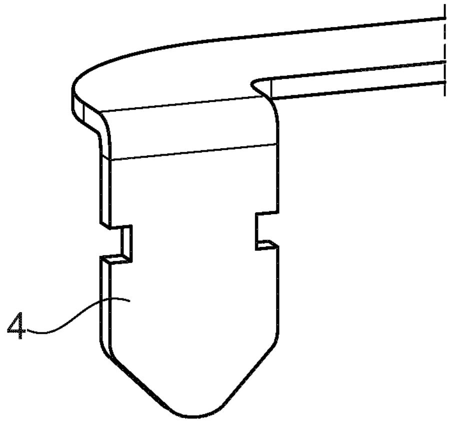
FIG. 98 a schematic perspective view onto a busbar to be used in connection with the connector of FIG. 94.
Figure 99:
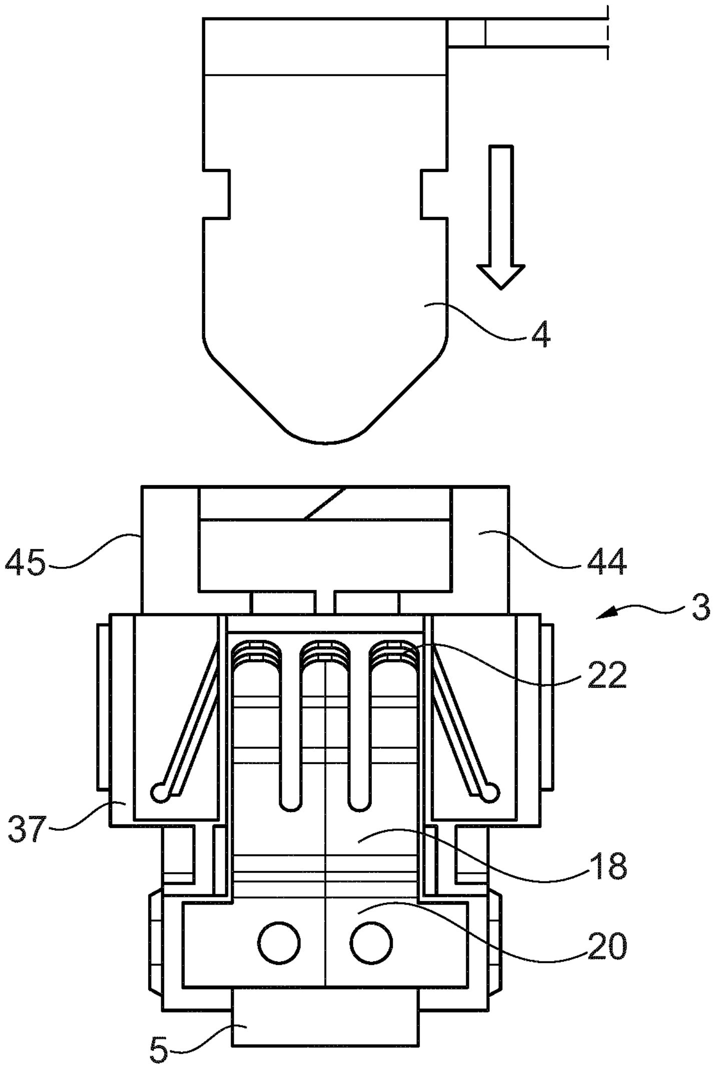
FIG. 99 a schematic sectional view onto the connector and the electrode of FIG. 97 and the busbar of FIG. 98.
Figure 100:
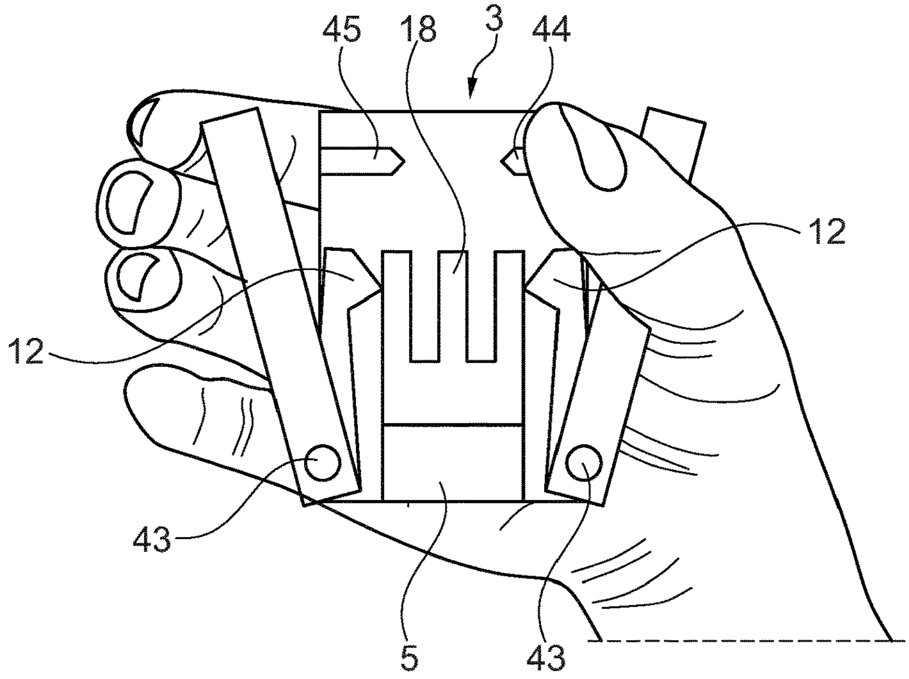
FIG. 100 a schematic sectional view on the connector and the electrode of FIG. 97 and spacers as part of the connector in a second position.

FIG. 94, 95, 99, 100, 101 show the connector 3 to have an indicator made of two pieces 44, 45 that can be used to indicate the assembly state of the connector 3 and the busbar 4.

The invention claimed is:

1. A connector configured to hold a busbar in contact with another conductor in a high current power supply system, especially a battery unit with an electrode of a battery or with a further busbar, the connector comprising a clamp,
- the clamp having a transition section connecting
  - a first leg arranged at one end of the transition section, to a second leg arranged at the opposite end of the transition section,
- the transition section and/or the first leg being elastically deformable,
- the clamp having a first state, in which a reference part of the first leg is distanced from a reference part of the second leg by a first amount,
- the clamp having a second state, in which the reference part of the first leg is distanced from the reference part of the second leg by a second amount that is different from the first amount,
- the transitions section and/or the first leg being further elastically deformed in the second state than in the first state,
- the transition section having a width in a width direction that extends at an angle to a line that connects the one end with the opposite end of the transition section,
- the connector further comprising a spacer, the spacer being moveable between a first position and a second position, the spacer being in contact with a part of the first leg when the clamp is in the second state and the spacer is in the first position,
- wherein the spacer
- is designed to be rotated from the first position into the second position;
- is designed to be moved linearly from the first position into the second position along a retraction direction, the retraction direction pointing at least partially in the width direction and/or at least partially pointing towards the transition section; or
- is designed to perform a combined rotational and linear movement from the first position into the second position,
- the connector further comprising a casing with an opening for inserting a part of the busbar into the casing, a clearance being arranged in the casing between the opening and a busbar abutment surface on the spacer when the clamp is in the second state and the spacer is in the first position.

2. A connector according to claim 1, wherein the second leg is elastically deformable and wherein the second leg is further elastically deformed in the second state than in the first state.

3. A system comprising a connector according to claim 1 and the other conductor, the busbar being in contact with the other conductor.

4. The system according to claim 3, wherein a part of the busbar is arranged between the reference part of the first leg and the reference part of the second leg.

5. The system according to claim 3, wherein the clamp is the electrode of the battery.

6. The system according to claim 3, wherein at least a part of the clamp and/or at least a part of the spacer is made from a material that has a lower electrical conductivity than the material that at least a part of the busbar and/or the other conductor is made of, and/or the bending stiffness of at least a part of the clamp is made lower than the bending stiffness of a part of the busbar and/or a part of the other conductor.

7. A battery set comprising at least two battery units and the system according to claim 3.

8. A method for assembling a system with a connector suitable to hold a busbar in contact with another conductor in a high current power supply system, especially a battery unit with an electrode of a battery or with a further busbar, wherein the method comprises the steps of:

providing the connector, the connector comprising a clamp, the clamp having a transition section connecting a first leg arranged at one end of the transition section, to a second leg arranged at the opposite end of the transition section, the transition section and/or the first leg being elastically deformable, the clamp having a first state, in which the reference part of the first leg is distanced from a reference part of the second leg by a first amount, the clamp having a second state, in which the reference part of the first leg is distanced from the reference part of the second leg by a second amount that is different from the first amount, the transition section and/or the first leg being further elastically deformed in the second state than in the first state, the connector further comprising a spacer, the spacer being moveable between a first position and a second position, the spacer being in the first position and being in contact with a part of the first leg and the clamp being in the second state, providing a busbar, bringing a part of the busbar into contact with a busbar abutment surface on the spacer and moving the spacer from the first position towards the second position using the busbar, or bringing a part of a busbar into a position between the first leg and the second leg and moving the spacer from the first position towards the second position.

9. The method according to claim 8, wherein the spacer is rotated from the first position towards the second position;

the spacer is moved linearly from the first position into the second position along a retraction direction; or the spacer is moved in a combined rotational and linear movement from the first position into the second position.

* * * * *